(12) United States Patent
Falkson et al.

(10) Patent No.: US 10,464,530 B2
(45) Date of Patent: Nov. 5, 2019

(54) VOICE BIOMETRIC PRE-PURCHASE ENROLLMENT FOR AUTONOMOUS VEHICLES

(71) Applicant: NextEV USA, Inc., San Jose, CA (US)

(72) Inventors: Lisa E. Falkson, Los Altos, CA (US); Annie Jui Shan Chang, San Francisco, CA (US); Anthony Tao Liang, Palo Alto, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/407,480

(22) Filed: Jan. 17, 2017

(65) Prior Publication Data

US 2018/0201226 A1    Jul. 19, 2018

(51) Int. Cl.
*B60R 25/25*  (2013.01)
*G06F 21/32*  (2013.01)

(52) U.S. Cl.
CPC ............ *B60R 25/257* (2013.01); *G06F 21/32* (2013.01)

(58) Field of Classification Search
CPC ........ G10L 15/30; G10L 17/08; G10L 21/028
USPC ......................................................... 704/275
See application file for complete search history.

(56) References Cited

U.S. PATENT DOCUMENTS

| | | | |
|---|---|---|---|
| 4,361,202 A | 11/1982 | Minovitch | |
| 4,476,954 A | 10/1984 | Johnson et al. | |
| 4,754,255 A | 6/1988 | Sanders et al. | |
| 4,875,391 A | 10/1989 | Leising et al. | |
| 5,136,498 A | 8/1992 | McLaughlin et al. | |
| 5,204,817 A | 4/1993 | Yoshida | |
| 5,363,306 A | 11/1994 | Kuwahara et al. | |
| 5,508,689 A | 4/1996 | Rado et al. | |
| 5,521,815 A | 5/1996 | Rose | |
| 5,529,138 A | 6/1996 | Shaw et al. | |
| 5,531,122 A | 7/1996 | Chatham et al. | |
| 5,572,450 A | 11/1996 | Worthy | |
| 5,610,821 A | 3/1997 | Gazis et al. | |
| 5,648,769 A | 7/1997 | Sato et al. | |

(Continued)

FOREIGN PATENT DOCUMENTS

| | | |
|---|---|---|
| CN | 1417755 | 5/2003 |
| CN | 1847817 | 10/2006 |

(Continued)

OTHER PUBLICATIONS

U.S. Appl. No. 61/567,962, filed Dec. 7, 2011, Baarman et al.

(Continued)

*Primary Examiner* — Jakieda R Jackson
(74) *Attorney, Agent, or Firm* — Sheridan Ross P.C.

(57) ABSTRACT

A method and system for authenticating a user of a vehicle are described. In one embodiment, a user profile is associated with a user of a vehicle. The user profile is used to compare a sample of the voice of the user with a database onboard the vehicle as well as a database stored on a network connected server in communication with the vehicle. A user profile may be associated with a number of vehicles. Users may have a number of levels of permissions associated with a number of different vehicles. A user may be enabled to access a number of vehicle features by providing a voice sample via microphones in and around the vehicle. A voiceprint associated with the user may be improved based upon audio collected by microphones in and around the vehicle.

20 Claims, 26 Drawing Sheets

(56) References Cited

U.S. PATENT DOCUMENTS

| | | |
|---|---|---|
| 5,710,702 A | 1/1998 | Hayashi et al. |
| 5,794,164 A | 8/1998 | Beckert et al. |
| 5,797,134 A | 8/1998 | McMillan et al. |
| 5,808,372 A | 9/1998 | Schwegler et al. |
| 5,812,067 A | 9/1998 | Bergholz et al. |
| 5,825,283 A | 10/1998 | Camhi |
| 5,838,251 A | 11/1998 | Brinkmeyer et al. |
| 5,847,661 A | 12/1998 | Ricci |
| 5,890,080 A | 3/1999 | Coverdill et al. |
| 5,928,294 A | 7/1999 | Zelinkovsky |
| 5,949,345 A | 9/1999 | Beckert et al. |
| 5,983,161 A | 11/1999 | Lemelson et al. |
| 5,986,575 A | 11/1999 | Jones et al. |
| 6,038,426 A | 3/2000 | Williams, Jr. |
| 6,081,756 A | 6/2000 | Mio et al. |
| D429,684 S | 8/2000 | Johnson |
| 6,128,003 A | 10/2000 | Smith et al. |
| 6,141,620 A | 10/2000 | Zyburt et al. |
| 6,148,261 A | 11/2000 | Obradovich et al. |
| 6,152,514 A | 11/2000 | McLellen |
| 6,157,321 A | 12/2000 | Ricci |
| 6,191,703 B1 | 2/2001 | Wallace |
| 6,198,996 B1 | 3/2001 | Berstis |
| 6,199,001 B1 | 3/2001 | Ohta et al. |
| 6,202,008 B1 | 3/2001 | Beckert et al. |
| 6,252,544 B1 | 6/2001 | Hoffberg |
| 6,267,428 B1 | 7/2001 | Baldas et al. |
| 6,302,438 B1 | 10/2001 | Stopper, Jr. et al. |
| 6,310,542 B1 | 10/2001 | Gehlot |
| 6,317,058 B1 | 11/2001 | Lemelson et al. |
| 6,339,826 B2 | 1/2002 | Hayes, Jr. et al. |
| 6,356,838 B1 | 3/2002 | Paul |
| 6,388,579 B1 | 5/2002 | Adcox et al. |
| 6,445,084 B1 | 9/2002 | Daiss et al. |
| 6,480,224 B1 | 11/2002 | Brown |
| 6,496,100 B1 | 12/2002 | Hiebl |
| 6,502,022 B1 | 12/2002 | Chastain et al. |
| 6,519,519 B1 | 2/2003 | Stopczynski |
| 6,542,071 B1 | 4/2003 | Ohtsubo et al. |
| 6,557,752 B1 | 5/2003 | Yacoob |
| 6,563,910 B2 | 5/2003 | Menard et al. |
| 6,587,739 B1 | 7/2003 | Abrams et al. |
| 6,598,227 B1 | 7/2003 | Berry et al. |
| 6,607,212 B1 | 8/2003 | Reimer et al. |
| 6,617,981 B2 | 9/2003 | Basinger |
| 6,662,077 B2 | 12/2003 | Haag |
| 6,675,081 B2 | 1/2004 | Shuman et al. |
| 6,678,747 B2 | 1/2004 | Goossen et al. |
| 6,681,176 B2 | 1/2004 | Funk et al. |
| 6,690,260 B1 | 2/2004 | Ashihara |
| 6,690,940 B1 | 2/2004 | Brown et al. |
| 6,724,920 B1 | 4/2004 | Berenz et al. |
| 6,754,580 B1 | 6/2004 | Ask et al. |
| 6,757,593 B2 | 6/2004 | Mori et al. |
| 6,762,684 B1 | 7/2004 | Camhi |
| 6,765,495 B1 | 7/2004 | Dunning et al. |
| 6,778,888 B2 | 8/2004 | Cataldo et al. |
| 6,782,240 B1 | 8/2004 | Tabe |
| 6,785,531 B2 | 8/2004 | Lepley et al. |
| 6,816,783 B2 | 11/2004 | Hashima et al. |
| 6,820,259 B1 | 11/2004 | Kawamata et al. |
| 6,944,533 B2 | 9/2005 | Obradovich et al. |
| 6,950,022 B2 | 9/2005 | Breed |
| 6,952,156 B2 | 10/2005 | Arshad et al. |
| 6,958,707 B1 | 10/2005 | Siegel |
| 6,965,816 B2 | 11/2005 | Walker |
| 6,992,580 B2 | 1/2006 | Kotzin et al. |
| 7,019,641 B1 | 3/2006 | Lakshmanan et al. |
| 7,020,544 B2 | 3/2006 | Shinada et al. |
| 7,021,691 B1 | 4/2006 | Schmidt et al. |
| 7,042,345 B2 | 5/2006 | Ellis |
| 7,047,129 B2 | 5/2006 | Uotani |
| 7,058,898 B2 | 6/2006 | McWalter et al. |
| 7,096,431 B2 | 8/2006 | Tambata et al. |
| 7,142,696 B1 | 11/2006 | Engelsberg et al. |
| 7,164,117 B2 | 1/2007 | Breed et al. |
| 7,187,947 B1 | 3/2007 | White et al. |
| 7,203,598 B1 | 4/2007 | Whitsell |
| 7,233,861 B2 | 6/2007 | Van Buer et al. |
| 7,239,960 B2 | 7/2007 | Yokota et al. |
| 7,277,454 B2 | 10/2007 | Mocek et al. |
| 7,284,769 B2 | 10/2007 | Breed |
| 7,289,645 B2 | 10/2007 | Yamamoto et al. |
| 7,295,921 B2 | 11/2007 | Spencer et al. |
| 7,313,547 B2 | 12/2007 | Mocek et al. |
| 7,333,012 B1 | 2/2008 | Nguyen |
| 7,343,148 B1 | 3/2008 | O'Neil |
| 7,386,376 B2 | 6/2008 | Basir et al. |
| 7,386,799 B1 | 6/2008 | Clanton et al. |
| 7,432,829 B2 | 10/2008 | Poltorak |
| 7,474,264 B2 | 1/2009 | Bolduc et al. |
| 7,493,140 B2 | 2/2009 | Michmerhuizen et al. |
| 7,526,539 B1 | 4/2009 | Hsu |
| 7,548,815 B2 | 6/2009 | Watkins et al. |
| 7,566,083 B2 | 7/2009 | Vitito |
| 7,606,660 B2 | 10/2009 | Diaz et al. |
| 7,606,867 B1 | 10/2009 | Singhal et al. |
| 7,643,913 B2 | 1/2010 | Taki et al. |
| 7,650,234 B2 | 1/2010 | Obradovich et al. |
| 7,671,764 B2 | 3/2010 | Uyeki et al. |
| 7,680,596 B2 | 3/2010 | Uyeki et al. |
| 7,683,771 B1 | 3/2010 | Loeb |
| 7,711,468 B1 | 5/2010 | Levy |
| 7,734,315 B2 | 6/2010 | Rathus et al. |
| 7,748,021 B2 | 6/2010 | Obradovich et al. |
| RE41,449 E | 7/2010 | Krahnstoever et al. |
| 7,791,499 B2 | 9/2010 | Mohan et al. |
| 7,796,190 B2 | 9/2010 | Basso et al. |
| 7,802,832 B2 | 9/2010 | Carnevali |
| 7,821,421 B2 | 10/2010 | Tamir et al. |
| 7,832,762 B2 | 11/2010 | Breed |
| 7,864,073 B2 | 1/2011 | Lee et al. |
| 7,864,987 B2 * | 1/2011 | Venkatanna ............ G06F 21/32 235/380 |
| 7,872,591 B2 | 1/2011 | Kane et al. |
| 7,873,471 B2 | 1/2011 | Gieseke |
| 7,881,703 B2 | 2/2011 | Roundtree et al. |
| 7,891,004 B1 | 2/2011 | Gelvin et al. |
| 7,891,719 B2 | 2/2011 | Carnevali |
| 7,899,610 B2 | 3/2011 | McClellan |
| 7,966,678 B2 | 6/2011 | Ten Eyck et al. |
| 7,969,290 B2 | 6/2011 | Waeller et al. |
| 7,969,324 B2 | 6/2011 | Chevion et al. |
| 8,060,631 B2 | 11/2011 | Collart et al. |
| 8,064,925 B1 | 11/2011 | Sun et al. |
| 8,066,313 B2 | 11/2011 | Carnevali |
| 8,098,170 B1 | 1/2012 | Szczerba et al. |
| 8,113,564 B2 | 2/2012 | Carnevali |
| 8,131,419 B2 | 3/2012 | Ampunan et al. |
| 8,157,310 B2 | 4/2012 | Carnevali |
| 8,162,368 B2 | 4/2012 | Carnevali |
| 8,175,802 B2 | 5/2012 | Forstall et al. |
| 8,233,919 B2 | 7/2012 | Haag et al. |
| 8,245,609 B1 | 8/2012 | Greenwald et al. |
| 8,306,514 B1 | 11/2012 | Nunally |
| 8,334,847 B2 | 12/2012 | Tomkins |
| 8,346,233 B2 | 1/2013 | Aaron et al. |
| 8,346,432 B2 | 1/2013 | Van Wiemeersch et al. |
| 8,350,721 B2 | 1/2013 | Carr |
| 8,352,282 B2 | 1/2013 | Jensen et al. |
| 8,369,263 B2 | 2/2013 | Dowling et al. |
| 8,417,449 B1 | 4/2013 | Denise |
| 8,432,260 B2 | 4/2013 | Talty et al. |
| 8,442,389 B2 | 5/2013 | Kashima et al. |
| 8,442,758 B1 | 5/2013 | Rovik et al. |
| 8,467,965 B2 | 6/2013 | Chang |
| 8,497,842 B2 | 7/2013 | Tomkins et al. |
| 8,498,809 B2 | 7/2013 | Bill |
| 8,509,982 B2 | 8/2013 | Montemerlo et al. |
| 8,521,410 B2 | 8/2013 | Mizuno et al. |
| 8,527,143 B2 | 9/2013 | Tan |
| 8,527,146 B1 | 9/2013 | Jackson et al. |
| 8,532,574 B2 | 9/2013 | Kirsch |
| 8,543,330 B2 | 9/2013 | Taylor et al. |

(56) References Cited

U.S. PATENT DOCUMENTS

| | | | |
|---|---|---|---|
| 8,547,340 B2 | 10/2013 | Sizelove et al. |
| 8,548,669 B2 | 10/2013 | Naylor |
| 8,559,183 B1 | 10/2013 | Davis |
| 8,577,600 B1 | 11/2013 | Pierfelice |
| 8,578,279 B2 | 11/2013 | Chen et al. |
| 8,583,292 B2 | 11/2013 | Preston et al. |
| 8,589,073 B2 | 11/2013 | Guha et al. |
| 8,600,611 B2 | 12/2013 | Seize |
| 8,613,385 B1 | 12/2013 | Hulet et al. |
| 8,621,645 B1 | 12/2013 | Spackman |
| 8,624,727 B2 | 1/2014 | Saigh et al. |
| 8,634,984 B2 | 1/2014 | Sumizawa |
| 8,644,165 B2 | 2/2014 | Saarimaki et al. |
| 8,660,735 B2 | 2/2014 | Tengler et al. |
| 8,671,068 B2 | 3/2014 | Harber et al. |
| 8,688,372 B2 | 4/2014 | Bhogal et al. |
| 8,705,527 B1 | 4/2014 | Addepalli et al. |
| 8,706,143 B1 | 4/2014 | Elias |
| 8,718,797 B1 | 5/2014 | Addepalli et al. |
| 8,725,311 B1 | 5/2014 | Breed |
| 8,730,033 B2 | 5/2014 | Yarnold et al. |
| 8,737,986 B2 | 5/2014 | Rhoads et al. |
| 8,761,673 B2 | 6/2014 | Sakata |
| 8,774,842 B2 | 7/2014 | Jones et al. |
| 8,779,947 B2 | 7/2014 | Tengler et al. |
| 8,782,262 B2 | 7/2014 | Collart et al. |
| 8,793,065 B2 | 7/2014 | Seltzer et al. |
| 8,798,918 B2 | 8/2014 | Onishi et al. |
| 8,799,657 B2 | 8/2014 | Bhattacharya et al. |
| 8,805,110 B2 | 8/2014 | Rhoads et al. |
| 8,812,171 B2 | 8/2014 | Filev et al. |
| 8,817,761 B2 | 8/2014 | Gruberman et al. |
| 8,825,031 B2 | 9/2014 | Aaron et al. |
| 8,825,277 B2 | 9/2014 | McClellan et al. |
| 8,825,382 B2 | 9/2014 | Liu |
| 8,826,261 B1 | 9/2014 | Anand et al. |
| 8,838,088 B1 | 9/2014 | Henn et al. |
| 8,862,317 B2 | 10/2014 | Shin et al. |
| 8,977,408 B1 | 3/2015 | Cazanas et al. |
| 8,989,053 B1 | 3/2015 | Skaaksrud et al. |
| 9,020,825 B1* | 4/2015 | Garber .................... G06F 3/167 704/231 |
| 9,043,016 B2 | 5/2015 | Filippov et al. |
| 9,229,905 B1 | 1/2016 | Penilla et al. |
| 9,236,052 B2* | 1/2016 | Timem .................... G06F 21/32 |
| 9,390,445 B2* | 7/2016 | Sheets ................ G06Q 30/0609 |
| 9,501,666 B2 | 11/2016 | Lockett et al. |
| 2001/0010516 A1 | 8/2001 | Roh et al. |
| 2001/0015888 A1 | 8/2001 | Shaler et al. |
| 2002/0009978 A1 | 1/2002 | Dukach et al. |
| 2002/0023010 A1 | 2/2002 | Rittmaster et al. |
| 2002/0026278 A1 | 2/2002 | Feldman et al. |
| 2002/0045484 A1 | 4/2002 | Eck et al. |
| 2002/0065046 A1 | 5/2002 | Mankins et al. |
| 2002/0077985 A1 | 6/2002 | Kobata et al. |
| 2002/0095249 A1 | 7/2002 | Lang |
| 2002/0097145 A1 | 7/2002 | Tumey et al. |
| 2002/0103622 A1 | 8/2002 | Burge |
| 2002/0105968 A1 | 8/2002 | Pruzan et al. |
| 2002/0126876 A1 | 9/2002 | Paul et al. |
| 2002/0128774 A1 | 9/2002 | Takezaki et al. |
| 2002/0143461 A1 | 10/2002 | Burns et al. |
| 2002/0143643 A1 | 10/2002 | Catan |
| 2002/0152010 A1 | 10/2002 | Colmenarez et al. |
| 2002/0154217 A1 | 10/2002 | Ikeda |
| 2002/0169551 A1 | 11/2002 | Inoue et al. |
| 2002/0174021 A1 | 11/2002 | Chu et al. |
| 2003/0004624 A1 | 1/2003 | Wilson et al. |
| 2003/0007227 A1 | 1/2003 | Ogino |
| 2003/0055557 A1 | 3/2003 | Dutta et al. |
| 2003/0060937 A1 | 3/2003 | Shinada et al. |
| 2003/0065432 A1 | 4/2003 | Shuman et al. |
| 2003/0101451 A1 | 5/2003 | Bentolila et al. |
| 2003/0109972 A1 | 6/2003 | Tak |
| 2003/0125846 A1 | 7/2003 | Yu et al. |
| 2003/0132666 A1 | 7/2003 | Bond et al. |
| 2003/0149530 A1 | 8/2003 | Stopczynski |
| 2003/0158638 A1 | 8/2003 | Yakes et al. |
| 2003/0182435 A1 | 9/2003 | Redlich et al. |
| 2003/0202683 A1 | 10/2003 | Ma et al. |
| 2003/0204290 A1 | 10/2003 | Sadler et al. |
| 2003/0229492 A1* | 12/2003 | Nolan ................ G07C 9/00158 704/247 |
| 2003/0230443 A1 | 12/2003 | Cramer et al. |
| 2004/0017292 A1 | 1/2004 | Reese |
| 2004/0024502 A1 | 2/2004 | Squires et al. |
| 2004/0036622 A1 | 2/2004 | Dukach et al. |
| 2004/0039500 A1 | 2/2004 | Amendola et al. |
| 2004/0039504 A1 | 2/2004 | Coffee et al. |
| 2004/0068364 A1 | 4/2004 | Zhao et al. |
| 2004/0070920 A1 | 4/2004 | Flueli |
| 2004/0093155 A1 | 5/2004 | Simonds et al. |
| 2004/0117494 A1 | 6/2004 | Mitchell et al. |
| 2004/0128062 A1 | 7/2004 | Ogino et al. |
| 2004/0143438 A1* | 7/2004 | Cabezas ................... G06F 21/64 704/260 |
| 2004/0153356 A1 | 8/2004 | Lockwood et al. |
| 2004/0162019 A1 | 8/2004 | Horita et al. |
| 2004/0180653 A1 | 9/2004 | Royalty |
| 2004/0182574 A1 | 9/2004 | Adnan et al. |
| 2004/0193347 A1 | 9/2004 | Harumoto et al. |
| 2004/0203974 A1 | 10/2004 | Seibel |
| 2004/0204837 A1 | 10/2004 | Singleton |
| 2004/0209594 A1 | 10/2004 | Naboulsi |
| 2004/0217850 A1 | 11/2004 | Perttunen et al. |
| 2004/0225557 A1 | 11/2004 | Phelan et al. |
| 2004/0255123 A1 | 12/2004 | Noyama et al. |
| 2004/0257208 A1 | 12/2004 | Huang et al. |
| 2004/0260470 A1 | 12/2004 | Rast |
| 2005/0012599 A1 | 1/2005 | DeMatteo |
| 2005/0031100 A1 | 2/2005 | Iggulden et al. |
| 2005/0038598 A1 | 2/2005 | Oesterling et al. |
| 2005/0042999 A1 | 2/2005 | Rappaport |
| 2005/0065678 A1 | 3/2005 | Smith et al. |
| 2005/0065711 A1 | 3/2005 | Dahlgren et al. |
| 2005/0086051 A1 | 4/2005 | Brulle-Drews |
| 2005/0093717 A1 | 5/2005 | Lilja |
| 2005/0096906 A1* | 5/2005 | Barzilay ................ G06Q 30/06 704/249 |
| 2005/0097541 A1 | 5/2005 | Holland |
| 2005/0114864 A1 | 5/2005 | Surace |
| 2005/0122235 A1 | 6/2005 | Teffer et al. |
| 2005/0124211 A1 | 6/2005 | Diessner et al. |
| 2005/0130744 A1 | 6/2005 | Eck et al. |
| 2005/0144156 A1 | 6/2005 | Barber |
| 2005/0149752 A1 | 7/2005 | Johnson et al. |
| 2005/0153760 A1 | 7/2005 | Varley |
| 2005/0159853 A1 | 7/2005 | Takahashi et al. |
| 2005/0159892 A1 | 7/2005 | Chung |
| 2005/0192727 A1 | 9/2005 | Shostak et al. |
| 2005/0197748 A1 | 9/2005 | Holst et al. |
| 2005/0197767 A1 | 9/2005 | Nortrup |
| 2005/0251324 A1 | 11/2005 | Wiener et al. |
| 2005/0261815 A1 | 11/2005 | Cowelchuk et al. |
| 2005/0278093 A1 | 12/2005 | Kameyama |
| 2005/0283284 A1 | 12/2005 | Grenier et al. |
| 2006/0015819 A1 | 1/2006 | Hawkins et al. |
| 2006/0016869 A1* | 1/2006 | Bonalle ............... G06K 9/00375 235/380 |
| 2006/0036358 A1 | 2/2006 | Hale et al. |
| 2006/0044119 A1 | 3/2006 | Egelhaaf |
| 2006/0047386 A1 | 3/2006 | Kanevsky et al. |
| 2006/0058948 A1 | 3/2006 | Blass et al. |
| 2006/0059229 A1 | 3/2006 | Bain et al. |
| 2006/0125631 A1 | 6/2006 | Sharony |
| 2006/0130033 A1 | 6/2006 | Stoffels et al. |
| 2006/0142933 A1 | 6/2006 | Feng |
| 2006/0173841 A1 | 8/2006 | Bill |
| 2006/0175403 A1 | 8/2006 | McConnell et al. |
| 2006/0184319 A1 | 8/2006 | Seick et al. |
| 2006/0212909 A1 | 9/2006 | Girard et al. |
| 2006/0241836 A1 | 10/2006 | Kachouh et al. |
| 2006/0243056 A1 | 11/2006 | Sundermeyer et al. |
| 2006/0250272 A1 | 11/2006 | Puamau |

(56) References Cited

U.S. PATENT DOCUMENTS

| | | |
|---|---|---|
| 2006/0253307 A1 | 11/2006 | Warren et al. |
| 2006/0259210 A1 | 11/2006 | Tanaka et al. |
| 2006/0259304 A1* | 11/2006 | Barzilay ............... G10L 17/00 704/273 |
| 2006/0274829 A1 | 12/2006 | Siemens et al. |
| 2006/0282204 A1 | 12/2006 | Breed |
| 2006/0286969 A1* | 12/2006 | Talmor ................. G06F 21/32 455/415 |
| 2006/0287807 A1 | 12/2006 | Teffer |
| 2006/0287865 A1 | 12/2006 | Cross et al. |
| 2006/0288382 A1 | 12/2006 | Vitito |
| 2006/0290516 A1 | 12/2006 | Muehlsteff et al. |
| 2007/0001831 A1 | 1/2007 | Raz et al. |
| 2007/0002032 A1 | 1/2007 | Powers et al. |
| 2007/0010942 A1 | 1/2007 | Bill |
| 2007/0015485 A1 | 1/2007 | DeBiasio et al. |
| 2007/0028370 A1 | 2/2007 | Seng |
| 2007/0032225 A1 | 2/2007 | Konicek et al. |
| 2007/0057781 A1 | 3/2007 | Breed |
| 2007/0061057 A1 | 3/2007 | Huang et al. |
| 2007/0067614 A1 | 3/2007 | Berry et al. |
| 2007/0069880 A1 | 3/2007 | Best et al. |
| 2007/0083298 A1 | 4/2007 | Pierce et al. |
| 2007/0088488 A1 | 4/2007 | Reeves et al. |
| 2007/0103328 A1 | 5/2007 | Lakshmanan et al. |
| 2007/0115101 A1 | 5/2007 | Creekbaum et al. |
| 2007/0118301 A1 | 5/2007 | Andarawis et al. |
| 2007/0120697 A1 | 5/2007 | Ayoub et al. |
| 2007/0135995 A1 | 6/2007 | Kikuchi et al. |
| 2007/0156317 A1 | 7/2007 | Breed |
| 2007/0182625 A1 | 8/2007 | Kerai et al. |
| 2007/0182816 A1 | 8/2007 | Fox |
| 2007/0185969 A1 | 8/2007 | Davis |
| 2007/0192486 A1 | 8/2007 | Wilson et al. |
| 2007/0194902 A1 | 8/2007 | Blanco et al. |
| 2007/0194944 A1 | 8/2007 | Galera et al. |
| 2007/0195997 A1 | 8/2007 | Paul et al. |
| 2007/0200663 A1 | 8/2007 | White et al. |
| 2007/0208860 A1 | 9/2007 | Zellner et al. |
| 2007/0213090 A1 | 9/2007 | Holmberg |
| 2007/0228826 A1 | 10/2007 | Jordan et al. |
| 2007/0233341 A1 | 10/2007 | Logsdon |
| 2007/0250228 A1 | 10/2007 | Reddy et al. |
| 2007/0257815 A1 | 11/2007 | Gunderson et al. |
| 2007/0276596 A1 | 11/2007 | Solomon et al. |
| 2007/0280505 A1 | 12/2007 | Breed |
| 2008/0005974 A1 | 1/2008 | Delgado Vazquez et al. |
| 2008/0023253 A1 | 1/2008 | Prost-Fin et al. |
| 2008/0027337 A1 | 1/2008 | Dugan et al. |
| 2008/0033635 A1 | 2/2008 | Obradovich et al. |
| 2008/0042824 A1 | 2/2008 | Kates |
| 2008/0051957 A1 | 2/2008 | Breed et al. |
| 2008/0052627 A1 | 2/2008 | Oguchi |
| 2008/0071465 A1 | 3/2008 | Chapman et al. |
| 2008/0082237 A1 | 4/2008 | Breed |
| 2008/0086455 A1 | 4/2008 | Meisels et al. |
| 2008/0090522 A1 | 4/2008 | Oyama |
| 2008/0104227 A1 | 5/2008 | Birnie et al. |
| 2008/0119994 A1 | 5/2008 | Kameyama |
| 2008/0129475 A1 | 6/2008 | Breed et al. |
| 2008/0143085 A1 | 6/2008 | Breed et al. |
| 2008/0147280 A1 | 6/2008 | Breed |
| 2008/0148374 A1 | 6/2008 | Spaur et al. |
| 2008/0154712 A1 | 6/2008 | Wellman |
| 2008/0154957 A1 | 6/2008 | Taylor et al. |
| 2008/0161986 A1 | 7/2008 | Breed |
| 2008/0164985 A1 | 7/2008 | Iketani et al. |
| 2008/0169940 A1 | 7/2008 | Lee et al. |
| 2008/0174451 A1 | 7/2008 | Harrington et al. |
| 2008/0212215 A1 | 9/2008 | Schofield et al. |
| 2008/0216067 A1 | 9/2008 | Villing |
| 2008/0228358 A1 | 9/2008 | Wang et al. |
| 2008/0234919 A1 | 9/2008 | Ritter et al. |
| 2008/0252487 A1 | 10/2008 | McClellan et al. |
| 2008/0253613 A1 | 10/2008 | Jones et al. |
| 2008/0255721 A1 | 10/2008 | Yamada |
| 2008/0255722 A1 | 10/2008 | McClellan et al. |
| 2008/0269958 A1 | 10/2008 | Filev et al. |
| 2008/0281508 A1 | 11/2008 | Fu |
| 2008/0300778 A1 | 12/2008 | Kuznetsov |
| 2008/0305780 A1 | 12/2008 | Williams et al. |
| 2008/0319602 A1 | 12/2008 | McClellan et al. |
| 2009/0006525 A1 | 1/2009 | Moore |
| 2009/0024419 A1 | 1/2009 | McClellan et al. |
| 2009/0037719 A1 | 2/2009 | Sakthikumar et al. |
| 2009/0040026 A1 | 2/2009 | Tanaka |
| 2009/0055178 A1 | 2/2009 | Coon |
| 2009/0055180 A1* | 2/2009 | Coon ................. B60R 16/0373 704/251 |
| 2009/0082951 A1 | 3/2009 | Graessley |
| 2009/0099720 A1 | 4/2009 | Elgali |
| 2009/0112393 A1 | 4/2009 | Maten et al. |
| 2009/0112452 A1 | 4/2009 | Buck et al. |
| 2009/0119657 A1 | 5/2009 | Link, II |
| 2009/0125174 A1 | 5/2009 | Delean |
| 2009/0132294 A1 | 5/2009 | Haines |
| 2009/0138336 A1 | 5/2009 | Ashley et al. |
| 2009/0144622 A1 | 6/2009 | Evans et al. |
| 2009/0157312 A1 | 6/2009 | Black et al. |
| 2009/0158200 A1 | 6/2009 | Palahnuk et al. |
| 2009/0180668 A1 | 7/2009 | Jones et al. |
| 2009/0189373 A1 | 7/2009 | Schramm et al. |
| 2009/0189979 A1 | 7/2009 | Smyth |
| 2009/0195370 A1 | 8/2009 | Huffman et al. |
| 2009/0210257 A1 | 8/2009 | Chalfant et al. |
| 2009/0216935 A1 | 8/2009 | Flick |
| 2009/0222200 A1 | 9/2009 | Link et al. |
| 2009/0224931 A1 | 9/2009 | Dietz et al. |
| 2009/0224942 A1 | 9/2009 | Goudy et al. |
| 2009/0234578 A1 | 9/2009 | Newby et al. |
| 2009/0241883 A1 | 10/2009 | Nagoshi et al. |
| 2009/0254446 A1 | 10/2009 | Chernyak |
| 2009/0264849 A1 | 10/2009 | La Croix |
| 2009/0275321 A1 | 11/2009 | Crowe |
| 2009/0278750 A1 | 11/2009 | Man et al. |
| 2009/0278915 A1 | 11/2009 | Kramer et al. |
| 2009/0279839 A1 | 11/2009 | Nakamura et al. |
| 2009/0284359 A1 | 11/2009 | Huang et al. |
| 2009/0287405 A1 | 11/2009 | Liu et al. |
| 2009/0299572 A1 | 12/2009 | Fujikawa et al. |
| 2009/0312998 A1 | 12/2009 | Berckmans et al. |
| 2009/0319181 A1 | 12/2009 | Khosravy et al. |
| 2010/0008053 A1 | 1/2010 | Osternack et al. |
| 2010/0023204 A1 | 1/2010 | Basir et al. |
| 2010/0035620 A1 | 2/2010 | Naden et al. |
| 2010/0036560 A1 | 2/2010 | Wright et al. |
| 2010/0042498 A1 | 2/2010 | Schalk |
| 2010/0052945 A1 | 3/2010 | Breed |
| 2010/0057337 A1 | 3/2010 | Fuchs |
| 2010/0066498 A1 | 3/2010 | Fenton |
| 2010/0069115 A1 | 3/2010 | Liu |
| 2010/0070338 A1 | 3/2010 | Siotia et al. |
| 2010/0077094 A1 | 3/2010 | Howarter et al. |
| 2010/0087987 A1 | 4/2010 | Huang et al. |
| 2010/0090817 A1 | 4/2010 | Yamaguchi et al. |
| 2010/0097178 A1* | 4/2010 | Pisz ..................... B60R 16/037 340/5.72 |
| 2010/0097239 A1 | 4/2010 | Campbell et al. |
| 2010/0097458 A1 | 4/2010 | Zhang et al. |
| 2010/0106344 A1 | 4/2010 | Edwards et al. |
| 2010/0106418 A1 | 4/2010 | Kindo et al. |
| 2010/0118025 A1 | 5/2010 | Smith et al. |
| 2010/0121570 A1 | 5/2010 | Tokue et al. |
| 2010/0121645 A1 | 5/2010 | Seitz et al. |
| 2010/0125387 A1 | 5/2010 | Sehyun et al. |
| 2010/0125405 A1 | 5/2010 | Chae et al. |
| 2010/0125811 A1 | 5/2010 | Moore et al. |
| 2010/0127847 A1 | 5/2010 | Evans et al. |
| 2010/0131300 A1 | 5/2010 | Collopy et al. |
| 2010/0134958 A1 | 6/2010 | Disaverio et al. |
| 2010/0136944 A1 | 6/2010 | Taylor et al. |
| 2010/0137037 A1 | 6/2010 | Basir |
| 2010/0144284 A1 | 6/2010 | Chutorash et al. |
| 2010/0145700 A1 | 6/2010 | Kennewick et al. |

(56) References Cited

U.S. PATENT DOCUMENTS

| | | |
|---|---|---|
| 2010/0145987 A1 | 6/2010 | Harper et al. |
| 2010/0152976 A1 | 6/2010 | White et al. |
| 2010/0169432 A1 | 7/2010 | Santori et al. |
| 2010/0174474 A1 | 7/2010 | Nagase |
| 2010/0179712 A1 | 7/2010 | Pepitone et al. |
| 2010/0185341 A1 | 7/2010 | Wilson et al. |
| 2010/0188831 A1 | 7/2010 | Ortel |
| 2010/0197359 A1 | 8/2010 | Harris |
| 2010/0202346 A1 | 8/2010 | Sitzes et al. |
| 2010/0211259 A1 | 8/2010 | McClellan |
| 2010/0211282 A1 | 8/2010 | Nakata et al. |
| 2010/0211300 A1 | 8/2010 | Jaffe et al. |
| 2010/0211304 A1 | 8/2010 | Hwang et al. |
| 2010/0211441 A1 | 8/2010 | Sprigg et al. |
| 2010/0217458 A1 | 8/2010 | Schweiger et al. |
| 2010/0222939 A1 | 9/2010 | Namburu et al. |
| 2010/0228404 A1 | 9/2010 | Link et al. |
| 2010/0234071 A1 | 9/2010 | Shabtay et al. |
| 2010/0235042 A1 | 9/2010 | Ying |
| 2010/0235744 A1 | 9/2010 | Schultz |
| 2010/0235891 A1 | 9/2010 | Oglesbee et al. |
| 2010/0250071 A1 | 9/2010 | Pala et al. |
| 2010/0253493 A1 | 10/2010 | Szczerba et al. |
| 2010/0256836 A1 | 10/2010 | Mudalige |
| 2010/0265104 A1 | 10/2010 | Zlojutro |
| 2010/0268426 A1 | 10/2010 | Pathak et al. |
| 2010/0274410 A1 | 10/2010 | Tsien et al. |
| 2010/0280751 A1 | 11/2010 | Breed |
| 2010/0287303 A1 | 11/2010 | Smith et al. |
| 2010/0289632 A1 | 11/2010 | Seder et al. |
| 2010/0289643 A1 | 11/2010 | Trundle et al. |
| 2010/0291427 A1 | 11/2010 | Zhou |
| 2010/0295676 A1 | 11/2010 | Khachaturov et al. |
| 2010/0304640 A1 | 12/2010 | Sofman et al. |
| 2010/0305807 A1 | 12/2010 | Basir et al. |
| 2010/0306080 A1 | 12/2010 | Trandal et al. |
| 2010/0306309 A1 | 12/2010 | Santori et al. |
| 2010/0306435 A1 | 12/2010 | Nigoghosian et al. |
| 2010/0315218 A1 | 12/2010 | Cades et al. |
| 2010/0321151 A1 | 12/2010 | Matsuura et al. |
| 2010/0325626 A1 | 12/2010 | Greschler et al. |
| 2010/0332130 A1 | 12/2010 | Shimizu et al. |
| 2011/0015853 A1 | 1/2011 | DeKock et al. |
| 2011/0018736 A1 | 1/2011 | Carr |
| 2011/0021213 A1 | 1/2011 | Carr |
| 2011/0021234 A1 | 1/2011 | Tibbits et al. |
| 2011/0028138 A1 | 2/2011 | Davies-Moore et al. |
| 2011/0035098 A1 | 2/2011 | Goto et al. |
| 2011/0035141 A1 | 2/2011 | Barker et al. |
| 2011/0040438 A1 | 2/2011 | Kluge et al. |
| 2011/0050589 A1 | 3/2011 | Yan et al. |
| 2011/0053506 A1 | 3/2011 | Lemke et al. |
| 2011/0077808 A1 | 3/2011 | Hyde et al. |
| 2011/0078024 A1 | 3/2011 | Messier et al. |
| 2011/0080282 A1 | 4/2011 | Kleve et al. |
| 2011/0082615 A1 | 4/2011 | Small et al. |
| 2011/0084824 A1 | 4/2011 | Tewari et al. |
| 2011/0090078 A1 | 4/2011 | Kim et al. |
| 2011/0092159 A1 | 4/2011 | Park et al. |
| 2011/0093154 A1 | 4/2011 | Moinzadeh et al. |
| 2011/0093158 A1 | 4/2011 | Theisen et al. |
| 2011/0093438 A1 | 4/2011 | Poulsen |
| 2011/0093846 A1 | 4/2011 | Moinzadeh et al. |
| 2011/0105097 A1 | 5/2011 | Tadayon et al. |
| 2011/0106375 A1 | 5/2011 | Sundaram et al. |
| 2011/0112717 A1 | 5/2011 | Resner |
| 2011/0112969 A1 | 5/2011 | Zaid et al. |
| 2011/0117933 A1 | 5/2011 | Andersson |
| 2011/0119344 A1 | 5/2011 | Eustis |
| 2011/0130915 A1 | 6/2011 | Wright et al. |
| 2011/0134749 A1 | 6/2011 | Speks et al. |
| 2011/0137520 A1 | 6/2011 | Rector et al. |
| 2011/0145331 A1 | 6/2011 | Christie et al. |
| 2011/0172873 A1 | 7/2011 | Szwabowski et al. |
| 2011/0175754 A1 | 7/2011 | Karpinsky |
| 2011/0183658 A1 | 7/2011 | Zellner |
| 2011/0187520 A1 | 8/2011 | Filev et al. |
| 2011/0193707 A1 | 8/2011 | Ngo |
| 2011/0193726 A1 | 8/2011 | Szwabowski et al. |
| 2011/0195699 A1 | 8/2011 | Tadayon et al. |
| 2011/0197187 A1 | 8/2011 | Roh |
| 2011/0205047 A1 | 8/2011 | Patel et al. |
| 2011/0209079 A1 | 8/2011 | Tarte et al. |
| 2011/0210867 A1 | 9/2011 | Benedikt |
| 2011/0212717 A1 | 9/2011 | Rhoads et al. |
| 2011/0221656 A1 | 9/2011 | Haddick et al. |
| 2011/0224865 A1 | 9/2011 | Gordon et al. |
| 2011/0224898 A1 | 9/2011 | Scofield et al. |
| 2011/0225527 A1 | 9/2011 | Law et al. |
| 2011/0227757 A1 | 9/2011 | Chen et al. |
| 2011/0231091 A1 | 9/2011 | Gourlay et al. |
| 2011/0234369 A1 | 9/2011 | Cai et al. |
| 2011/0245999 A1 | 10/2011 | Kordonowy |
| 2011/0246210 A1 | 10/2011 | Matsur |
| 2011/0247013 A1 | 10/2011 | Feller et al. |
| 2011/0251734 A1 | 10/2011 | Schepp et al. |
| 2011/0257973 A1 | 10/2011 | Chutorash et al. |
| 2011/0264916 A1 | 10/2011 | Fischer et al. |
| 2011/0267204 A1 | 11/2011 | Chuang et al. |
| 2011/0267205 A1 | 11/2011 | McClellan et al. |
| 2011/0286676 A1 | 11/2011 | El Dokor |
| 2011/0291886 A1 | 12/2011 | Krieter |
| 2011/0291926 A1 | 12/2011 | Gokturk et al. |
| 2011/0298808 A1 | 12/2011 | Rovik |
| 2011/0301844 A1 | 12/2011 | Aono |
| 2011/0307354 A1 | 12/2011 | Erman et al. |
| 2011/0307570 A1 | 12/2011 | Speks |
| 2011/0309926 A1 | 12/2011 | Eikelenberg et al. |
| 2011/0309953 A1 | 12/2011 | Petite et al. |
| 2011/0313653 A1 | 12/2011 | Lindner |
| 2011/0320089 A1 | 12/2011 | Lewis |
| 2012/0006610 A1 | 1/2012 | Wallace et al. |
| 2012/0010807 A1 | 1/2012 | Zhou |
| 2012/0016581 A1 | 1/2012 | Mochizuki et al. |
| 2012/0029852 A1 | 2/2012 | Goff et al. |
| 2012/0030002 A1 | 2/2012 | Bous et al. |
| 2012/0030512 A1 | 2/2012 | Wadhwa et al. |
| 2012/0038489 A1 | 2/2012 | Goldshmidt |
| 2012/0046822 A1 | 2/2012 | Anderson |
| 2012/0047530 A1 | 2/2012 | Shkedi |
| 2012/0053793 A1 | 3/2012 | Sala et al. |
| 2012/0053888 A1 | 3/2012 | Stahlin et al. |
| 2012/0059789 A1 | 3/2012 | Sakai et al. |
| 2012/0065815 A1 | 3/2012 | Hess |
| 2012/0065834 A1 | 3/2012 | Senart |
| 2012/0068956 A1 | 3/2012 | Jira et al. |
| 2012/0071097 A1 | 3/2012 | Matsushita et al. |
| 2012/0072244 A1 | 3/2012 | Collins et al. |
| 2012/0074770 A1 | 3/2012 | Lee |
| 2012/0083960 A1 | 4/2012 | Zhu et al. |
| 2012/0083971 A1 | 4/2012 | Preston |
| 2012/0084773 A1 | 4/2012 | Lee et al. |
| 2012/0089299 A1 | 4/2012 | Breed |
| 2012/0092251 A1 | 4/2012 | Hashimoto et al. |
| 2012/0101876 A1 | 4/2012 | Truvey et al. |
| 2012/0101914 A1 | 4/2012 | Kumar et al. |
| 2012/0105613 A1 | 5/2012 | Weng et al. |
| 2012/0106114 A1 | 5/2012 | Caron et al. |
| 2012/0109446 A1 | 5/2012 | Yousefi et al. |
| 2012/0109451 A1 | 5/2012 | Tan |
| 2012/0110356 A1 | 5/2012 | Yousefi et al. |
| 2012/0113822 A1 | 5/2012 | Letner |
| 2012/0115446 A1 | 5/2012 | Guatama et al. |
| 2012/0116609 A1 | 5/2012 | Jung et al. |
| 2012/0116678 A1 | 5/2012 | Witmer |
| 2012/0116696 A1 | 5/2012 | Wank |
| 2012/0146766 A1 | 6/2012 | Geisler et al. |
| 2012/0146809 A1 | 6/2012 | Oh et al. |
| 2012/0149341 A1 | 6/2012 | Tadayon et al. |
| 2012/0150651 A1 | 6/2012 | Hoffberg et al. |
| 2012/0155636 A1 | 6/2012 | Muthaiah |
| 2012/0158436 A1 | 6/2012 | Bauer et al. |
| 2012/0173239 A1* | 7/2012 | Sanchez Asenjo ..... B66B 13/26 704/246 |

(56) References Cited

U.S. PATENT DOCUMENTS

| | | |
|---|---|---|
| 2012/0173900 A1 | 7/2012 | Diab et al. |
| 2012/0173905 A1 | 7/2012 | Diab et al. |
| 2012/0179325 A1 | 7/2012 | Faenger |
| 2012/0179547 A1 | 7/2012 | Besore et al. |
| 2012/0188876 A1 | 7/2012 | Chow et al. |
| 2012/0197523 A1 | 8/2012 | Kirsch |
| 2012/0197669 A1 | 8/2012 | Kote et al. |
| 2012/0204166 A1 | 8/2012 | Ichihara |
| 2012/0210160 A1 | 8/2012 | Fuhrman |
| 2012/0215375 A1 | 8/2012 | Chang |
| 2012/0215754 A1 | 8/2012 | Marzani et al. |
| 2012/0217928 A1 | 8/2012 | Kulidjian |
| 2012/0218125 A1 | 8/2012 | Demirdjian et al. |
| 2012/0226413 A1 | 9/2012 | Chen et al. |
| 2012/0238286 A1 | 9/2012 | Mallavarapu et al. |
| 2012/0239242 A1 | 9/2012 | Uehara |
| 2012/0242510 A1 | 9/2012 | Choi et al. |
| 2012/0254763 A1 | 10/2012 | Protopapas et al. |
| 2012/0254804 A1 | 10/2012 | Shema et al. |
| 2012/0259951 A1 | 10/2012 | Schalk et al. |
| 2012/0265359 A1 | 10/2012 | Das |
| 2012/0274459 A1 | 11/2012 | Jaisimha et al. |
| 2012/0274481 A1 | 11/2012 | Ginsberg et al. |
| 2012/0284292 A1 | 11/2012 | Rechsteiner et al. |
| 2012/0289217 A1 | 11/2012 | Reimer et al. |
| 2012/0289253 A1 | 11/2012 | Haag et al. |
| 2012/0296567 A1 | 11/2012 | Breed |
| 2012/0313771 A1 | 12/2012 | Wottlifff, III |
| 2012/0316720 A1 | 12/2012 | Hyde et al. |
| 2012/0317561 A1 | 12/2012 | Aslam et al. |
| 2012/0323413 A1 | 12/2012 | Kedar-Dongarkar et al. |
| 2012/0327231 A1 | 12/2012 | Cochran et al. |
| 2013/0005263 A1 | 1/2013 | Sakata |
| 2013/0005414 A1 | 1/2013 | Bindra et al. |
| 2013/0013157 A1 | 1/2013 | Kim et al. |
| 2013/0019252 A1 | 1/2013 | Haase et al. |
| 2013/0024060 A1 | 1/2013 | Sukkarie et al. |
| 2013/0030645 A1 | 1/2013 | Divine et al. |
| 2013/0030811 A1 | 1/2013 | Olleon et al. |
| 2013/0031540 A1 | 1/2013 | Throop et al. |
| 2013/0031541 A1 | 1/2013 | Wilks et al. |
| 2013/0035063 A1 | 2/2013 | Fisk et al. |
| 2013/0046624 A1 | 2/2013 | Calman |
| 2013/0050069 A1 | 2/2013 | Ota |
| 2013/0055096 A1 | 2/2013 | Kim et al. |
| 2013/0059607 A1 | 3/2013 | Herz et al. |
| 2013/0063336 A1 | 3/2013 | Sugimoto et al. |
| 2013/0066512 A1 | 3/2013 | Willard et al. |
| 2013/0067599 A1 | 3/2013 | Raje et al. |
| 2013/0075530 A1 | 3/2013 | Shander et al. |
| 2013/0079964 A1 | 3/2013 | Sukkarie et al. |
| 2013/0083805 A1 | 4/2013 | Lu et al. |
| 2013/0085787 A1 | 4/2013 | Gore et al. |
| 2013/0086164 A1 | 4/2013 | Wheeler et al. |
| 2013/0099915 A1 | 4/2013 | Prasad et al. |
| 2013/0103196 A1 | 4/2013 | Monceaux et al. |
| 2013/0105264 A1 | 5/2013 | Ruth et al. |
| 2013/0116882 A1 | 5/2013 | Link et al. |
| 2013/0116915 A1 | 5/2013 | Ferreira et al. |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0139140 A1 | 5/2013 | Rao et al. |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0151288 A1 | 6/2013 | Bowne et al. |
| 2013/0152003 A1 | 6/2013 | Ricci et al. |
| 2013/0154298 A1 | 6/2013 | Ricci |
| 2013/0157640 A1 | 6/2013 | Aycock |
| 2013/0157647 A1 | 6/2013 | Kolodziej |
| 2013/0158778 A1 | 6/2013 | Tengler et al. |
| 2013/0158821 A1 | 6/2013 | Ricci |
| 2013/0166096 A1 | 6/2013 | Jotanovic |
| 2013/0166097 A1 | 6/2013 | Ricci |
| 2013/0166098 A1 | 6/2013 | Lavie et al. |
| 2013/0166152 A1 | 6/2013 | Butterworth |
| 2013/0166208 A1 | 6/2013 | Forstall et al. |
| 2013/0167159 A1 | 6/2013 | Ricci et al. |
| 2013/0173531 A1 | 7/2013 | Rinearson et al. |
| 2013/0179163 A1* | 7/2013 | Herbig .................. H04R 27/00 704/233 |
| 2013/0179689 A1 | 7/2013 | Matsumoto et al. |
| 2013/0190978 A1 | 7/2013 | Kato et al. |
| 2013/0194108 A1 | 8/2013 | Lapiotis et al. |
| 2013/0197796 A1 | 8/2013 | Obradovich et al. |
| 2013/0198031 A1 | 8/2013 | Mitchell et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204455 A1 | 8/2013 | Chia et al. |
| 2013/0204457 A1 | 8/2013 | King |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0207794 A1 | 8/2013 | Patel et al. |
| 2013/0212065 A1 | 8/2013 | Rahnama |
| 2013/0212659 A1 | 8/2013 | Maher et al. |
| 2013/0215116 A1 | 8/2013 | Siddique et al. |
| 2013/0218412 A1 | 8/2013 | Ricci |
| 2013/0218445 A1 | 8/2013 | Basir |
| 2013/0219039 A1 | 8/2013 | Ricci |
| 2013/0226365 A1 | 8/2013 | Brozovich |
| 2013/0226371 A1 | 8/2013 | Rovik et al. |
| 2013/0226392 A1 | 8/2013 | Schneider et al. |
| 2013/0226449 A1 | 8/2013 | Rovik et al. |
| 2013/0226622 A1 | 8/2013 | Adamson et al. |
| 2013/0227648 A1 | 8/2013 | Ricci |
| 2013/0231784 A1 | 9/2013 | Rovik et al. |
| 2013/0231800 A1 | 9/2013 | Ricci |
| 2013/0232142 A1 | 9/2013 | Nielsen et al. |
| 2013/0238165 A1 | 9/2013 | Garrett et al. |
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0261871 A1 | 10/2013 | Hobbs et al. |
| 2013/0261966 A1 | 10/2013 | Wang et al. |
| 2013/0265178 A1 | 10/2013 | Tengler et al. |
| 2013/0274997 A1 | 10/2013 | Chien |
| 2013/0279111 A1 | 10/2013 | Lee |
| 2013/0279491 A1 | 10/2013 | Rubin et al. |
| 2013/0282238 A1 | 10/2013 | Ricci et al. |
| 2013/0282357 A1 | 10/2013 | Rubin et al. |
| 2013/0282946 A1 | 10/2013 | Ricci |
| 2013/0288606 A1 | 10/2013 | Kirsch |
| 2013/0293364 A1 | 11/2013 | Ricci et al. |

(56) References Cited

U.S. PATENT DOCUMENTS

| | | |
|---|---|---|
| 2013/0293452 A1 | 11/2013 | Ricci et al. |
| 2013/0293480 A1 | 11/2013 | Kritt et al. |
| 2013/0295901 A1 | 11/2013 | Abramson et al. |
| 2013/0295908 A1 | 11/2013 | Zeinstra et al. |
| 2013/0295913 A1 | 11/2013 | Matthews et al. |
| 2013/0300554 A1 | 11/2013 | Braden |
| 2013/0301584 A1 | 11/2013 | Addepalli et al. |
| 2013/0304371 A1 | 11/2013 | Kitatani et al. |
| 2013/0308265 A1 | 11/2013 | Arnouse |
| 2013/0309977 A1 | 11/2013 | Heines et al. |
| 2013/0311038 A1 | 11/2013 | Kim et al. |
| 2013/0325453 A1 | 12/2013 | Levien et al. |
| 2013/0325568 A1 | 12/2013 | Mangalvedkar et al. |
| 2013/0329372 A1 | 12/2013 | Wilkins |
| 2013/0332023 A1 | 12/2013 | Bertosa et al. |
| 2013/0338914 A1 | 12/2013 | Weiss |
| 2013/0339027 A1 | 12/2013 | Dokor et al. |
| 2013/0345929 A1 | 12/2013 | Bowden et al. |
| 2014/0028542 A1 | 1/2014 | Lovitt et al. |
| 2014/0032014 A1 | 1/2014 | DeBiasio et al. |
| 2014/0054957 A1 | 2/2014 | Bellis |
| 2014/0058672 A1 | 2/2014 | Wansley et al. |
| 2014/0066014 A1 | 3/2014 | Nicholson et al. |
| 2014/0067201 A1 | 3/2014 | Visintainer et al. |
| 2014/0067564 A1 | 3/2014 | Yuan |
| 2014/0070917 A1 | 3/2014 | Protopapas |
| 2014/0081544 A1 | 3/2014 | Fry |
| 2014/0088798 A1 | 3/2014 | Himmelstein |
| 2014/0096068 A1 | 4/2014 | Dewan et al. |
| 2014/0097955 A1 | 4/2014 | Lovitt et al. |
| 2014/0109075 A1 | 4/2014 | Hoffman et al. |
| 2014/0109080 A1 | 4/2014 | Ricci |
| 2014/0120829 A1 | 5/2014 | Bhamidipati et al. |
| 2014/0121862 A1 | 5/2014 | Zarrella et al. |
| 2014/0125802 A1 | 5/2014 | Beckert et al. |
| 2014/0143839 A1 | 5/2014 | Ricci |
| 2014/0164611 A1 | 6/2014 | Molettiere et al. |
| 2014/0168062 A1 | 6/2014 | Katz et al. |
| 2014/0168436 A1 | 6/2014 | Pedicino |
| 2014/0169621 A1 | 6/2014 | Burr |
| 2014/0171752 A1 | 6/2014 | Park et al. |
| 2014/0172727 A1 | 6/2014 | Abhyanker et al. |
| 2014/0188533 A1 | 7/2014 | Davidson |
| 2014/0195272 A1 | 7/2014 | Sadiq et al. |
| 2014/0198216 A1 | 7/2014 | Zhai et al. |
| 2014/0200737 A1 | 7/2014 | Lortz et al. |
| 2014/0207328 A1 | 7/2014 | Wolf et al. |
| 2014/0220966 A1 | 8/2014 | Muetzel et al. |
| 2014/0222298 A1 | 8/2014 | Gurin |
| 2014/0223384 A1 | 8/2014 | Graumann |
| 2014/0240089 A1 | 8/2014 | Chang |
| 2014/0244078 A1 | 8/2014 | Downey et al. |
| 2014/0244111 A1 | 8/2014 | Gross et al. |
| 2014/0244156 A1 | 8/2014 | Magnusson et al. |
| 2014/0245277 A1 | 8/2014 | Petro et al. |
| 2014/0245278 A1 | 8/2014 | Zellen |
| 2014/0245284 A1 | 8/2014 | Alrabady et al. |
| 2014/0252091 A1 | 9/2014 | Morse et al. |
| 2014/0257627 A1 | 9/2014 | Hagan, Jr. |
| 2014/0267035 A1 | 9/2014 | Schalk et al. |
| 2014/0277936 A1 | 9/2014 | El Dokor et al. |
| 2014/0278070 A1 | 9/2014 | McGavran et al. |
| 2014/0278071 A1 | 9/2014 | San Filippo et al. |
| 2014/0281971 A1 | 9/2014 | Isbell, III et al. |
| 2014/0282161 A1 | 9/2014 | Cash |
| 2014/0282278 A1 | 9/2014 | Anderson et al. |
| 2014/0282470 A1 | 9/2014 | Buga et al. |
| 2014/0282931 A1 | 9/2014 | Protopapas |
| 2014/0292545 A1 | 10/2014 | Nemoto |
| 2014/0292665 A1 | 10/2014 | Lathrop et al. |
| 2014/0303899 A1 | 10/2014 | Fung |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306833 A1 | 10/2014 | Ricci |
| 2014/0306834 A1 | 10/2014 | Ricci |
| 2014/0306835 A1 | 10/2014 | Ricci |
| 2014/0307655 A1 | 10/2014 | Ricci |
| 2014/0307724 A1 | 10/2014 | Ricci |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309805 A1 | 10/2014 | Ricci |
| 2014/0309806 A1 | 10/2014 | Ricci |
| 2014/0309813 A1 | 10/2014 | Ricci |
| 2014/0309814 A1 | 10/2014 | Ricci et al. |
| 2014/0309815 A1 | 10/2014 | Ricci et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |
| 2014/0310594 A1 | 10/2014 | Ricci et al. |
| 2014/0310610 A1 | 10/2014 | Ricci |
| 2014/0310702 A1 | 10/2014 | Ricci et al. |
| 2014/0310739 A1 | 10/2014 | Ricci et al. |
| 2014/0310788 A1 | 10/2014 | Ricci |
| 2014/0322676 A1 | 10/2014 | Raman |
| 2014/0347207 A1 | 11/2014 | Zeng et al. |
| 2014/0347265 A1 | 11/2014 | Allen et al. |
| 2015/0007155 A1 | 1/2015 | Hoffman et al. |
| 2015/0012186 A1 | 1/2015 | Horseman |
| 2015/0032366 A1 | 1/2015 | Man et al. |
| 2015/0032670 A1 | 1/2015 | Brazell |
| 2015/0057839 A1 | 2/2015 | Chang et al. |
| 2015/0061895 A1 | 3/2015 | Ricci |
| 2015/0081133 A1 | 3/2015 | Schulz |
| 2015/0081167 A1 | 3/2015 | Pisz et al. |
| 2015/0088423 A1 | 3/2015 | Tuukkanen |

(56) References Cited

U.S. PATENT DOCUMENTS

| | | | |
|---|---|---|---|
| 2015/0088515 | A1 | 3/2015 | Beaumont et al. |
| 2015/0095352 | A1* | 4/2015 | Lacey .................... G06Q 20/02 707/752 |
| 2015/0116200 | A1 | 4/2015 | Kurosawa et al. |
| 2015/0158499 | A1 | 6/2015 | Koravadi |
| 2015/0161832 | A1 | 6/2015 | Esselink et al. |
| 2015/0163306 | A1 | 6/2015 | Nakagawa |
| 2015/0178034 | A1 | 6/2015 | Penilla et al. |
| 2015/0180840 | A1 | 6/2015 | Jung et al. |
| 2015/0333910 | A1* | 11/2015 | Kirdahy ................ H04L 9/3234 713/186 |
| 2016/0008985 | A1 | 1/2016 | Kim et al. |
| 2016/0039356 | A1* | 2/2016 | Talwar .................... H04R 3/00 381/86 |
| 2016/0070527 | A1 | 3/2016 | Ricci |
| 2016/0086391 | A1 | 3/2016 | Ricci |
| 2016/0197932 | A1 | 7/2016 | Hoffman et al. |
| 2016/0269456 | A1 | 9/2016 | Ricci |
| 2016/0269469 | A1 | 9/2016 | Ricci |
| 2016/0313715 | A1 | 10/2016 | Fischer et al. |
| 2017/0053460 | A1 | 2/2017 | Hauser et al. |
| 2017/0093866 | A1 | 3/2017 | Ben-Noon et al. |
| 2017/0142101 | A1* | 5/2017 | Connell, II ......... H04L 63/0861 |
| 2017/0150256 | A1* | 5/2017 | Christoph .............. H04R 3/005 |
| 2018/0012433 | A1 | 1/2018 | Ricci |
| 2018/0048473 | A1 | 2/2018 | Miller et al. |
| 2018/0113702 | A1 | 4/2018 | Elizalde et al. |
| 2018/0136658 | A1* | 5/2018 | Huai .................... G05D 1/0214 |
| 2018/0151005 | A1 | 5/2018 | Ahn et al. |
| 2018/0198846 | A1 | 7/2018 | Srinivasan et al. |
| 2018/0279119 | A1 | 9/2018 | Eftimovski et al. |
| 2019/0028448 | A1 | 1/2019 | Farrell |

FOREIGN PATENT DOCUMENTS

| | | |
|---|---|---|
| CN | 101303878 | 11/2008 |
| CN | 102467827 | 5/2012 |
| EP | 1223567 | 7/2002 |
| EP | 1484729 | 12/2004 |
| EP | 2192015 | 6/2010 |
| JP | 2004-284450 | 10/2004 |
| KR | 2006-0128484 | 12/2006 |
| WO | WO 2007/126204 | 11/2007 |
| WO | WO 2012/102879 | 8/2012 |
| WO | WO 2013/074866 | 5/2013 |
| WO | WO 2013/074867 | 5/2013 |
| WO | WO 2013/074868 | 5/2013 |
| WO | WO 2013/074897 | 5/2013 |
| WO | WO 2013/074899 | 5/2013 |
| WO | WO 2013/074901 | 5/2013 |
| WO | WO 2013/074919 | 5/2013 |
| WO | WO 2013/074981 | 5/2013 |
| WO | WO 2013/074983 | 5/2013 |
| WO | WO 2013/075005 | 5/2013 |
| WO | WO 2013/181310 | 12/2013 |
| WO | WO 2014/014862 | 1/2014 |
| WO | WO 2014/143563 | 9/2014 |
| WO | WO 2014/158667 | 10/2014 |
| WO | WO 2014/158672 | 10/2014 |
| WO | WO 2014/158766 | 10/2014 |
| WO | WO 2014/172312 | 10/2014 |
| WO | WO 2014/172313 | 10/2014 |
| WO | WO 2014/172316 | 10/2014 |
| WO | WO 2014/172320 | 10/2014 |
| WO | WO 2014/172322 | 10/2014 |
| WO | WO 2014/172323 | 10/2014 |
| WO | WO 2014/172327 | 10/2014 |
| WO | WO 2016/145073 | 9/2016 |
| WO | WO 2016/145100 | 9/2016 |

OTHER PUBLICATIONS

U.S. Appl. No. 15/406,138, filed Jan. 13, 2017, Newman.
U.S. Appl. No. 15/414,897, filed Jan. 25, 2017, Chen et al.
"Electronic Product Code," Wikipedia, retrieved from https://en.wikipedia.org/wiki/Electronic_Product_Code, retrieved on Dec. 9, 2016, 4 pages.
"Multi-factor authentication," Wikipedia, retrieved from https://en.wikipedia.org/wiki/Multi-factor_authentication, retrieved on Dec. 9, 2016, 6 pages.
"Nexus 10 Guidebook for Android," Google Inc., © 2012, Edition 1.2, 166 pages.
"Product code," Wikipedia, retrieved from https://en.wikipedia.org/wiki/Product_code, retrieved on Dec. 9, 2016, 1 page.
"Radio-frequency identification," Wikipedia, retrieved from https://en.wikipedia.org/wiki/Radio-frequency_identification, retrieved on Dec. 9, 2016, 23 pages.
"Self-Driving: Self-Driving Autonomous Cars," available at http://www.automotivetechnologies.com/autonomous-self-driving-cars, accessed Dec. 2016, 9 pages.
Amor-Segan et al., "Towards the Self Healing Vehicle," Automotive Electronics, Jun. 2007, 2007 3rd Institution of Engineering and Technology Conference, 7 pages.
Bennett, "Meet Samsung's Version of Apple AirPlay," CNET.com, Oct. 10, 2012, 11 pages.
Cairnie et al., "Using Finger-Pointing to Operate Secondary Controls in Automobiles," Proceedings of the IEEE Intelligent Vehicles Symposium 2000, Oct. 3-5, 2000, 6 pages.
Clark, "How Self-Driving Cars Work: The Nuts and Bolts Behind Google's Autonomous Car Program," Feb. 21, 2015, available at http://www.makeuseof.com/tag/how-self-driving-cars-work-the-nuts-and-bolts-behind-googles-autonomous-car-program/, 9 pages.
Deaton et al., "How Driverless Cars Will Work," Jul. 1, 2008, HowStuffWorks.com. <http://auto.howstuffworks.com/under-the-hood/trends-innovations/driverless-car.htm> Sep. 18, 2017, 10 pages.
Dumbaugh, "Safe Streets, Livable Streets: A Positive Approach to urban Roadside Design," Ph.D. dissertation for School of Civil & Environ. Engr., Georgia Inst. of Technology, Dec. 2005, 235 pages.
Fei et al., "A QoS-aware Dynamic Bandwidth Allocation Algorithm for Relay Stations in IEEE 802.16j-based Vehicular Networks," Proceedings of the 2010 IEEE Global Telecommunications Conference, Dec. 10, 2010, 10 pages.
Ge et al., "Optimal Relay Selection in IEEE 802.16j Multihop Relay Vehicular Networks," IEEE Transactions on Vehicular Technology, 2010, vol. 59(5), pp. 2198-2206.
Guizzo, Erico, "How Google's Self-Driving Car Works," Oct. 18, 2011, available at https://spectrum.ieee.org/automaton/robotics/artificial-intelligence/how-google-self-driving-car-works, 5 pages.
Heer et al., "ALPHA: An Adaptive and Lightweight Protocol for Hop-by-hop Authentication," Proceedings of CoNEXT 2008, Dec. 2008, pp. 1-12.
Jahnich et al., "Towards a Middleware Approach for a Self-Configurable Automotive Embedded System," International Federation for Information Processing, 2008, pp. 55-65.
Persson "Adaptive Middleware for Self-Configurable Embedded Real-Time Systems," KTH Industrial Engineering and Management, 2009, pp. iii-71 and references.
Raychaudhuri et al., "Emerging Wireless Technologies and the Future Mobile Internet," p. 48, Cambridge Press, 2011, 3 pages.
Stephens, Leah, "How Driverless Cars Work," Interesting Engineering, Apr. 28, 2016, available at haps://interestingengineering.com/driverless-cars-work/, 7 pages.
Stoller, "Leader Election in Distributed Systems with Crash Failures," Indiana University, 1997, pp. 1-15.
Strunk et al., "The Elements of Style," 3d ed., Macmillan Publishing Co., 1979, 3 pages.
Suwatthikul, "Fault detection and diagnosis for in-vehicle networks," Intech, 2010, pp. 283-286 [retrieved from: www.intechopen.com/books/fault-detection-and-diagnosis-for-in-vehicle-networks].
Walter et al., "The smart car seat: personalized monitoring of vital signs in automotive applications." Personal and Ubiquitous Computing, Oct. 2011, vol. 15, No. 7, pp. 707-715.
Wolf et al., "Design, Implementation, and Evaluation of a Vehicular Hardware Security Module," ICISC'11 Proceedings of the 14th Int'l Conf. Information Security & Cryptology, Springer-Verlag Berlin, Heidelberg, 2011, pp. 302-318.

(56) References Cited

OTHER PUBLICATIONS

Notice of Allowance for U.S. Appl. No. 15/339,599, dated Dec. 20, 2017, 9 pages.
Official Action for U.S. Appl. No. 15/406,138, dated Jul. 13, 2017, 6 pages.
Official Action for U.S. Appl. No. 15/406,138, dated Dec. 28, 2017, 7 pages.
Notice of Allowance for U.S. Appl. No. 15/406,138, dated May 7, 2018, 5 pages.
Notice of Allowance for U.S. Appl. No. 15/339,599, dated Feb. 2, 2018, 8 pages.
Official Action for U.S. Appl. No. 15/414,897, dated Nov. 19, 2018, 14 pages.
Final Action for U.S. Appl. No. 15/414,897, dated Jun. 4, 2019, 15 pages.

\* cited by examiner

*Fig. 17A*

| UserID | VoiceprintID | Permissions | Version |
|---|---|---|---|
| ALEX | 702052 | 5 | 02:02:2015:1247 |
| EMILY | 805463 | 10 | 02:03:2015:0752 |
| LESLIE | 135847 | 15 | 02:02:2015:0749 |

*Fig. 17B*

| UserID | VoiceprintID | Version |
|---|---|---|
| ALEX | 702052 | 02:02:2015:1247 |
| EMILY | 805463 | 02:04:2015:1552 |
| DIEGO | 750643 | 02:03:2015:0753 |
| LESLIE | 135847 | 02:02:2015:0749 |

*Fig. 17C*

|   | A | B | C | D | E |
|---|---|---|---|---|---|
| X | 1 | 1 | 0 | 0 | 0 |
| Y | 0 | 0 | 1 | 1 | 0 |
| Z | 0 | 0 | 0 | 1 | 1 |

*Fig. 17D*

| VoiceprintID | UserID | Vehicle Association |
|---|---|---|
| 321564 | A | 100 |
| 486123 | B | 100 |
| 894462 | C | 010 |
| 789426 | D | 011 |
| 736415 | E | 001 |

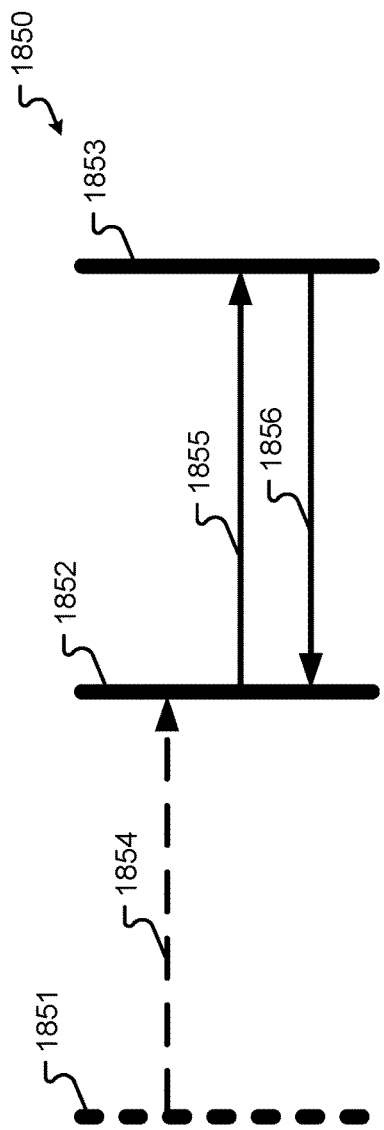
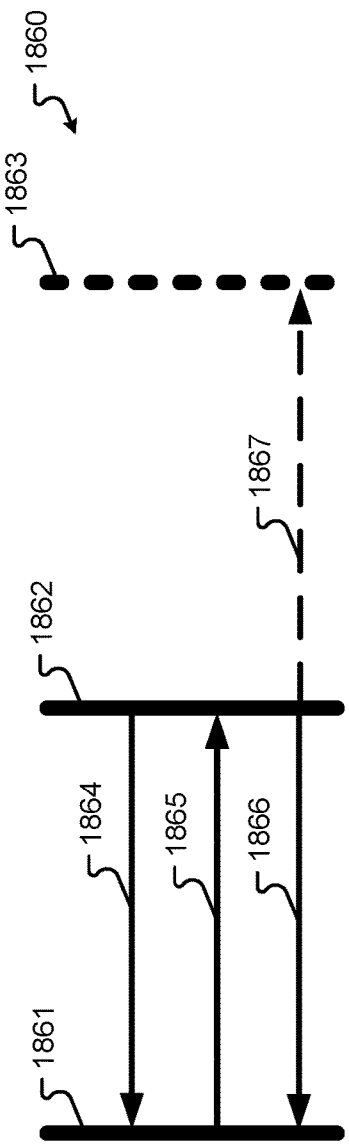
Fig. 18E
Fig. 18F

| Local Result | Cloud Result | Result |
|---|---|---|
| High Yes : UID702052 | High Yes : UID702052 | Success |
| High Yes : UID702052 | High Yes : UID415349 | Retry |
| Acceptable: UID702052 | High Yes : UID702052 | Success |
| Acceptable: UID702052 | High Yes : UID415349 | Retry |
| No Match | High Yes : UID702052 | Retry |
| High Yes: Any Associated UID | Acceptable: Any Associated UID | Retry |
| Acceptable: Any Associated UID | Acceptable: Any Associated UID | Retry |
| No Match | Acceptable: Any Associated UID | Retry |
| High Yes: Any Associated UID | No Match | Retry |
| Acceptable: Any Associated UID | No Match | Failure |
| No Match | No Match | Failure |
| High Match: Any Associated UID | No response | Success |
| Acceptable: Any Associated UID | No response | Retry |
| No Match | No response | Failure |

*Fig. 20B*

VOICE BIOMETRIC PRE-PURCHASE ENROLLMENT FOR AUTONOMOUS VEHICLES

FIELD

The present disclosure relates generally to speech or voice recognition systems and more particularly to the verification of users of a vehicle by speech or voice recognition.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

Since the invention of the modern vehicle, the efficiency and the simplicity of the use of vehicles has been an ongoing focus in the design of vehicles. As technology becomes more complex, more improvements are constantly being made to improve user interaction with vehicles. While the use of cars has greatly increased the efficiency of human travel, along with the benefits comes a number of criminal and negligent behavior stemming from unauthorized use of vehicles. Due to such criminal and negligent behavior, the right to use a particular vehicle is increasingly important.

Protecting vehicles from theft and other unauthorized use is a constant concern for vehicle manufacturers. Balancing the concerns for ease and efficiency of use by the car owner and other authorized users with the concerns for vehicle protection typically comes at a cost. Modern vehicles typically use keys which must be held by a user near the vehicle. For a person to unlock and/or drive the vehicle, he or she must have possession of the keys.

Modern vehicles are more and more being used autonomously, i.e. via self-driving. It is now possible for a vehicle to travel without the assistance of a human driver. Modern vehicles are also more and more being shared. For example, ride-sharing services (e.g. Uber and/or Lyft) have made the thought of having a stranger in the backseat of a person's car go from a nightmare to a money-making opportunity. Modern commerce is also advancing. More and more items are being bought and sold online.

Vehicle manufacturers must adapt to the changing marketplace. Modern technology lacks a simple way to allow users to share vehicles automatically, that is, without the physical sharing of keys.

Modern authentication techniques, such as passwords, PINs, etc. are easily forgotten and are not easily changed when a user gains or loses permissions. As a result, such methods and techniques are inefficient and a burden to users.

Modern cars have the technology to autonomously drive to locations without human input, however the identification and verification of users with authority to control the vehicle is an area lacking an efficient solution.

Accordingly, there is a need for a method and system of authenticating users without requiring physical tools such as keys or mental burdens such as memorized passwords. Moreover, the solution should be seamless and effortless, allowing for maximum user efficiency and customer satisfaction.

BRIEF DESCRIPTION OF THE DRAWINGS

FIG. 17A illustrates a database in accordance with embodiments of the present disclosure;

FIG. 17B illustrates a database in accordance with embodiments of the present disclosure;

FIG. 17C illustrates a database in accordance with embodiments of the present disclosure;

FIG. 17D illustrates a database in accordance with embodiments of the present disclosure;

FIG. 18E illustrates a flow of data between entities in accordance with embodiments of the present disclosure;

FIG. 18F illustrates a flow of data between entities in accordance with embodiments of the present disclosure;

FIG. 20B illustrates a database in accordance with embodiments of the present disclosure;

DETAILED DESCRIPTION

Embodiments of the present disclosure will be described in connection with a vehicle, and in some embodiments, an electric vehicle, rechargeable electric vehicle, and/or hybrid-electric vehicle and associated systems.

The methods and systems presented herein meet these needs by providing systems and methods for the use of voice biometric analysis inside, outside, and remotely from a vehicle to grant authorization and permissions to users of multiple vehicles. Additionally, the methods and systems presented herein provide ways to grant authorization to users prior to a vehicle being delivered or even purchased by the user.

By using voice biometric analysis technology, the need for complicated alphanumeric passwords and PIN numbers may be eliminated. Furthermore, voice biometrics allows for the elimination of the need of a physical key for accessing and operating a vehicle.

There are a number of kind of applications that very much depend on very accurate identity of the occupants and perhaps their location inside the car. Voice biometrics, using a network of microphones inside the car offer a solution offering an extremely efficient system.

Embodiments of the present disclosure offer several ways of identifying the occupants using voice biometrics in addition to existing methods for example key fobs, Bluetooth® connectivity, smartphone applications, telephone calls, etc.

Figure 1:
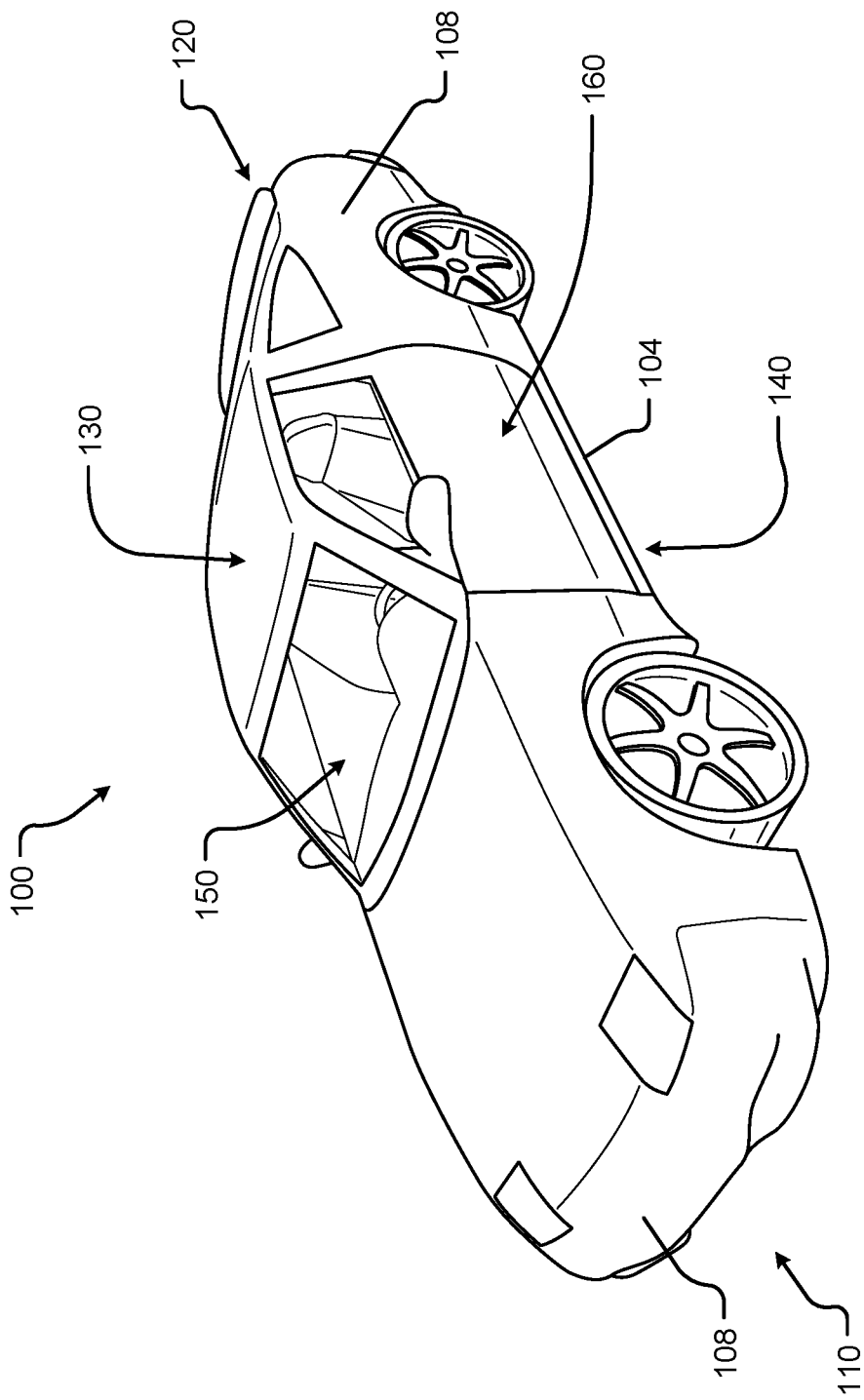
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
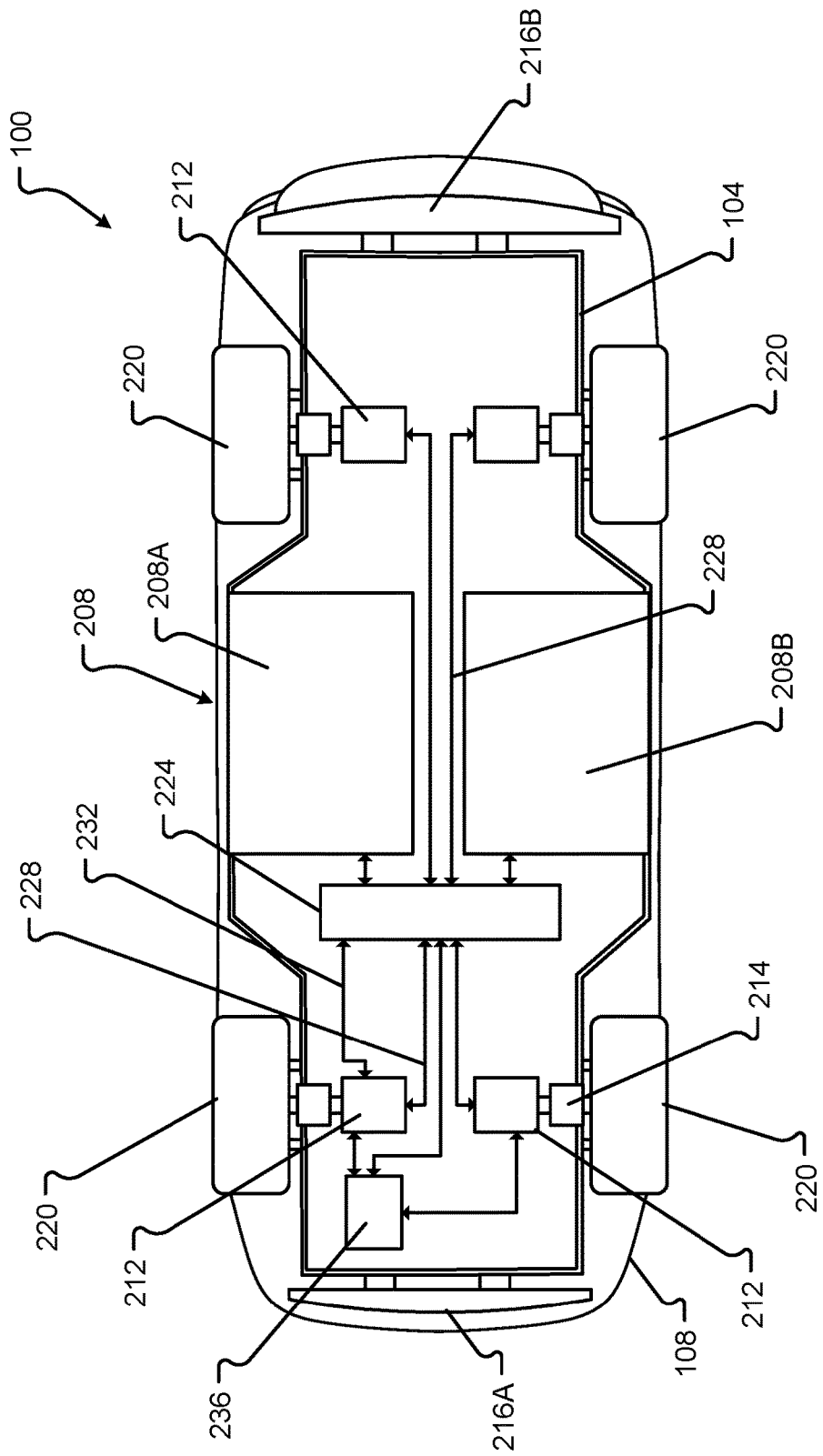
FIG. 2 shows a plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
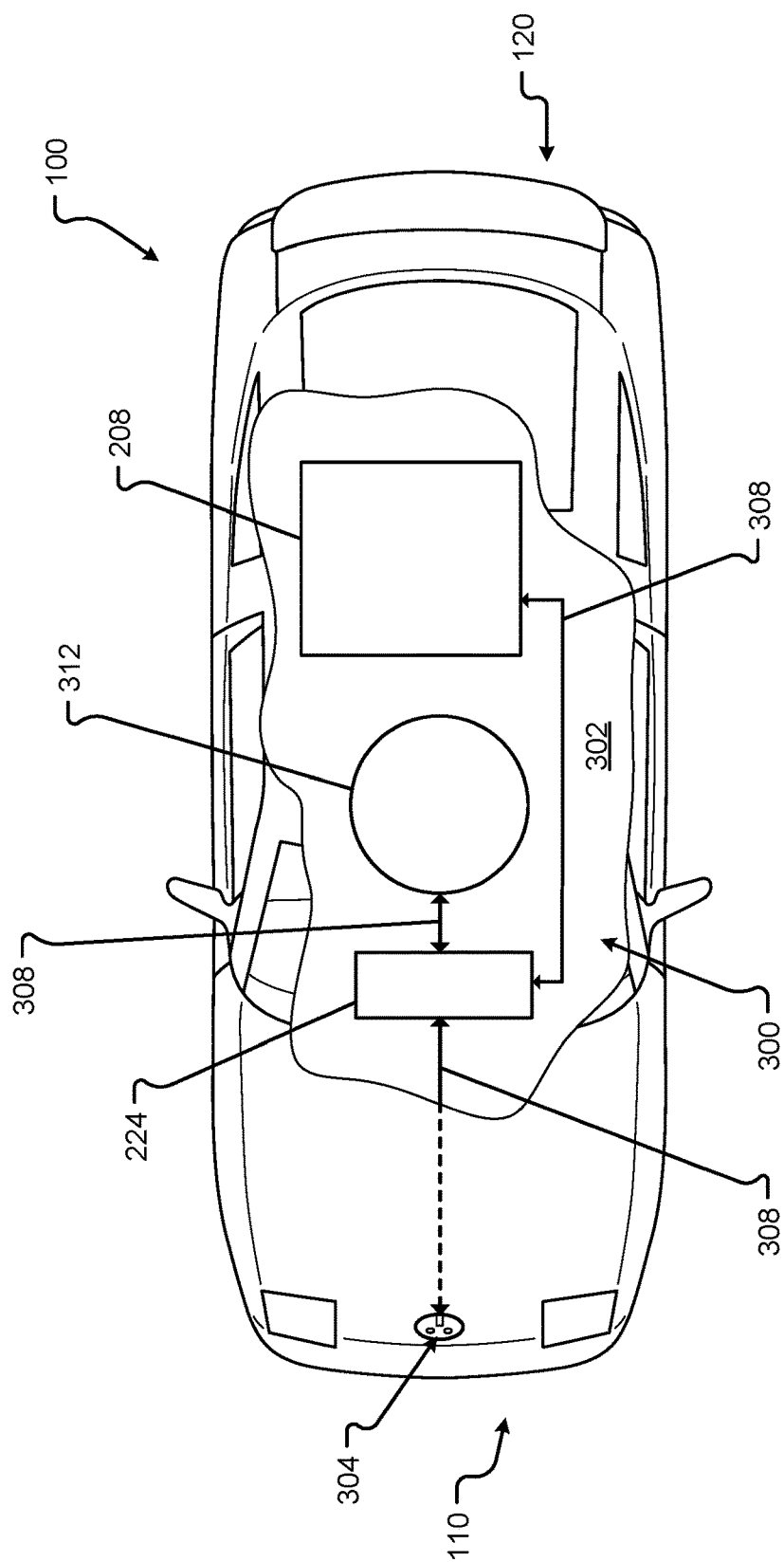
FIG. 3 shows a plan view of the vehicle in accordance with embodiments of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
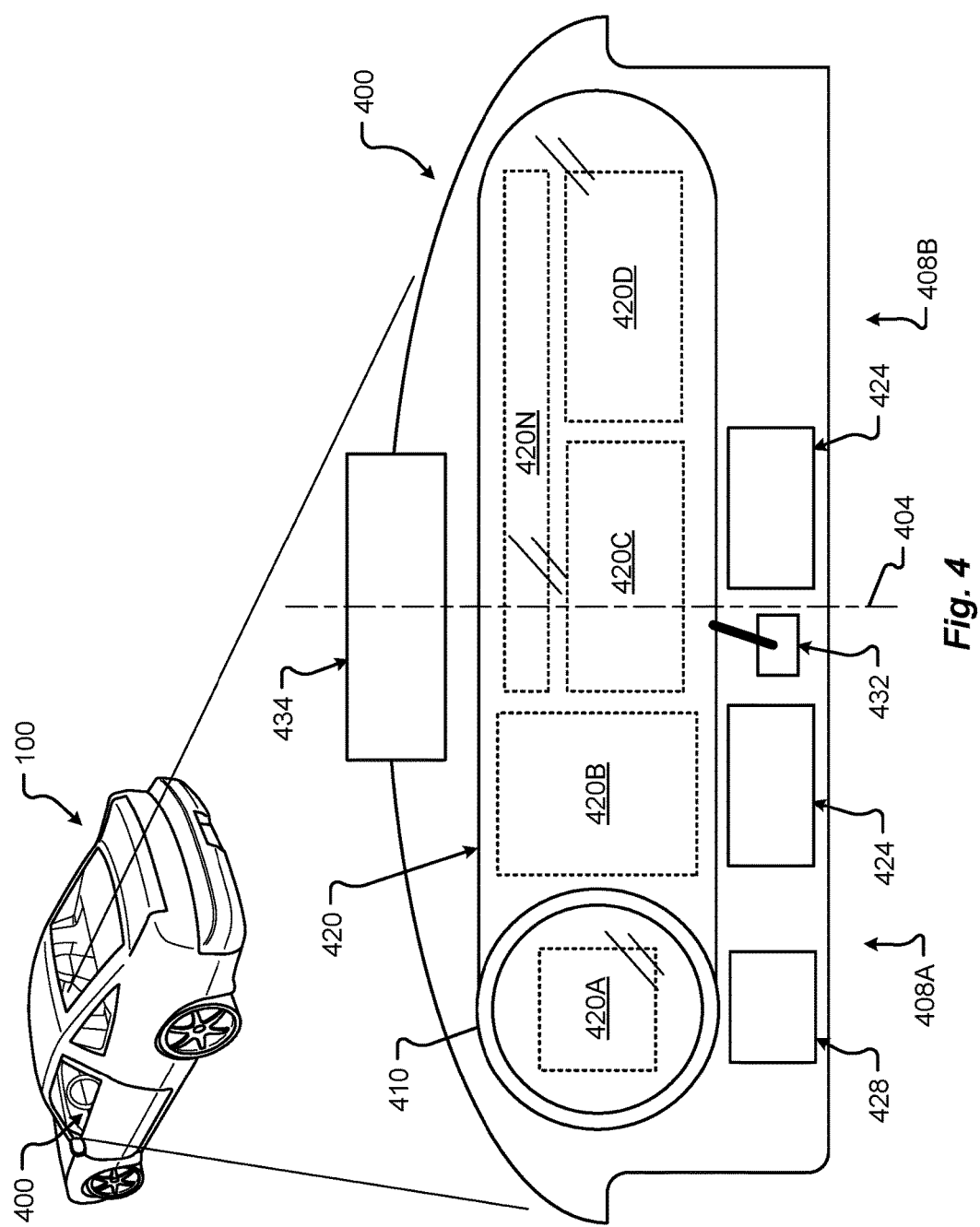
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
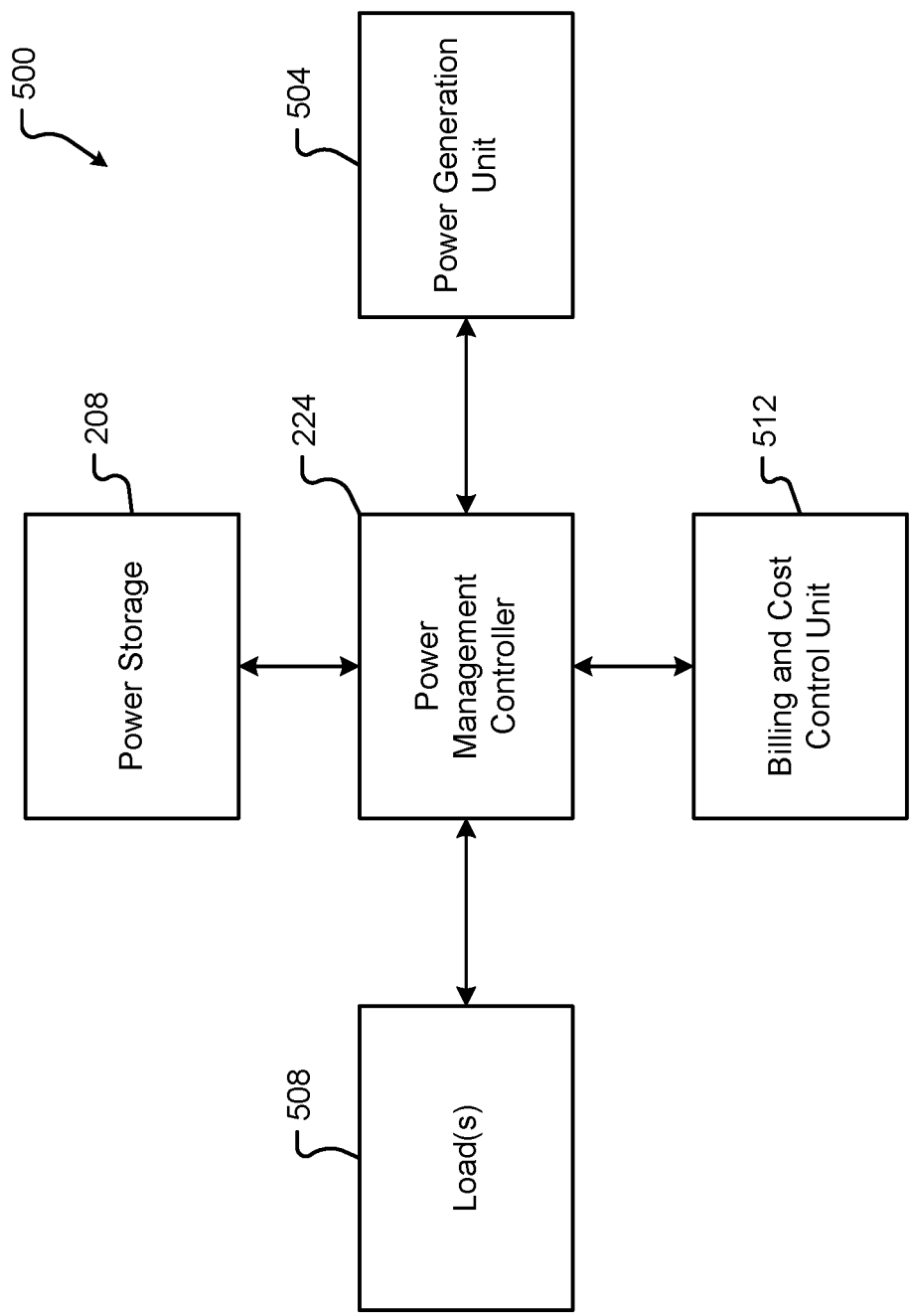
FIG. 5 is a block diagram of an embodiment of an electrical system of the vehicle.

An embodiment of the electrical system 500 associated with the vehicle 100 may be as shown in FIG. 5. The electrical system 500 can include power source(s) that generate power, power storage that stores power, and/or load(s) that consume power. Power sources may be associated with a power generation unit 504. Power storage may be associated with a power storage system 208. Loads may be associated with loads 508. The electrical system 500 may be managed by a power management controller 224. Further, the electrical system 500 can include one or more other interfaces or controllers, which can include the billing and cost control unit 512.

Figure 6:
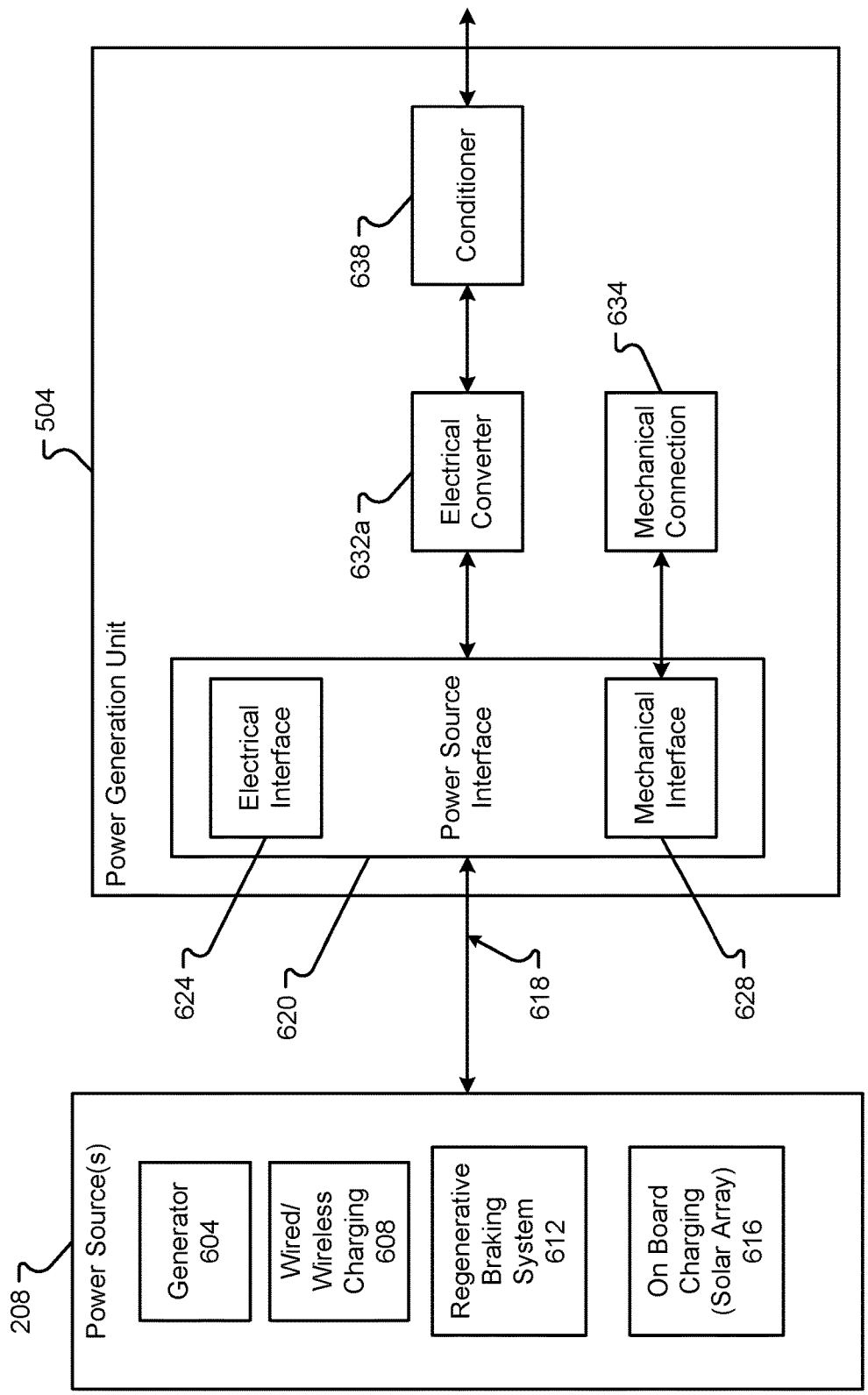
FIG. 6 is a block diagram of an embodiment of a power generation unit associated with the electrical system of the vehicle.

The power generation unit 504 may be as described in conjunction with FIG. 6. The power storage component 208 may be as described in conjunction with FIG. 7. The loads 508 may be as described in conjunction with FIG. 8.

The billing and cost control unit 512 may interface with the power management controller 224 to determine the amount of charge or power provided to the power storage 208 through the power generation unit 504. The billing and cost control unit 512 can then provide information for billing the vehicle owner. Thus, the billing and cost control unit 512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 224 can be a computer or computing system(s) and/or electrical system with associated components, as described herein, capable of managing the power generation unit 504 to receive power, routing the power to the power storage 208, and then providing the power from either the power generation unit 504 and/or the power storage 208 to the loads 508. Thus, the power management controller 224 may execute programming that controls switches, devices, components, etc. involved in the reception, storage, and provision of the power in the electrical system 500.

An embodiment of the power generation unit 504 may be as shown in FIG. 6. Generally, the power generation unit 504 may be electrically coupled to one or more power sources 208. The power sources 208 can include power sources internal and/or associated with the vehicle 100 and/or power sources external to the vehicle 100 to which the vehicle 100 electrically connects. One of the internal power sources can include an on board generator 604. The generator 604 may be an alternating current (AC) generator, a direct current (DC) generator or a self-excited generator. The AC generators can include induction generators, linear electric generators, and/or other types of generators. The DC generators can include homopolar generators and/or other types of generators. The generator 604 can be brushless or include brush contacts and generate the electric field with permanent magnets or through induction. The generator 604 may be mechanically coupled to a source of kinetic energy, such as an axle or some other power take-off. The generator 604 may also have another mechanical coupling to an exterior source of kinetic energy, for example, a wind turbine.

Another power source 208 may include wired or wireless charging 608. The wireless charging system 608 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include connectors, wired interconnections, the controllers, etc. The wired and wireless charging systems 608 can provide power to the power generation unit 504 from external power sources 208.

Internal sources for power may include a regenerative braking system 612. The regenerative braking system 612 can convert the kinetic energy of the moving car into electrical energy through a generation system mounted within the wheels, axle, and/or braking system of the vehicle 100. The regenerative braking system 612 can include any coils, magnets, electrical interconnections, converters, controllers, etc. required to convert the kinetic energy into electrical energy.

Another source of power 208, internal to or associated with the vehicle 100, may be a solar array 616. The solar array 616 may include any system or device of one or more solar cells mounted on the exterior of the vehicle 100 or integrated within the body panels of the vehicle 100 that provides or converts solar energy into electrical energy to provide to the power generation unit 504.

The power sources 208 may be connected to the power generation unit 504 through an electrical interconnection 618. The electrical interconnection 618 can include any wire, interface, bus, etc. between the one or more power sources 208 and the power generation unit 504.

The power generation unit 504 can also include a power source interface 620. The power source interface 620 can be any type of physical and/or electrical interface used to receive the electrical energy from the one or more power sources 208; thus, the power source interface 620 can include an electrical interface 624 that receives the electrical energy and a mechanical interface 628 which may include wires, connectors, or other types of devices or physical connections. The mechanical interface 608 can also include a physical/electrical connection 634 to the power generation unit 504.

The electrical energy from the power source 208 can be processed through the power source interface 624 to an electric converter 632. The electric converter 632 may convert the characteristics of the power from one of the power sources into a useable form that may be used either by the power storage 208 or one or more loads 508 within the vehicle 100. The electrical converter 624 may include any electronics or electrical devices and/or component that can change electrical characteristics, e.g., AC frequency, amplitude, phase, etc. associated with the electrical energy provided by the power source 208. The converted electrical energy may then be provided to an optional conditioner 638. The conditioner 638 may include any electronics or electrical devices and/or component that may further condition the converted electrical energy by removing harmonics, noise, etc. from the electrical energy to provide a more stable and effective form of power to the vehicle 100.

Figure 7:
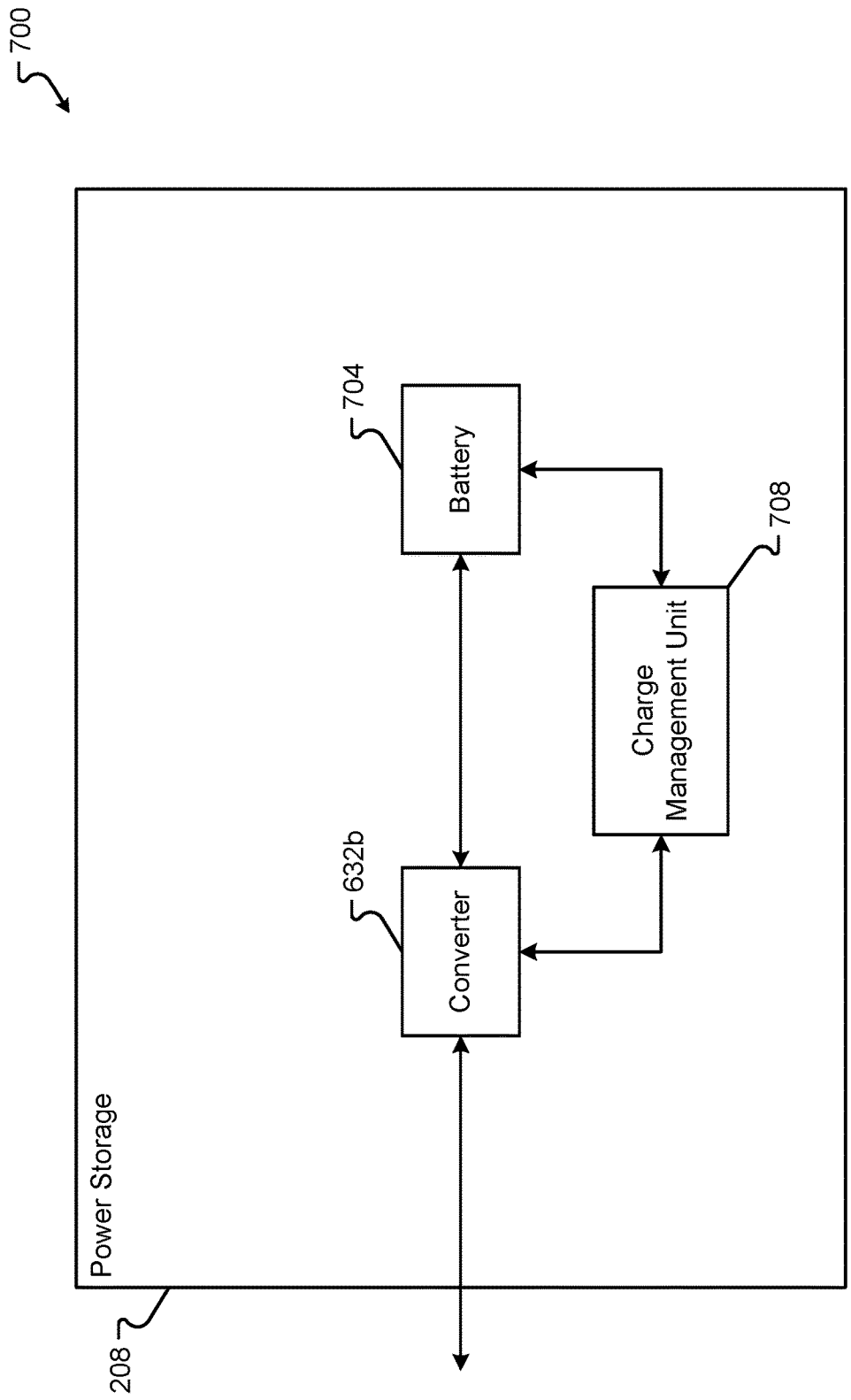
FIG. 7 is a block diagram of an embodiment of power storage associated with the electrical system of the vehicle.

An embodiment of the power storage 208 may be as shown in FIG. 7. The power storage unit can include an electrical converter 632*b*, one or more batteries, one or more rechargeable batteries, one or more capacitors, one or more accumulators, one or more supercapacitors, one or more ultrabatteries, and/or superconducting magnetics 704, and/or a charge management unit 708. The converter 632*b* may be the same or similar to the electrical converter 632*a* shown in FIG. 6. The converter 632*b* may be a replacement for the electric converter 632*a* shown in FIG. 6 and thus eliminate the need for the electrical converter 632*a* as shown in FIG. 6. However, if the electrical converter 632*a* is provided in the power generation unit 504, the converter 632*b*, as shown in the power storage unit 208, may be eliminated. The converter 632*b* can also be redundant or different from the electrical converter 632*a* shown in FIG. 6 and may provide a different form of energy to the battery and/or capacitors 704. Thus, the converter 632*b* can change the energy characteristics specifically for the battery/capacitor 704.

The battery 704 can be any type of battery for storing electrical energy, for example, a lithium ion battery, a lead acid battery, a nickel cadmium battery, etc. Further, the battery 704 may include different types of power storage systems, such as, ionic fluids or other types of fuel cell systems. The energy storage 704 may also include one or more high-capacity capacitors 704. The capacitors 704 may be used for long-term or short-term storage of electrical energy. The input into the battery or capacitor 704 may be different from the output, and thus, the capacitor 704 may be charged quickly but drain slowly. The functioning of the converter 632 and battery capacitor 704 may be monitored or managed by a charge management unit 708.

The charge management unit 708 can include any hardware (e.g., any electronics or electrical devices and/or components), software, or firmware operable to adjust the operations of the converter 632 or batteries/capacitors 704. The charge management unit 708 can receive inputs or periodically monitor the converter 632 and/or battery/capacitor 704 from this information; the charge management unit 708 may then adjust settings or inputs into the converter 632 or battery/capacitor 704 to control the operation of the power storage system 208.

Figure 8:
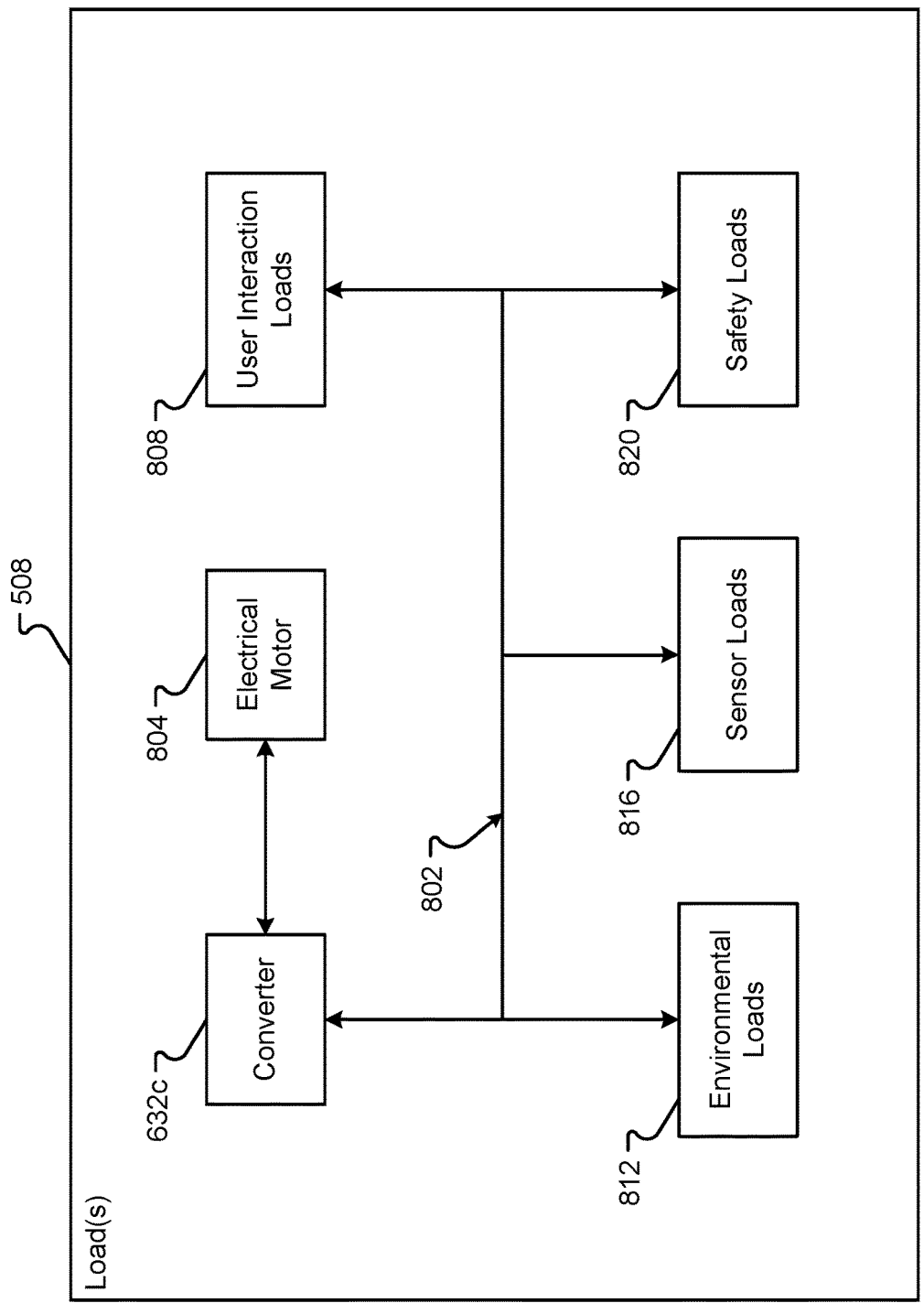
FIG. 8 is a block diagram of an embodiment of loads associated with the electrical system of the vehicle.

An embodiment of one or more loads 508 associated with the vehicle 100 may be as shown in FIG. 8. The loads 508 may include a bus or electrical interconnection system 802, which provides electrical energy to one or more different loads within the vehicle 100. The bus 802 can be any number of wires or interfaces used to connect the power generation unit 504 and/or power storage 208 to the one or more loads 508. The converter 632*c* may be an interface from the power generation unit 504 or the power storage 208 into the loads 508. The converter 632*c* may be the same or similar to electric converter 632*a* as shown in FIG. 6. Similar to the discussion of the converter 632*b* in FIG. 7, the converter 632*c* may be eliminated, if the electric converter 632*a*, shown in FIG. 6, is present. However, the converter 632*c* may further condition or change the energy characteristics for the bus 802 for use by the loads 508. The converter 632*c* may also provide electrical energy to electric motor 804, which may power the vehicle 100.

The electric motor 804 can be any type of DC or AC electric motor. The electric motor may be a direct drive or induction motor using permanent magnets and/or winding either on the stator or rotor. The electric motor 804 may also be wireless or include brush contacts. The electric motor 804 may be capable of providing a torque and enough kinetic energy to move the vehicle 100 in traffic. In some embodiments, the electric motor 804 may be similar, if not identical, to the electric motor 212 described in conjunction with FIG. 2.

The different loads 508 may also include environmental loads 812, sensor loads 816, safety loads 820, user interaction loads 808, etc. User interaction loads 808 can be any energy used by user interfaces or systems that interact with the driver and/or passenger(s) of the vehicle 100. These loads 808 may include, for example, the heads up display 434, the dash display 420, 424, 428, the radio, user interfaces on the head unit, lights, radio, and/or other types of loads that provide or receive information from the occupants of the vehicle 100. The environmental loads 812 can be any loads used to control the environment within the vehicle 100. For example, the air conditioning or heating unit of the vehicle 100 can be environmental loads 812. Other environmental loads can include lights, fans, and/or defrosting units, etc. that may control the environment within, and/or outside of, the vehicle 100. The sensor loads 816 can be any loads used by sensors, for example, air bag sensors, GPS, and other such sensors used to either manage or control the vehicle 100 and/or provide information or feedback to the vehicle occupants. The safety loads 820 can include any safety equipment, for example, seat belt alarms, airbags, headlights, blinkers, etc. that may be used to manage the safety of the occupants of the vehicle 100. There may be more or fewer loads than those described herein, although they may not be shown in FIG. 8.

Figure 9:
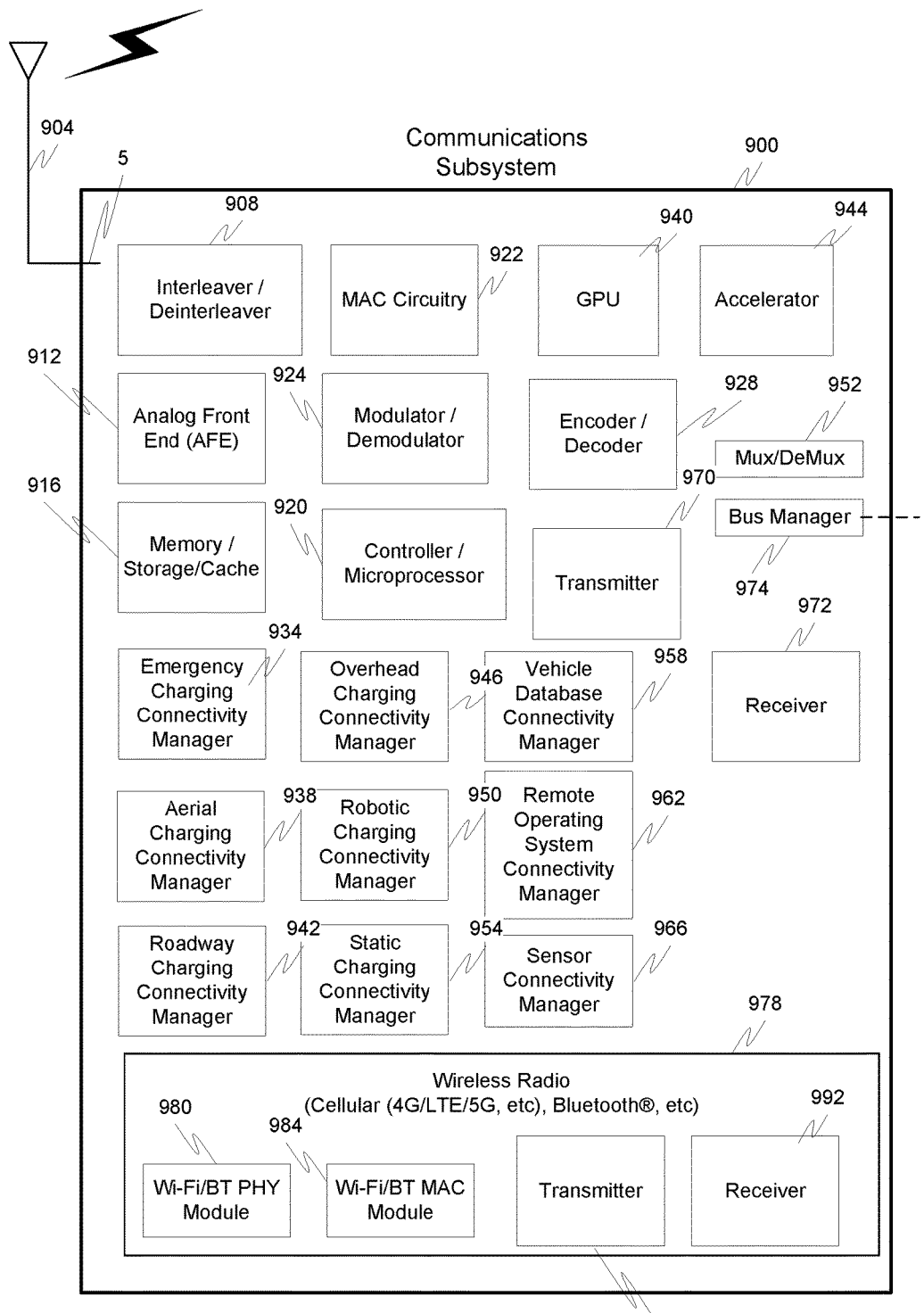
FIG. 9 is a block diagram of an embodiment of a communications subsystem of the vehicle.

FIG. 9 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager 974), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem enables communications between any if the inter-vehicle systems and subsystems as well as communications with non-collocated resources, such as those reachable over a network such as the Internet.

The communications subsystem 900, in addition to well-known componentry (which has been omitted for clarity), includes interconnected elements including one or more of: one or more antennas 904, an interleaver/deinterleaver 908, an analog front end (AFE) 912, memory/storage/cache 916, controller/microprocessor 920, MAC circuitry 922, modulator/demodulator 924, encoder/decoder 928, a plurality of connectivity managers 934-966, GPU 940, accelerator 944, a multiplexer/demultiplexer 952, transmitter 970, receiver 972 and wireless radio 978 components such as a Wi-Fi PHY/Bluetooth® module 980, a Wi-Fi/BT MAC module 984, transmitter 988 and receiver 992. The various elements in the device 900 are connected by one or more links/busses 5 (not shown, again for sake of clarity).

The device 400 can have one more antennas 904, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 904 generally interact with the Analog Front End (AFE) 912, which is needed to enable the correct processing of the received modulated signal and signal conditioning for a transmitted signal. The AFE 912 can be functionally located between the antenna and a digital baseband system in order to convert the analog signal into a digital signal for processing and vice-versa.

The subsystem 900 can also include a controller/microprocessor 920 and a memory/storage/cache 916. The subsystem 900 can interact with the memory/storage/cache 916 which may store information and operations necessary for configuring and transmitting or receiving the information described herein. The memory/storage/cache 916 may also be used in connection with the execution of application programming or instructions by the controller/microprocessor 920, and for temporary or long term storage of program instructions and/or data. As examples, the memory/storage/cache 920 may comprise a computer-readable device, RAM, ROM, DRAM, SDRAM, and/or other storage device(s) and media.

The controller/microprocessor 920 may comprise a general purpose programmable processor or controller for executing application programming or instructions related to the subsystem 900. Furthermore, the controller/microprocessor 920 can perform operations for configuring and transmitting/receiving information as described herein. The controller/microprocessor 920 may include multiple processor cores, and/or implement multiple virtual processors. Optionally, the controller/microprocessor 920 may include multiple physical processors. By way of example, the controller/microprocessor 920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 900 can further include a transmitter 970 and receiver 972 which can transmit and receive signals, respectively, to and from other devices, subsystems and/or other destinations using the one or more antennas 904 and/or links/busses. Included in the subsystem 900 circuitry is the medium access control or MAC Circuitry 922. MAC circuitry 922 provides for controlling access to the wireless medium. In an exemplary embodiment, the MAC circuitry 922 may be arranged to contend for the wireless medium and configure frames or packets for communicating over the wired/wireless medium.

The subsystem 900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 900 also includes a GPU 940, an accelerator 944, a Wi-Fi/BT/BLE PHY module 980 and a Wi-Fi/BT/BLE MAC module 984 and wireless transmitter 988 and receiver 992. In some embodiments, the GPU 940 may be a graphics processing unit, or visual processing unit, comprising at least one circuit and/or chip that manipulates and changes memory to accelerate the creation of images in a frame buffer for output to at least one display device. The GPU 940 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 934-966 (even) manage and/or coordinate communications between the subsystem 900 and one or more of the systems disclosed herein and one or more other devices/systems. The connectivity managers include an emergency charging connectivity manager 934, an aerial charging connectivity manager 938, a roadway charging connectivity manager 942, an overhead charging connectivity manager 946, a robotic charging connectivity manager 950, a static charging connectivity manager 954, a vehicle database connectivity manager 958, a remote operating system connectivity manager 962 and a sensor connectivity manager 966.

The emergency charging connectivity manager 934 can coordinate not only the physical connectivity between the vehicle 100 and the emergency charging device/vehicle, but can also communicate with one or more of the power management controller, one or more third parties and optionally a billing system(s). As an example, the vehicle 100 can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 934 can also communicate information, such as billing information to the emergency charging vehicle and/or a third party. This billing information could be, for example, the owner of the vehicle, the driver/occupant(s) of the vehicle, company information, or in general any information usable to charge the appropriate entity for the power received.

The aerial charging connectivity manager 938 can coordinate not only the physical connectivity between the vehicle 100 and the aerial charging device/vehicle, but can also communicate with one or more of the power management controller, one or more third parties and optionally a billing system(s). As an example, the vehicle 100 can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 938 can similarly communicate information, such as billing information to the aerial charging vehicle and/or a third party. This billing information could be, for example, the owner of the vehicle 100, the driver/occupant(s) of the vehicle 100, company information, or in general any information usable to charge the appropriate entity for the power received etc., as discussed.

The roadway charging connectivity manager 942 and overhead charging connectivity manager 946 can coordinate not only the physical connectivity between the vehicle 100 and the charging device/system, but can also communicate with one or more of the power management controller, one or more third parties and optionally a billing system(s). As one example, the vehicle 100 can request a charge from the charging system when, for example, the vehicle 100 needs or is predicted to need power. As an example, the vehicle 100 can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle 100, the driver/occupant(s) of the vehicle 100, company information, or in general any information usable to charge the appropriate entity for the power received etc., as discussed. The person responsible for paying for the charge could also receive a copy of the billing information as is customary. The robotic charging connectivity manager 950 and static charging connectivity manager 954 can operate in a similar manner to that described herein.

The vehicle database connectivity manager 958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general any information stored in the vehicle database can optionally be shared with any one or more other devices optionally subject to any privacy or confidentially restrictions.

The remote operating system connectivity manager 962 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 966 facilitates communications between any one or more of the vehicle sensors and any one or more of the other vehicle systems. The sensor connectivity manager 966 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 10:
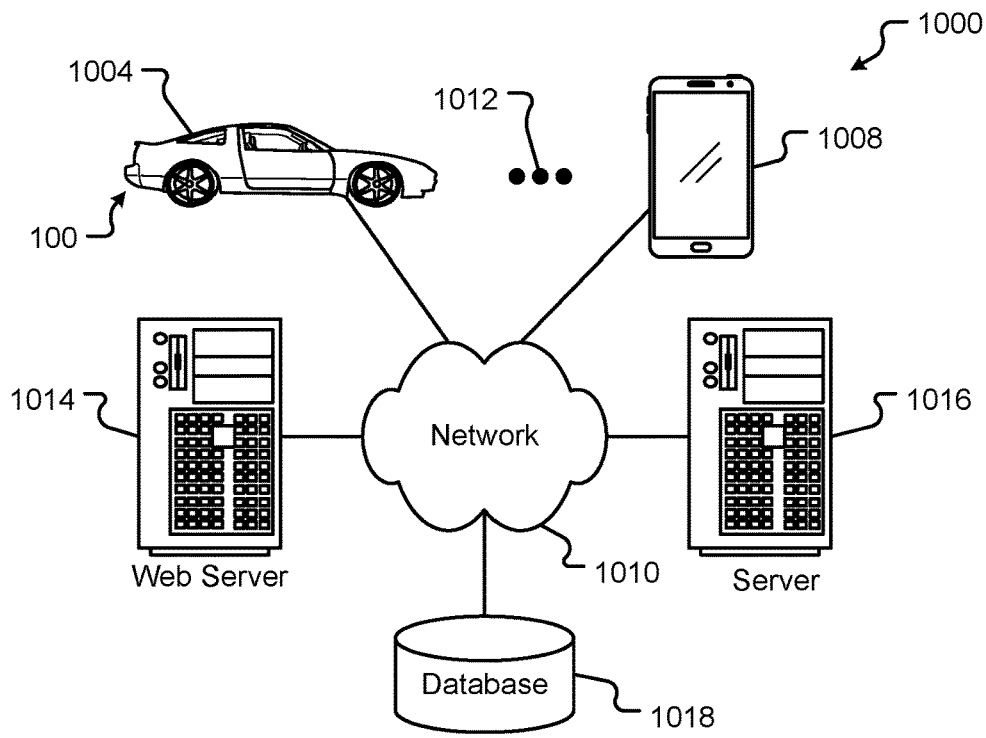
FIG. 10 is a block diagram of a computing environment associated with the embodiments presented herein.

FIG. 10 illustrates a block diagram of a computing environment 1000 that may function as the servers, user computers, or other systems provided and described herein. The environment 1000 includes one or more user computers, or computing devices, such as a vehicle computing device 1004, a communication device 1008, and/or more 1012. The computing devices 1004, 1008, 1012 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 1004, 1008, 1012 may also have any of a variety of applications, including for example, database client and/or server applications, and web browser applications. Alternatively, the computing devices 1004, 1008, 1012 may be any other electronic device, such as a thin-client computer, Internet-enabled mobile telephone, and/or personal digital assistant, capable of communicating via a network 1010 and/or displaying and navigating web pages or other types of electronic documents. Although the exemplary computer environment 1000 is shown with two computing devices, any number of user computers or computing devices may be supported.

Environment 1000 further includes a network 1010. The network 1010 may can be any type of network familiar to those skilled in the art that can support data communications using any of a variety of commercially-available protocols, including without limitation SIP, TCP/IP, SNA, IPX, AppleTalk, and the like. Merely by way of example, the network 1010 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 1014, 1016. In this example, server 1014 is shown as a web server and server 1016 is shown as an application server. The web server 1014, which may be used to process requests for web pages or other electronic documents from computing devices 1004, 1008, 1012. The web server 1014 can be running an operating system including any of those discussed above, as well as any commercially-available server operating systems. The web server 1014 can also run a variety of server applications, including SIP (Session Initiation Protocol) servers, HTTP(s) servers, FTP servers, CGI servers, database servers, Java servers, and the like. In some instances, the web server 1014 may publish operations available operations as one or more web services.

The environment 1000 may also include one or more file and or/application servers 1016, which can, in addition to an operating system, include one or more applications accessible by a client running on one or more of the computing devices 1004, 1008, 1012. The server(s) 1016 and/or 1014 may be one or more general purpose computers capable of executing programs or scripts in response to the computing devices 1004, 1008, 1012. As one example, the server 1016, 1014 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 1016 may also include database servers, including without limitation those commercially available from Oracle®, Microsoft®, Sybase®, IBM® and the like, which can process requests from database clients running on a computing device 1004, 1008, 1012.

The web pages created by the server 1014 and/or 1016 may be forwarded to a computing device 1004, 1008, 1012 via a web (file) server 1014, 1016. Similarly, the web server 1014 may be able to receive web page requests, web services invocations, and/or input data from a computing device 1004, 1008, 1012 (e.g., a user computer, etc.) and can forward the web page requests and/or input data to the web (application) server 1016. In further embodiments, the server 1016 may function as a file server. Although for ease of description, FIG. 10 illustrates a separate web server 1014 and file/application server 1016, those skilled in the art will recognize that the functions described with respect to servers 1014, 1016 may be performed by a single server and/or a plurality of specialized servers, depending on implementation-specific needs and parameters. The computer systems 1004, 1008, 1012, web (file) server 1014 and/or web (application) server 1016 may function as the system, devices, or components described in FIGS. 1-10.

The environment 1000 may also include a database 1018. The database 1018 may reside in a variety of locations. By way of example, database 1018 may reside on a storage medium local to (and/or resident in) one or more of the computers 1004, 1008, 1012, 1014, 1016. Alternatively, it may be remote from any or all of the computers 1004, 1008, 1012, 1014, 1016, and in communication (e.g., via the network 1010) with one or more of these. The database 1018 may reside in a storage-area network ("SAN") familiar to those skilled in the art. Similarly, any necessary files for performing the functions attributed to the computers 1004, 1008, 1012, 1014, 1016 may be stored locally on the respective computer and/or remotely, as appropriate. The database 1018 may be a relational database, such as Oracle 20I®, that is adapted to store, update, and retrieve data in response to SQL-formatted commands.

Figure 11:
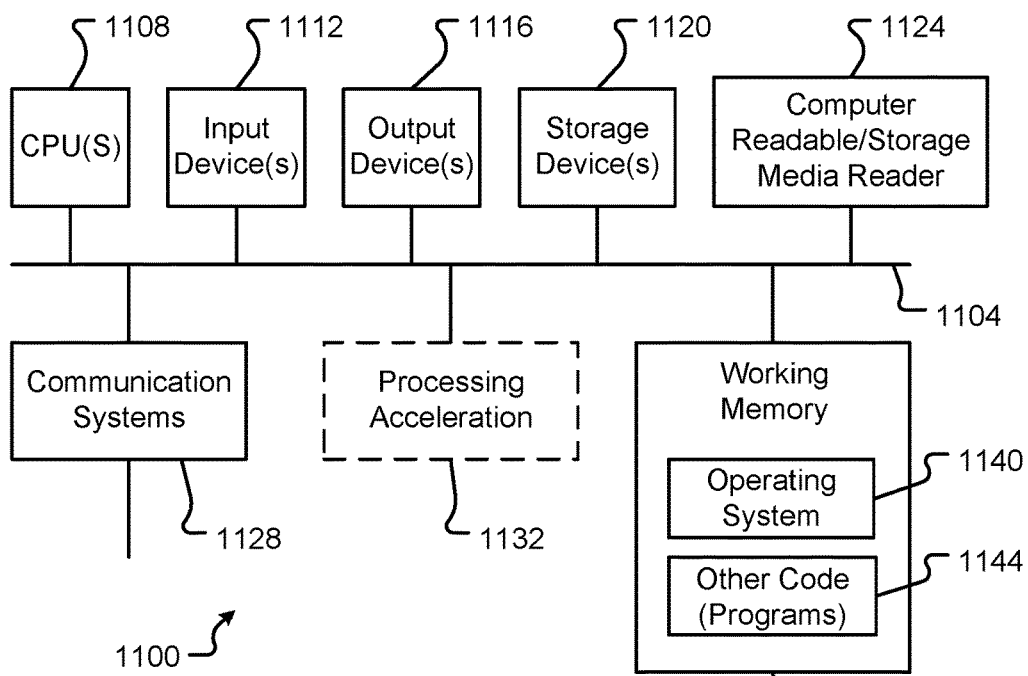
FIG. 11 is a block diagram of a computing device associated with one or more components described herein.

FIG. 11 illustrates one embodiment of a computer system 1100 upon which the servers, user computers, computing devices, or other systems or components described above may be deployed or executed. The computer system 1100 is shown comprising hardware elements that may be electrically coupled via a bus 1104. The hardware elements may include one or more central processing units (CPUs) 1108; one or more input devices 1112 (e.g., a mouse, a keyboard, etc.); and one or more output devices 1116 (e.g., a display device, a printer, etc.). The computer system 1100 may also include one or more storage devices 1120. By way of example, storage device(s) 1120 may be disk drives, optical storage devices, solid-state storage devices such as a random access memory ("RAM") and/or a read-only memory ("ROM"), which can be programmable, flash-updateable and/or the like.

The computer system 1100 may additionally include a computer-readable storage media reader 1124; a communications system 1128 (e.g., a modem, a network card (wireless or wired), an infra-red communication device, etc.); and working memory 1136, which may include RAM and ROM devices as described above. The computer system 1100 may also include a processing acceleration unit 1132, which can include a DSP, a special-purpose processor, and/or the like.

The computer-readable storage media reader 1124 can further be connected to a computer-readable storage medium, together (and, optionally, in combination with storage device(s) 1120) comprehensively representing remote, local, fixed, and/or removable storage devices plus storage media for temporarily and/or more permanently containing computer-readable information. The communications system 1128 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1100 may also comprise software elements, shown as being currently located within a working memory 1136, including an operating system 1140 and/or other code 1144. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1108 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 12:
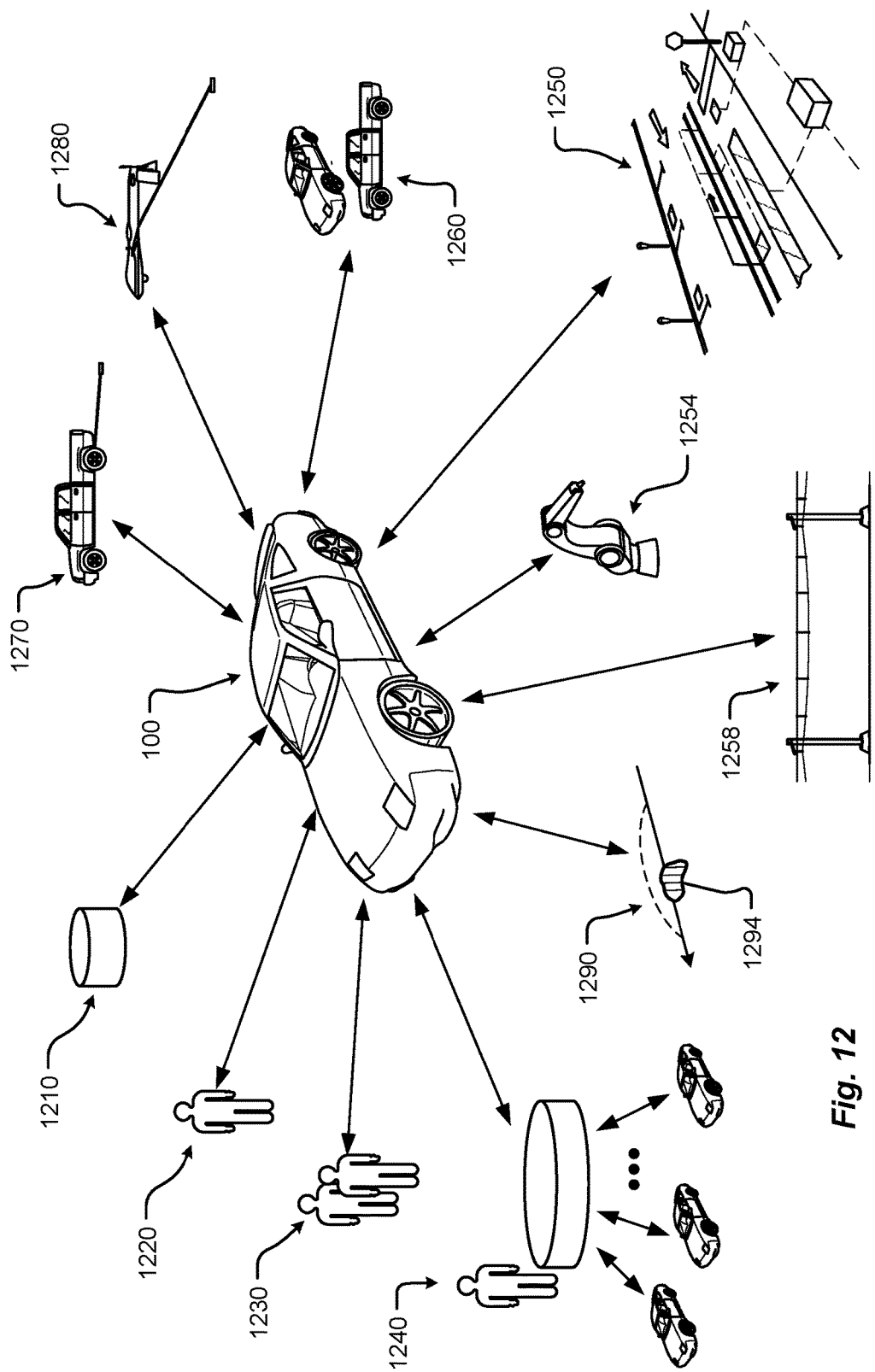
FIG. 12 shows a vehicle in an environment in accordance with embodiments of the present disclosure.

Referring to FIG. 12, the vehicle 100 is shown in a plurality of operational and/or charging environments. The vehicle 100 may operate in any one or more of the depicted environments in any combination. Other embodiments are possible but may not be depicted in FIG. 12. Generally, the vehicle 100 may operate in environments which enable charging of the vehicle 100 and/or operation of the vehicle 100. More specifically, the vehicle 100 may receive a charge via one or more means comprising emergency charging vehicle system 1270, aerial vehicle charging system 1280, roadway system 1250, robotic charging system 1254, and/or overhead charging system 1258. The vehicle 100 may interact and/or operate in an environment comprising one or more other roadway vehicles 1260. The vehicle 100 may engage with elements within the vehicle 100 comprising vehicle driver 1220, vehicle passengers 1230, and/or a vehicle database 1210. In one embodiment, vehicle database 1210 may not physically reside in the vehicle 100 and may instead be accessed remotely (e.g., by wireless communication, etc.), and as such, may reside in another location such as a residence or business location. The vehicle 100 may operate autonomously and/or semi-autonomously in an autonomous environment 1290 (here, depicted as a roadway environment presenting a roadway obstacle 1294 of which the vehicle 100 autonomously identifies and steers the vehicle 100 clear of the obstacle 1294). Furthermore, the vehicle 100 may engage with a remote operator system 1240, which may provide fleet management instructions or control.

In some embodiments, the vehicle 100 may be configured to receive charge via one or more compatible vehicle charging interfaces, such as one or more charging panels and/or interconnections. These compatible vehicle charging interfaces may be configured at one or more locations on, in, or about a vehicle 100. For instance, the locations may include locations on the vehicle 100 wherein charging may be received, via a vehicle roof 130, vehicle side 160 and vehicle lower or undercarriage 140.

In one embodiment, a vehicle may have one or more audio sensors or microphones placed on or near one or more of the exterior surface and/or interior surface. Such audio sensors as discussed herein may be configured to receive audio input from a user of the vehicle. The audio input from a user may correspond to voice commands, conversations detected in the vehicle, phone calls made in the vehicle, and/or other audible expressions made in or near the vehicle. Audio sensors may include, but are not limited to, microphones and other types of acoustic-to-electric transducers or sensors. Optionally, the interior audio sensors may be configured to receive and convert sound waves into an equivalent analog or digital signal. The interior audio sensors may serve to determine one or more locations associated with various sounds in the vehicle. The location of the sounds may be determined based on a comparison of volume levels, intensity, and the like, between sounds detected by two or more interior audio sensors. For instance, a first audio sensors may be located in a first area of the vehicle and a second audio sensors may be located in a second area of the vehicle. If a sound is detected at a first volume level by the first audio sensors and a second, higher, volume level by the second audio sensors in the second area of the vehicle, the sound may be determined to be closer to the second area of the vehicle. As can be appreciated, the number of sound receivers used in a vehicle may be increased (e.g., more than two, etc.) to increase measurement accuracy surrounding sound detection and location, or source, of the sound (e.g., via triangulation, etc.).

Voice recognition software presents a seamless solution to issues with user authorization. Voice recognition allows for methods and systems of authorizing a user to access and operate a vehicle without the need for a physical key or memorized passcode.

In some cases, a vehicle may have a list or database of authorized users. Such users may be registered with a user profile comprising a voice print. A voice print may be a spectrogram of an audio sample of a voice of a user and acts as a digitized and stored model or template of a person's speech. Voice prints can be stored as digital files in databases similar to the storing of fingerprints or other biometric data. The creation of a voiceprint for a user may be performed by having the user recite a particular phrase once or a number of times. The methods described herein may not rely on a fixed set of enrolled passphrases. Instead, the voice biometric analysis systems may be trained to recognize similarities between voice patterns of an individual even when the individual speaks an unfamiliar phrase. Collecting audio samples from a user inside a vehicle provides an excellent opportunity to limit background noises and receive a clear signal.

A voice print may be used by a voice recognition software program, either onboard the vehicle, on a network connected server, or both, to one or more of identify, verify, or authenticate a user's voice. As used herein, voice identification may be synonymous with voice recognition or speaker verification. Voice biometric analysis may comprise comparing an input audio sample with a number of voice prints stored in memory.

A match score may be generated by a voice biometric analysis system representing a degree of certainty that an audio sample originated from a particular user associated with a user ID. In some embodiments, a voice biometric analysis system may present a number of close matches and be used along with another voice biometric analysis system to identify and verify the speaker.

The voice biometric analysis may be one or more of text-dependent and/or text-independent. For example, a user may set up a password or passphrase to be spoken. Alternatively, a voice biometric system may be set up to analyze a voice of a user speaking any words or phrases and identify and verify that speaker. For example, a user may simply utter any command to an AI assistant associated with the vehicle and that utterance may be used to identify and verify the identity of the speaker.

In some embodiments, a vehicle may have one or more microphones placed in and around the interior cabin of the vehicle. Such microphones may be placed in such a pattern as to enable a vehicle system to not only detect a speaker and detect the speaker's identity using voice biometric software but also detect a speaker's location within or outside the vehicle.

For example, a passenger in the rear, passenger-side seat may speak a command to a vehicle artificial intelligence ("AI") assistant. The voice of the passenger may be picked up to some degree by a number of microphones placed around the vehicle cabin. By comparing the difference in strength between the microphones, a processor may be operable to detect the exact seat in which the passenger sits. Such a system may operate to solve a number of user permission issues. For example, an owner of the vehicle may set a number of user preferences, such as disabling the ability for a passenger in the backseat to adjust the radio, to control the air conditioner, etc. Alternatively, the system may detect a speaker is sitting in the driver's seat and give only that voice the ability to activate certain driving control features.

In some embodiments, the vehicle may comprise a processor in communication with one or more onboard storage systems. Such storage systems may store one or more user databases storing data associated with one or more users with some level of authority as will be discussed below.

Figure 13A:
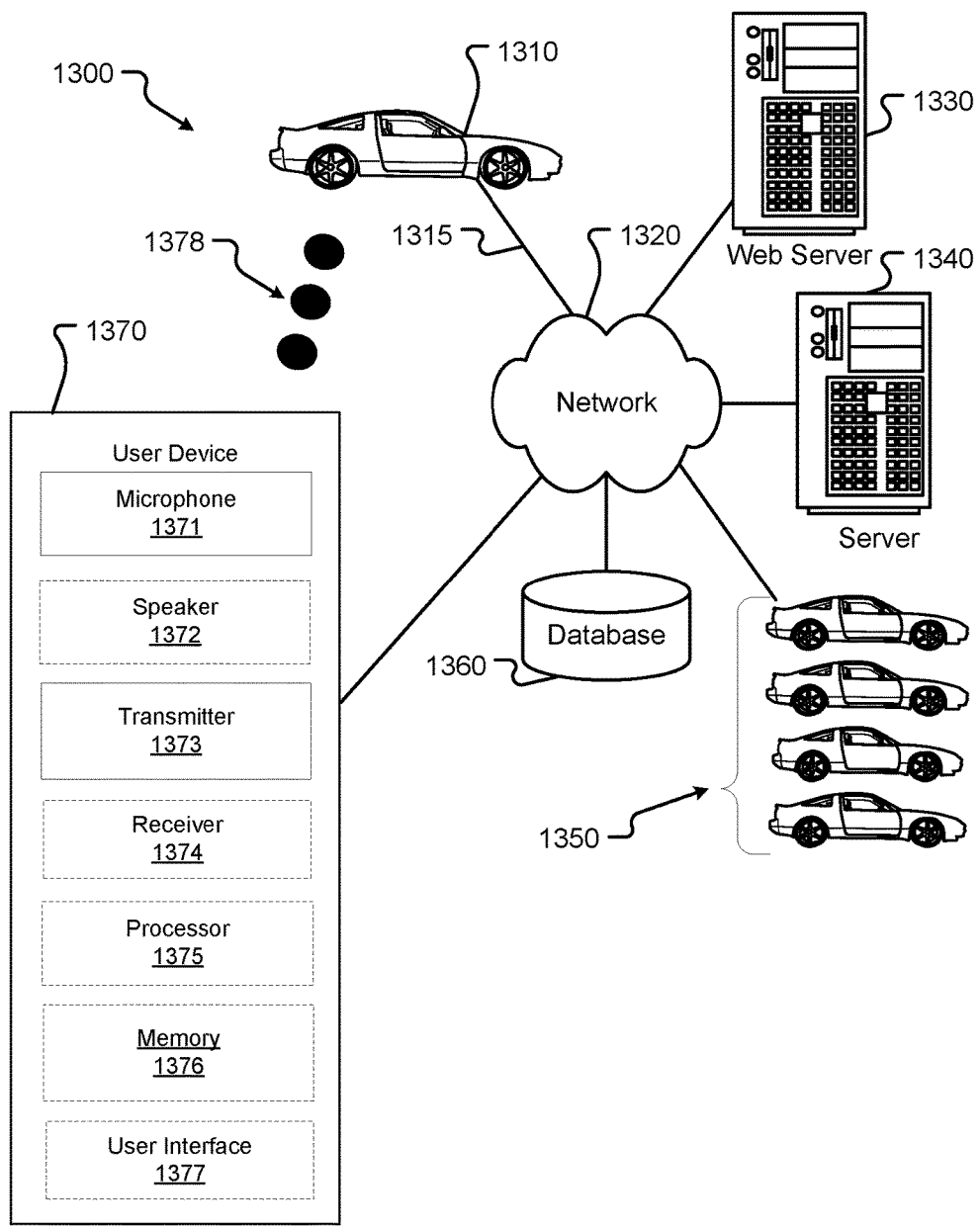
FIG. 13A is a block diagram of an embodiment of a computing environment associated with the embodiments presented herein.

An exemplary environment 1300 for an embodiment is illustrated in FIG. 13A. As can be appreciated, a vehicle 1310, which may comprise any or all of the hardware and functionality as discussed herein, may be in communication with a network 1320 via a communication link 1315. The communication link 1315 may be one or more of a cellular connection (e.g. 5G, LTE, etc.), a GPS signal, a wireless internet connection, or other method of communicating with an external server(s).

Via the network 1320, the vehicle 1310 may communicate with a number of elements including, but not limited to, one or more web servers 1330, one or more servers 1340, one or more other vehicles 1350, one or more databases 1360, and/or one or more user devices 1370.

The vehicle 1310 may also communicate with the one or more user devices 1370 via one or more other communication channels 1378 including, but not limited to, Bluetooth®, a wireless internet connection, NFC, RFID, etc.

A user device 1370 may comprise one or more of a microphone 1371, a speaker 1372, a transmitter 1373, a receiver 1374, a processor 1375, a memory device 1376, and a user interface 1377. Such a user device may be in the form of a "fob" and be limited to merely a microphone and communication system, or be in the form of a smartphone or personal computer.

Figure 13B:
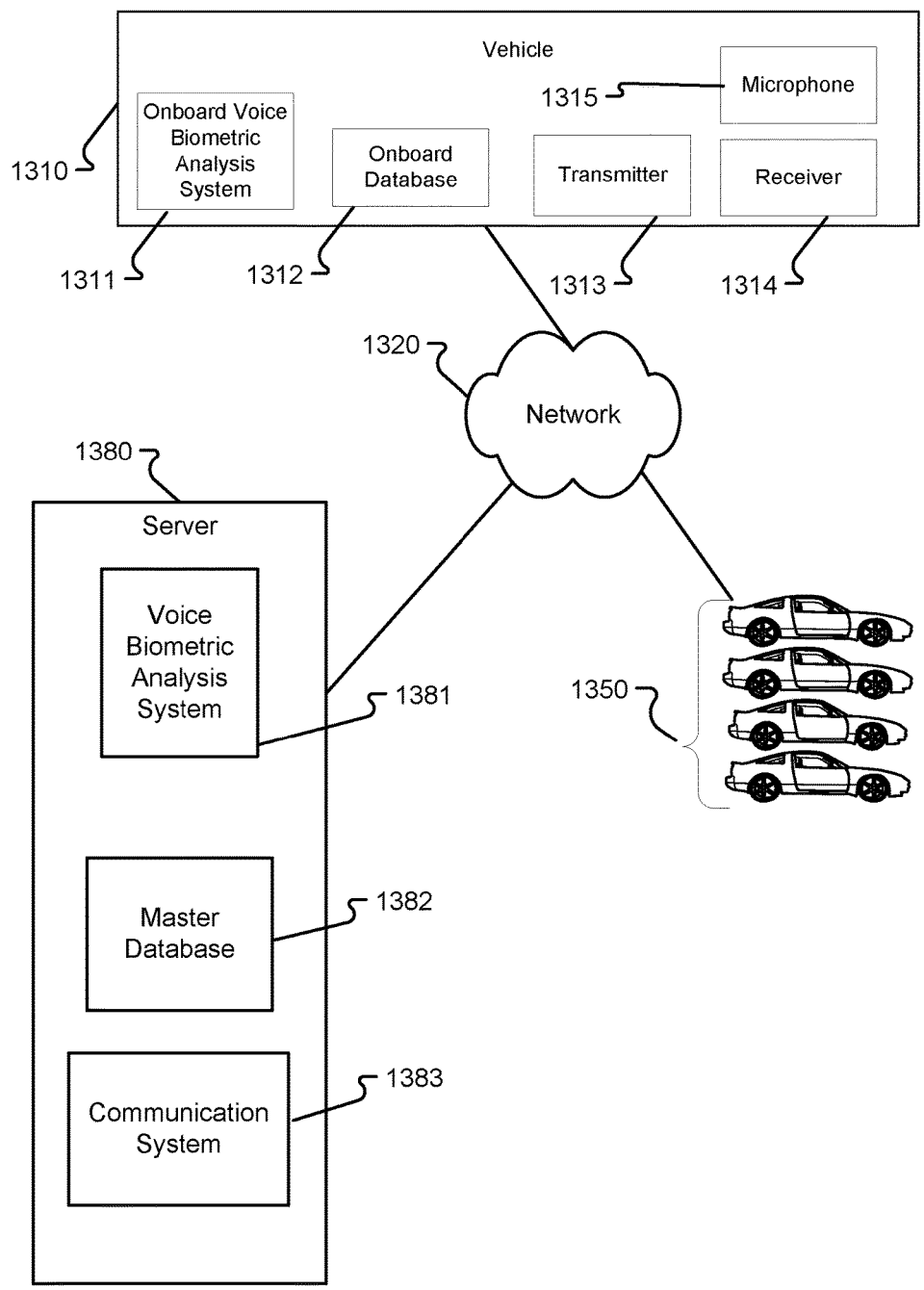
FIG. 13B is a block diagram of an embodiment of a computing environment associated with the embodiments presented herein.

In one embodiment, as illustrated in FIG. 13B, the vehicle 1310 may comprise one or more of an onboard voice biometric analysis system 1311, an onboard database 1312, a transmitter 1313, a receiver 1314, and a microphone 1315. The vehicle 1310 may be operable to collect audio samples via the microphone 1315 and perform voice biometric analysis on such audio samples via the onboard voice biometric analysis system 1311. The transmitter 1313 may be operable to transmit audio samples, as well as other data from the onboard database, to the network 1320. The receiver 1314 may be operable to receive data from the network 1320.

Audio may be collected during operation of the vehicle and at any time any voice command is given to the vehicle. Furthermore, interior and exterior audio may be recorded as audio samples at any time, such as during phone calls, during the initiation of phone calls (e.g. "call mother"), during other voice commands (e.g. "give me directions to mother's"), during voice commands from outside the car (e.g. "unlock the car"), via an application input or 1800 number (e.g. "unlock the car for mother"), via a mobile phone, landline, a desktop computer and/or a laptop. The voice print for other users may be remotely downloaded upon the determination that the user profile information may be required for a new user (e.g. "mother").

Via the network 1320, the vehicle 1310 may be in communication with a voice biometric analysis authentication server 1380. Such a voice biometric analysis authentication server 1380 may comprise a voice biometric analysis system 1381, a master database 1382, and a communication system 1383. The voice biometric analysis authentication server 1380 may be operable to perform voice biometric analysis and voice recognition analysis based on audio samples transmitted from the vehicle 1310 via the network 1320.

Other vehicles 1350 may similarly be in communication with the voice biometric analysis authentication server 1380 via the network 1320.

Figure 14:
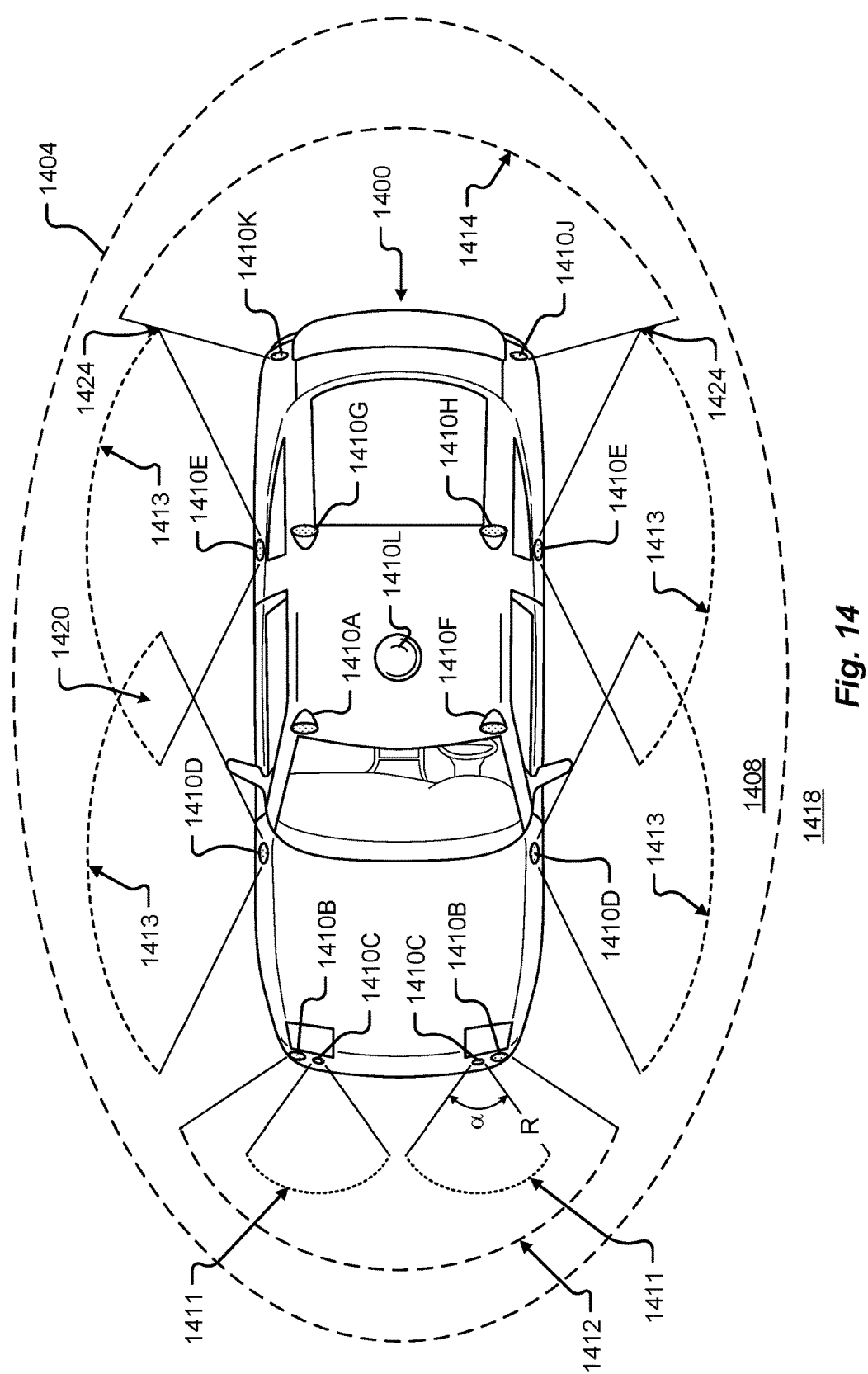
FIG. 14 shows a vehicle in an environment in accordance with embodiments of the present disclosure.

In one embodiment, as illustrated in FIG. 14, an exemplary vehicle 1400 may be equipped with a number of external microphones 1410A-h and 1410J-L. As can be appreciated, the placement of microphones 1410A-H and 1410J-L around the exterior of the vehicle 1400 enable a wide area of audio reception 1408 as shown by ellipse shape 1404 circumscribing the area 1408, wherein a voice of a user speaking at a normal voice outside area 1408, in area 1418, may not be adequately received via any one of the microphones 1410A-H and 1410J-L.

For example, a microphone 1410A may be placed near the top of a passenger-side door of the vehicle 1400. Such a microphone 1410A may be installed in a seam of the door or within the body of the vehicle such that the microphone 1410A cannot be seen from a distance and may not disrupt the aesthetics of the vehicle 1400.

Similarly, a microphone 1410F may be placed near the top of a driver-side door of the vehicle 1400, a microphone 1410G may be placed on the top of the vehicle 1400 on the passenger-side and near the rear, a microphone 1410H may be placed on the top of the vehicle 1400 on the driver-side and near the rear, a microphone 1410B may be placed on the front side of the vehicle 1400, and a microphone 1410C may be placed on a front corner of the vehicle 1400 in a similar fashion.

Each microphone 1410A-H and 1410J-L may be associated with a zone of reception 1411, 1413 wherein a voice of a user speaking in the zone of reception 1411, 1413 may be adequately received by the associated microphone.

For example, as illustrated in FIG. 14, microphone 1410C may have a zone of reception 1411 in the form of an arc of a circle with a radius R and an interior angle of alpha ("a").

In some positions around the vehicle 1400, a voice of a user may be received by a number of microphones. For example, the voice of a user standing in the front of the car, in area 1412, may be received by each of microphones 1410B and 1410C. Ideally, the voice of a user standing anywhere within the area 1408 may be received by one or more of microphones 1410A-H and 1410J-L.

A microphone 1410D may be placed along the side of the vehicle, towards the front half of the vehicle side. A microphone 1410E may similarly be placed along the side of the vehicle, towards the back half of the vehicle side. Such microphones 1410D and 1410E may individually operate with reception areas 1413. In this way, the voice of a user standing in area 1420, in the combination of areas 1413, may be received via both of microphones 1410D and 1410E.

A microphone 1410J may be placed on the rear, driver-side of the vehicle. A microphone 1410K may be placed on the rear, passenger-side of the vehicle. The combination of such microphones 1410J and 1410K may operate to project an area of auditory reception as illustrated by shape 1414. In some cases, the voice of a user standing in particular positions around the vehicle may be picked up equally by a number of microphones, for example area 1424. A position of such a user may be identified by the equal signal from particular microphones 1410K and 1410E.

Finally, a microphone 1410L may be placed on the roof of vehicle 1400. Such a microphone may be capable of receiving audio from a larger zone of reception than other microphones at the loss of a capability of detecting a position of a speaker.

Figure 15:
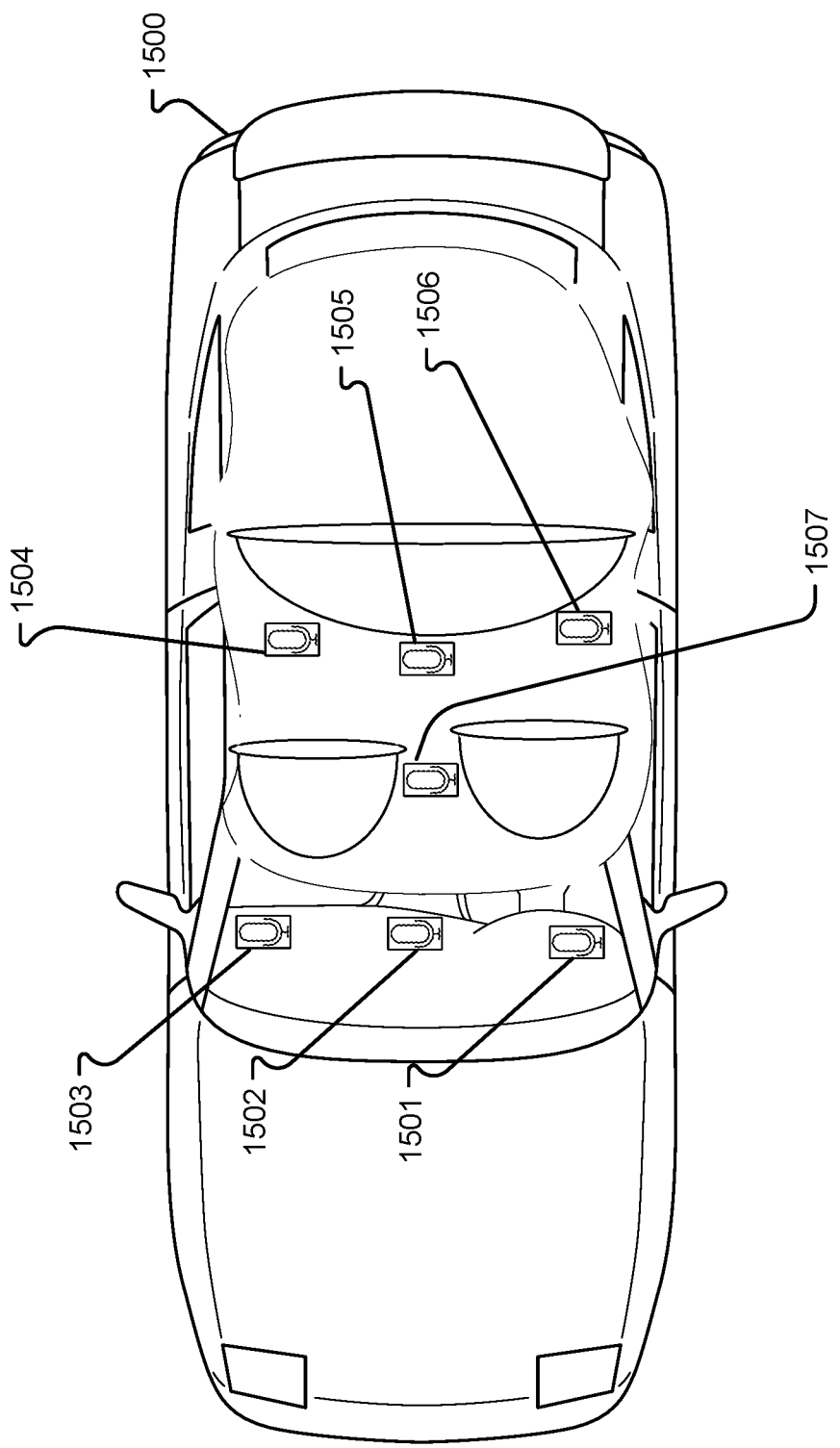
FIG. 15 shows a vehicle in an environment in accordance with embodiments of the present disclosure.

In one embodiment, a number of microphones 1501-1507 may be placed inside the interior of a vehicle 1500 as illustrated in FIG. 15. As can be appreciated, such a vehicle 1500 may be equipped with a number of interior microphones 1501-1507.

A front driver-side microphone 1501 may be installed around or near the front of the cabin of the vehicle 1500. Such a microphone 1501 may be operable to adequately receive the audio of a voice of a user sitting in a front driver seat.

Similarly, a microphone 1502 may be installed around or near the front middle portion of the vehicle cabin, a microphone 1503 may be installed around or near the front passenger seat of the vehicle, a microphone 1504 may be installed around or near the rear passenger-side seat of the vehicle, a microphone 1505 may be installed around or near the rear middle seat of the vehicle, a microphone 1506 may be installed around or near the rear driver-side seat of the vehicle, and/or a microphone 1507 may be installed around or near the center of the cabin.

Interior microphones 1501-1507 may be used in conjunction with one another. Accordingly, an array of microphones may be created. The signal from interior microphones 1501-1507 may be received by a processor of the vehicle system, allowing for the signal strengths to be compared. By determining the microphone with the strongest reception, the processor may be enabled to determine a location of a user from within the vehicle.

Figure 16B:
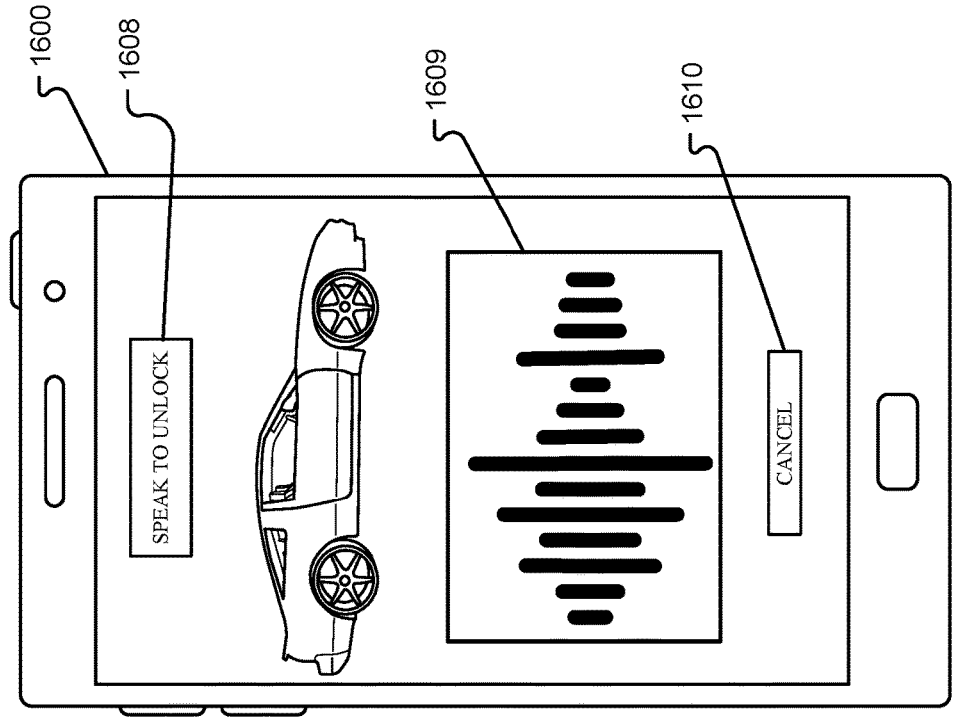
FIG. 16B shows a user interface of a user device in accordance with embodiments of the present disclosure.
Figure 16A:
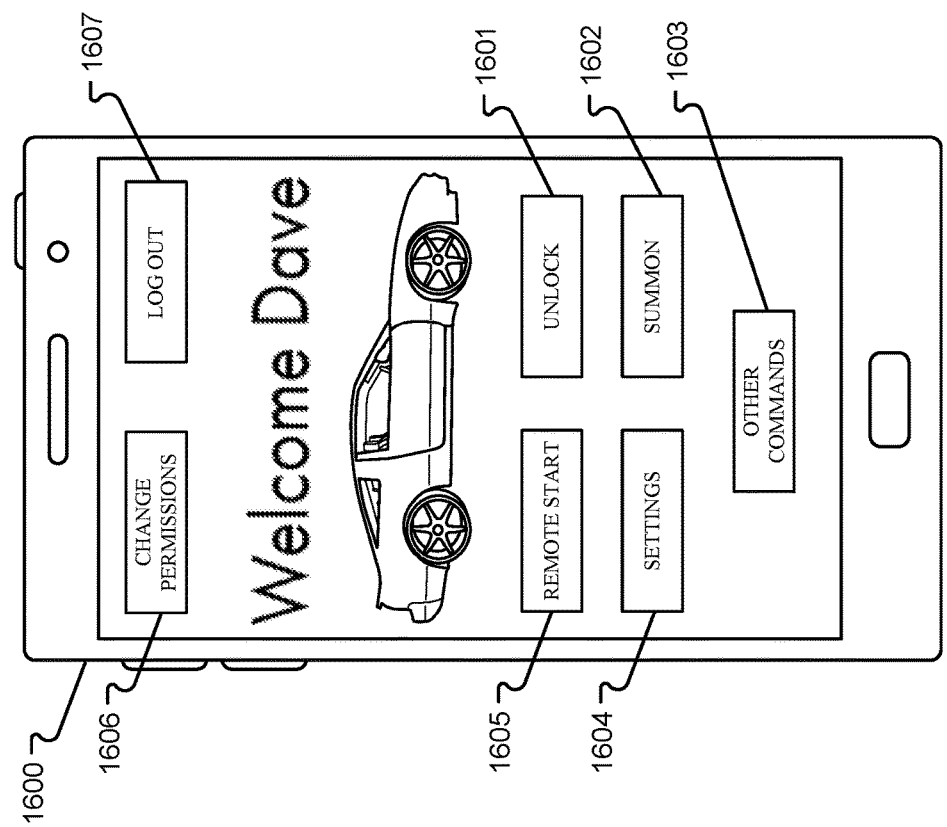
FIG. 16A shows a user interface of a user device in accordance with embodiments of the present disclosure.

An exemplary embodiment of a user interface for a user device 1600 to be used with a system as described herein is illustrated in FIGS. 16A and 16B. As discussed herein, such a user device 1600 may communicate with a vehicle via a number of ways, including a cellular connection, an internet connection, Bluetooth®, RFID, NFC, etc. An application may be installed on a user device 1600 such as a smartphone to allow a user to enter a number of commands 1601-1606 to be sent to the vehicle. The user device 1600 may also be used by a user to enter voice commands or an audio sample for voice biometric processing. GUI buttons may be presented to a user for selection of commands such as unlocking the car doors 1601, summoning the car (requesting an autonomous driver to transport the vehicle to the user) 1602, remote start the vehicle 1605, other commands 1603, and allow a user to change settings 1604, change user permissions 1606, log out 1607, etc. Upon selecting a command button 1601-1606, a user may be presented with a 'speak to unlock' screen 1608 and a visualization of a user's voice may appear in a window 1609 of the user interface. Upon being entered into the user device when presented with the 'speak to unlock' screen 1608, the user's voice may be recorded and sent as an audio sample from the user device to the user's vehicle. A user may also be presented with a button to cancel 1610 the entry of the audio command.

In one embodiment, a database may be stored on the vehicle, managing data relating to users. Users with authority to control some aspect of a vehicle, such as in accordance with certain permissions, may be registered into the vehicle system via the creation of a 'User Profile'. A User Profile may be an entry in a database stored in a number of locations including information such as a user identification (User ID), a voiceprint ID (referencing a voiceprint file associated with the user profile used to match a received audio sample received by the vehicle system to the user during voice biometric analysis), a permissions level (for example, a user with complete control of the vehicle may be associated with a User Profile showing a larger number in the permissions field (e.g. 15) while a user with some but less than complete control of the vehicle may be associated with a User Profile showing a larger number in the permissions field (e.g. 5)), and a version identifier of one of the voiceprint file or the user profile (e.g. a timestamp showing a date and/or time of creation or modification, or a version number).

Regarding permissions, each user associated with a vehicle may be associated with a level of permission. The level of permission for a user may be stored in memory onboard the vehicle and/or in memory stored on a network connected server. As an example, an owner of a vehicle may have complete and full permissions. A person who commonly rides in the vehicle may have less than full permissions, e.g. no permission to drive, but permissions to unlock and start the car and activate environmental comfort settings and entertainment settings. Users may be given temporary permissions, for example a user may rent a car for a portion of time and be given a high level of permission for that portion of time. Upon a vehicle detecting a new user, a user profile may be requested by the vehicle from the server. The server may automatically update user permissions via period updates.

The access to certain features may also be affected by a user's location within the vehicle. For example, a user using a voice command to access a vehicle features may be restricted from access if he or she is detected as being in the back seat or passenger seat.

As an example, a user which ordinarily enjoys full access to the vehicle and all functionality may make a request via an AI virtual assistant from a backseat. Using an array of interior microphones the vehicle system may detect the source of the voice as originating in a backseat. The vehicle system may then determine, based on a number of rules, the voice should not be allowed access to certain functions of the vehicle such as driving related functions.

An exemplary database 1700 of such an embodiment is illustrated in FIG. 17A. Such a database 1700 may be stored in a storage device onboard a vehicle. In some embodiments, the database may store a User ID 1701, a Voiceprint ID 1702, a Permission Level 1703, and a Version 1704. For example, entry 1705 shows that a User 'ALEX' associated with a voiceprint with a voiceprint ID '702052' and the user has a permission level of 5 and the version of the voiceprint is 02:02:2015:1247, which may represent a day, month, year, and/or time of the creation or modification of the voiceprint file.

A user profile may be created at any time and for any person, even without an associated vehicle. For example, a user may download an application associated with a vehicle manufacturer and set up a username. The user may be instructed to provide samples of his or her voice during initiation. The process of providing voice samples may be in the form of a game or a conversation and the user may or may not be made aware of the fact that his or her voice is being evaluated and used to generate a voiceprint for voice biometric analysis.

During creation of a user profile, or later through the adjustments of settings, a user may be associated with one or more vehicles. For example, if after creating a user profile, a user purchases a vehicle, his or her user profile may be modified showing an association with that vehicle. Similarly, a user may use a smartphone application to rent or share a car—his or her user profile may also be modified showing a temporary permission to use or access that car. Also, a user merely riding in a vehicle may be given temporary permissions to activate certain portions of that vehicle, e.g. air conditioning or entertainment system features. Such a user may be able to temporarily gain permissions via a modification of his or her user profile. The modification may be made via a smartphone application, a call to a vehicle manufacturer, or via an onboard user interface.

A user profile may be created during pre-purchase conversations, or at any point prior to or after the purchase or use of a vehicle. As an example, a potential user of a vehicle may show interest in using a vehicle and download an application to a smartphone. Through the smartphone, the user may be enabled to register a user profile, enter personal information, and submit an audio sample to be used to generate a voiceprint. As another example, a potential owner of such a vehicle may visit a showroom and test-drive a vehicle. Using interior microphones of the vehicle, the vehicle system may be able to collect audio information sufficient to generate a voiceprint. The potential owner may be able to complete the user profile creation process via an onboard display user interface.

User profiles may also be stored in a network connected server to be shared with all vehicles associated with any particular user. An exemplary database 1710 of such an embodiment is illustrated in FIG. 17B. The database 1710 may be stored on a network connected server operable to communicate with a number of vehicles. Such a database 1710 may store information such as a User ID 1711, a Voiceprint ID 1712, and a Version Identifier or timestamp 1713.

For example, an entry 1714 may show a user 'ALEX' associated with a voiceprint with a voiceprint ID '702052' and the version of the voiceprint is 02:02:2015:1247, which may represent a day, month, year, and/or time of the creation or modification of the voiceprint file.

As discussed herein, a user may be associated with one or more different vehicles and each vehicle may be associated with one or more different users. This information may be stored in a database on a network connected server and used to manage which vehicles may have permissions or needs for particular user profiles.

An exemplary database 1720 of an embodiment is illustrated in FIG. 17C. Such a database 1720 may have a column 1725 listing a number of vehicles, identified by a vehicle ID, in the system and a row 1721 listing a number of users, identified by a user ID, in the system. The database 1720 may be in the form of a table which may be used to view which users 1721 are associated with which vehicle 1725. For example, row 1722 shows a vehicle 'X' is associated with users 'A' and 'B'. Entries in such a database 1720 may be in the form of permission levels showing each user's permission level for each vehicle—e.g. '0' for no control and '1' for complete control. This information may constantly be changing to reflect changing user's permission levels during every day use of vehicles, for example ride-sharing programs, etc.

A database may also be stored on a network connected server and used to manage which voiceprint ID is associated to which vehicles. An exemplary database 1730 of an embodiment is illustrated in FIG. 17D. Such a database 1730 may list data associating users with User IDs 1732, Voiceprint IDs 1731, and list vehicle associations 1733 for each user. For example, entry 1734 shows a voiceprint ID '789426' is associated with a User ID of 'D' and a 'Vehicle Association' of '011' which may represent one or more vehicles associated with that User ID.

Figure 18A:
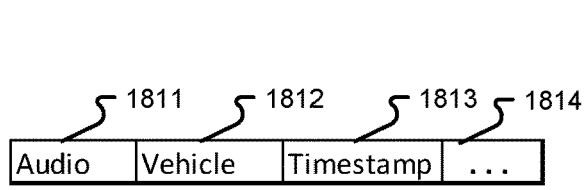
FIG. 18A illustrates a data packet in accordance with embodiments of the present disclosure.

Data used to populate databases onboard vehicles and on network connected servers may be sent between such entities in the form of packets. An exemplary packet 1810 transmitted between entities as described herein is illustrated in FIG. 18A. Such a packet 1810 may comprise data such as an audio sample 1811, a vehicle ID 1812, a timestamp 1813, and possibly other data 1814. A packet 1810 may be used in the case of a vehicle which has received an audio sample from the user and is requesting a voice biometric analysis of that audio sample in order to verify the speaker. By receiving the vehicle ID 1812, the network connected server may be enabled to determine a smaller number of users—users with permissions to use or access that vehicle. Also, by receiving a timestamp, the server may be enabled to update the voiceprint file for the speaker if the speaker is recognized.

Figure 18B:
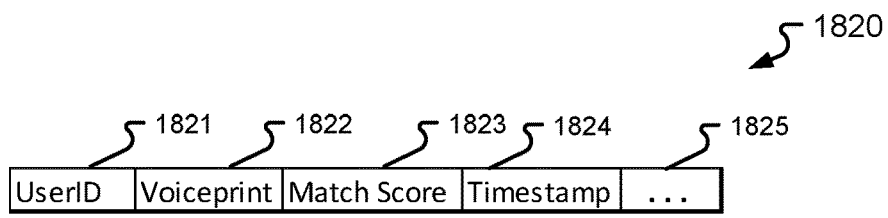
FIG. 18B illustrates a data packet in accordance with embodiments of the present disclosure.

Upon recognizing a speaker based on an audio sample, the server may send a response packet to the vehicle. An exemplary packet 1820 transmitted between entities as described herein is illustrated in FIG. 18B. Such a packet 1820 may comprise data such as a user ID 1821, a voiceprint 1822, a Match Score 1823, a timestamp 1824, and possibly other data 1825.

Figure 18C:
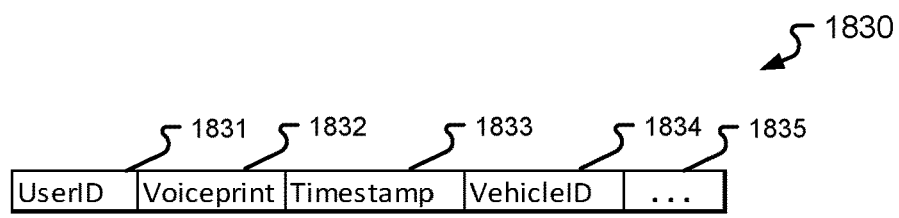
FIG. 18C illustrates a data packet in accordance with embodiments of the present disclosure.

During operation of the system, the voiceprints may constantly or occasionally be updated based on recently received audio samples. A change in a voiceprint file may be reflected by a version number or timestamp. In some cases, a vehicle may periodically or by request send a packet containing information reflecting such a change. Such a packet may be used by a server to synchronize voiceprint files, ensuring each vehicle associated with each user has an up-to-date voiceprint file. An exemplary packet 1830 transmitted between entities as described herein is illustrated in FIG. 18C. Such a packet 1830 may comprise data such as a user ID 1831, a voiceprint 1832, a timestamp 1833, a vehicle ID 1834, and possibly other data 1835.

Figure 18D:
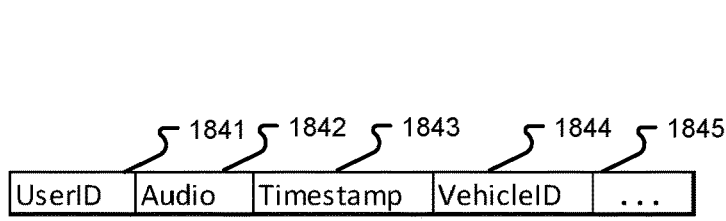
FIG. 18D illustrates a data packet in accordance with embodiments of the present disclosure.

A vehicle may also send audio recordings or samples of known users to a network connected server in order to have the audio samples processed and used to improve a voiceprint file. An exemplary packet 1840 transmitted between entities as described herein is illustrated in FIG. 18D. Such a packet 1840 may comprise data such as a user ID 1841, an audio sample, 1842, a timestamp 1843, a vehicle ID 1844 and possibly other data 1845.

As illustrated in FIG. 18E, the packets may be transmitted between particular entities in accordance with at least one embodiment of the disclosure. For example, a user device 1851 may transmit an audio sample 1854 to a vehicle 1852. Alternatively, no user device 1851 need be used and an audio sample may be collected by an onboard microphone. After receiving an audio sample, the vehicle 1852 may transmit the audio sample along with information such as a vehicle ID to a network connected server 1853 in a packet 1855. The server may process the audio sample and return a match score to the vehicle 1852 in a packet 1856 including information such as an associated user ID, an updated voiceprint, etc.

As illustrated in FIG. 18F, the packets may be transmitted between particular entities in accordance with at least one embodiment of the disclosure. For example, a vehicle 1861 may receive a user profile and voice print in a packet 1864 sent via a network from a server 1862. The vehicle may eventually collect audio from a user associated with the user profile and transmit that audio in a packet 1865 along with information such as a vehicle ID, a user ID, etc. The server 1862 may process the new audio and rebuild the voiceprint associated with the user ID and transmit the rebuilt voiceprint along with a user ID and version number to the vehicle 1861 in a new packet 1866. Additionally, optionally, and alternatively the server 1862 may transmit the user ID, new voiceprint, and version number to other vehicles 1863 in one or more additional packets 1867.

Figure 19:
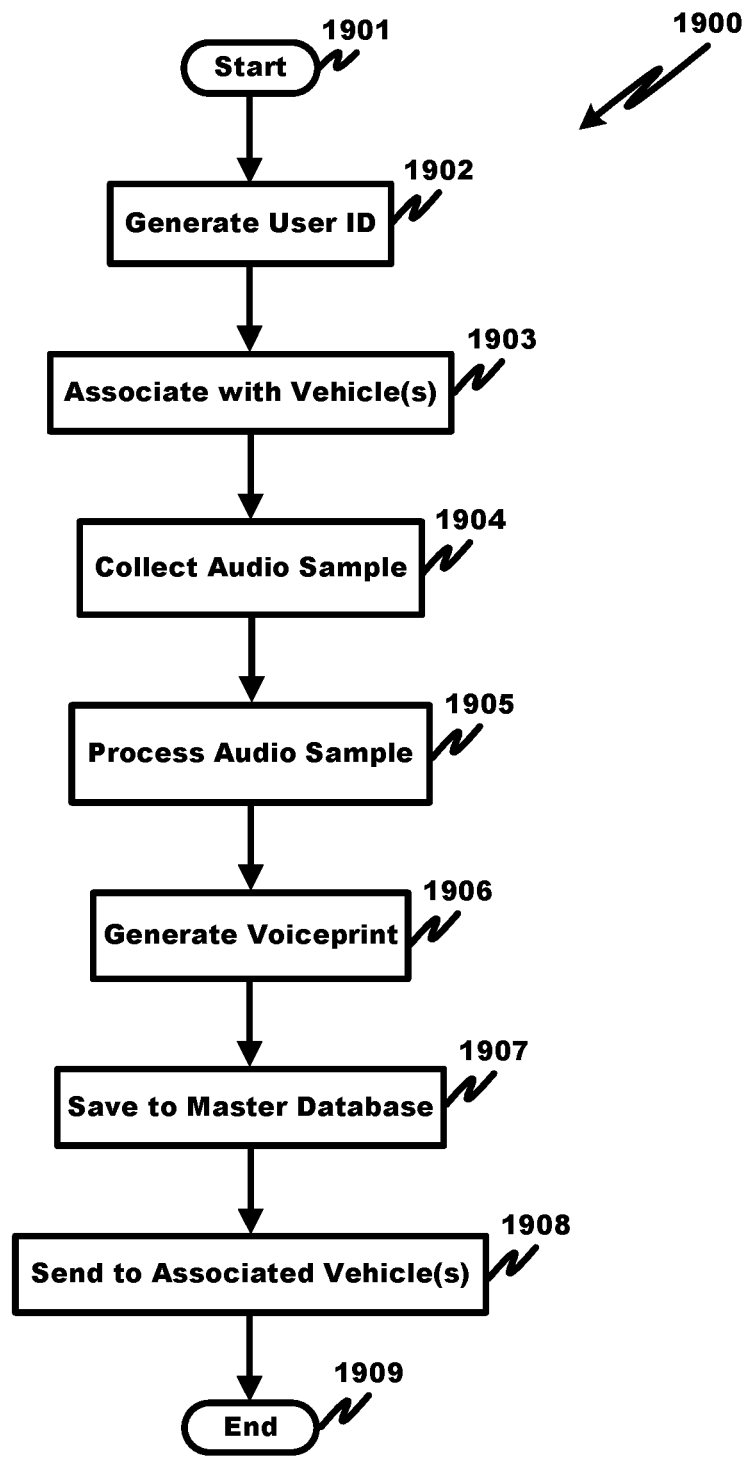
FIG. 19 illustrates an exemplary method in accordance with embodiments of the present disclosure.

An exemplary method 1900 of enrolling a user into a system as described herein in an embodiment is shown in FIG. 19. Such a method may begin at a step 1901. The method may take place on a telephone call, during a test ride of a vehicle, at a vehicle manufacturer showroom, within a smartphone app, on a website, etc. Typically, a user may decide to set up a user profile and may be presented with a User ID selection screen. At step 1902, a User ID may be generated. The User ID may be a unique identifier of the user to be used by all vehicles within the system and by all databases on vehicles and on servers. With the generation of a User ID, the user will be associated with a User Profile.

At step 1903, the User ID may be associated with one or more vehicles. For example, the user may own a vehicle equipped with the capabilities as described herein. During set up of a User Profile, or later during the modification of a user profile, a user may be able select from a number of associated vehicles.

At step 1904, an audio sample may be collected. As discussed herein, the process of collecting an audio sample may take the form of a telephone conversation, a smartphone app game, a physical conversation, or any other way of recording a user's voice. The user may or may not be aware of the collection of the audio sample for use of voice biometric analysis.

Upon collecting the audio sample, at step 1905, the audio sample may be processed by a voice biometric analysis system. This processing step may be performed via a third party server or onboard a vehicle via an onboard voice biometric analysis system.

At step 1906, after the audio sample has been processed, the voice biometric analysis system may generate a voiceprint file associated with the user. A voiceprint file may be a data file which may be used by a voice biometric analysis system or other voice recognition program to identify a speaker when provided with an audio sample. This voiceprint file may be stored in a network connected server, accessible by one or more vehicles, and stored in an onboard database of any vehicle associated with the associated user. Upon generation of a voiceprint file, a timestamp or version number may be generated in association for the management of the voiceprint files, ensuring the most up-to-date information is stored on the network.

At step 1907 the voiceprint file and User ID may be stored in a master database on a server in the form of a user profile. Other information, such as associated vehicles, voiceprint ID (an identifier identifying the exact voiceprint file associated with the user), voiceprint version, user preferences, etc. may be stored as metadata in the user profile.

At step 1908, the user profile, including the voiceprint file and any other relevant information may be sent to one or more vehicles associated with the user. For example, any vehicle the user owns, typically rides in, or a vehicle the user has just requested via a ride-sharing program may receive this data. The process may end at step 1909.

Enrollment may take place at any time. For example, a person considering purchasing or temporarily using a vehicle may set up a user account via one or more of many methods. A person may register a user account using an application on a smartphone, via a website, during a test-drive, via a phone (e.g. a 1-800 number), via a visit to a showroom, etc. A user account and user ID may be registered without the entry of a voice sample for voice biometric analysis or be registered along with the entry of a voice sample for voice biometric analysis. For example, a user may call a 1-800 number, answer (with voice) a series of questions such as name, birthday, address, phone number, email address, etc. The phone call may be recorded and the answers to the questions may be used to process an audio sample and generate a voiceprint. Similarly, a user creating a user ID via a website or smartphone application may be instructed to speak into a microphone during registration. A user may also set up a user account via a dashboard monitor in a vehicle at any time, for example on a test drive. Using interior microphones, a user may enter an audio sample for the generation of a voice print.

Using user profiles, a membership service may be created such that user profiles, user IDs, voiceprints, and other information may be shared between vehicles. Upon the first time a user approaches a vehicle, the vehicle may be equipped with the user's latest information and the user may be enabled to speak a command to the vehicle from the exterior of the vehicle. For example, a user may approach a car and from ten yards away may speak "unlock the doors," and the vehicle may respond by detecting the audio command, collecting an audio sample of the voice, sending the audio sample to a network connected server, processing the audio sample to identify and verify the speaker, receive a match score from the network, determine based on the results whether the doors should be unlocked, and/or unlock the doors. The vehicle may also greet the user by name and change a number of vehicle settings based on the identity of the speaker. For example, if the speaker is identified as a user of the vehicle with driving permissions, the driver seat may move to a correct position and the mirrors may move accordingly. Using a membership service, a fleet of cars may be set up so that a number of users may have access to a number of vehicles and use the vehicles at their own pleasure. If a user sets up a user ID and purchases a vehicle, the vehicle may download the user's voiceprint and settings before the user ever sees the vehicle.

The vehicles may be equipped with an artificial intelligence ("AI") assistant. The AI assistant, by using the voice biometric analysis of the vehicle, may appear to recognize the user by his or her voice. In such a way the vehicle may be personalized in any number of ways. Furthermore, a number of users may be registered with the same AI assistant and the AI assistant may be operable to recognize, identify, verify, and detect each user and respond in an accordance with said user's preferences.

Via voice biometric analysis, a vehicle may be equipped with fraud detection capabilities. For example, a vehicle may determine an unauthorized user has entered the vehicle. The vehicle may present a number of challenges to the user, which may include voice challenges, such as "say the following phrase." The vehicle may also test the audio received from a user for liveness, i.e. whether the source of the voice is a live person as opposed to a recording.

Once a user has registered a user account and set up a voiceprint, the user account information and voiceprint may be transmitted via a network to any vehicle in the network. For example, if a user has remotely purchased a vehicle, or remotely rented the vehicle, or gained permission to use a vehicle in other ways, the user account information may be transmitted to that vehicle. The vehicle may download the user account information and user's voiceprint.

Figure 20A:
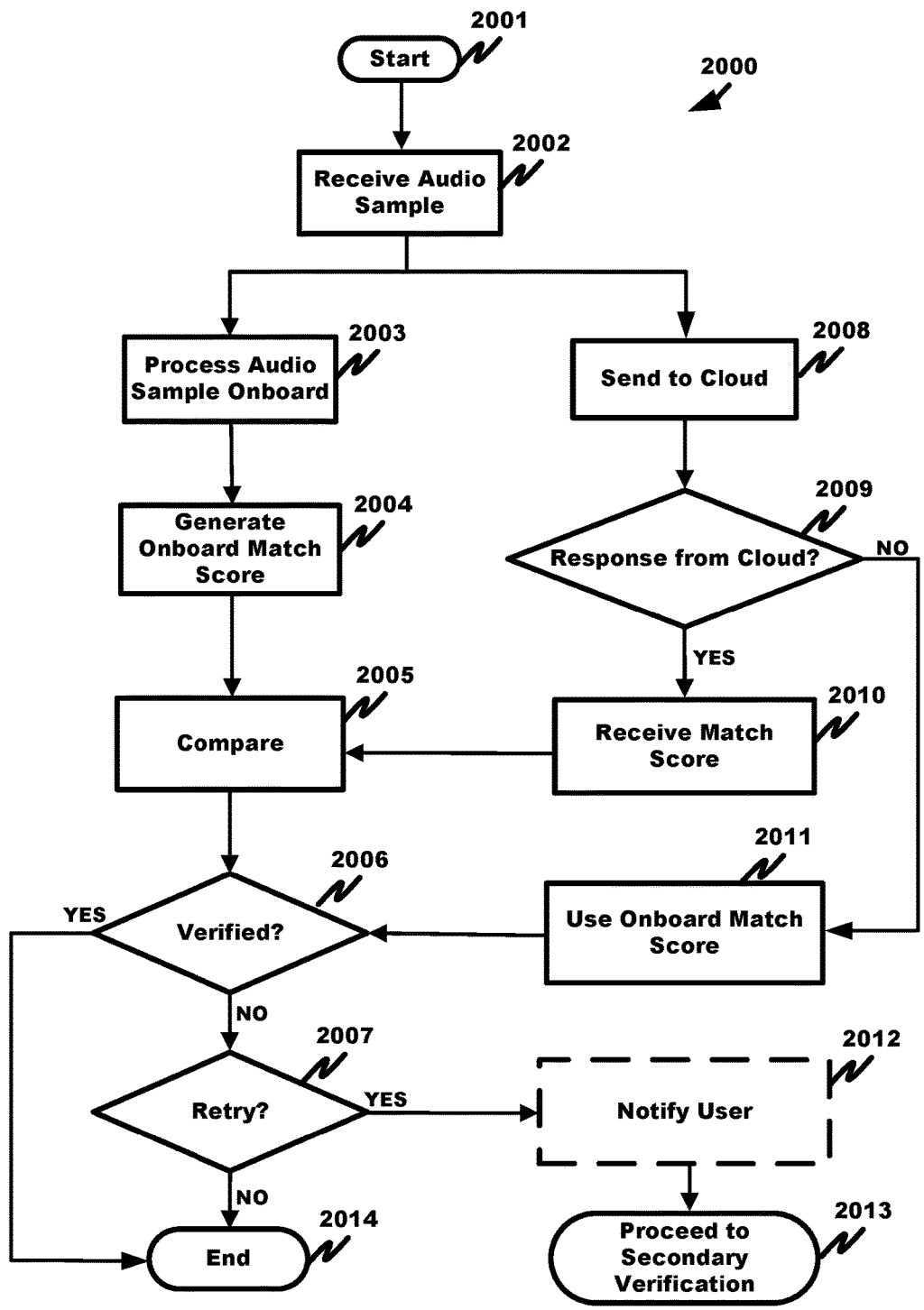
FIG. 20A illustrates an exemplary method in accordance with embodiments of the present disclosure.

In one embodiment, a vehicle may use a received audio sample verify a speaker and enable or disable a number of vehicle features. An exemplary method 2000 illustrating an embodiment is shown in FIG. 20A.

The method may begin at step 2001, at which point the vehicle may wait for the reception of audio at one or more microphones placed in or around the vehicle. An audio sample may be received by a processor onboard the vehicle at step 2002. For example, a user may enter an audio sample in an application on a smartphone and send the audio to the vehicle via a connection. Otherwise, the vehicle may receive audio through an onboard microphone placed in or around the vehicle. For example, the vehicle may constantly be interpreting received audio via its onboard microphones for one or more key words phrases which may activate the recording of an audio sample.

After receiving the audio sample, the vehicle system may transmit, or attempt to transmit, the audio sample to a network connected server via an onboard communication system at step 2008. Such a network connected server may be enabled to perform a voice biometric analysis of the audio sample and compare the analysis with voiceprints for any users associated with the vehicle or other voiceprints registered with user profiles in the system.

At or near the same time as the audio sample is sent to the network connected server, the vehicle's onboard processor may begin processing the audio sample onboard the vehicle, performing a voice biometric analysis at step 2003. After performing a voice biometric analysis in step 2003, the onboard processor may compare the analysis results with voiceprints associated with user profiles stored onboard the vehicle and generate an 'onboard match score' at step 2004. For example, a vehicle may have a number of associated users with varying degrees of permission levels. Each associated user may have a user profile stored on the onboard database and each user profile stored on the onboard database may be associated with a voiceprint file stored onboard the vehicle. Such voiceprint files may be used via voice biometric analysis to verify a speaker in or around the vehicle, or a speaker communicating with the vehicle via other means.

At step 2009, the vehicle system may wait for a response from the network connected server. After a period of time, if no response is received from the server, the vehicle system may determine the server cannot be reached and that the response timed-out, in which case the method may proceed to step 2011, in which the on-board match score may be used in authorizing the user. For example, in areas with poor cellular coverage a vehicle may not be able to make a secure connection with a network.

If, on the other hand, at step 2010 a response may be received from the server, the method may continue by comparing the results of the onboard analysis with a match score received by the network server at step 2005. This comparison may be made in conjunction with a score table database as described herein. For example, if both the onboard match score and the network-sent match score show a high match with one particular user ID associated with the vehicle, the user may be verified. If on the other hand, the network-sent match score and the onboard match score differ, the network-sent match score may be preferred over the onboard results and/or the speaker may be offered a chance to retry.

If no response is received from the network, the system may simply use the results of the onboard analysis in step 2011.

At step 2006, the vehicle system may determine whether the source of the audio sample should be verified based on the comparison, or in the case of a timed-out connection to the server, wherein no response was received, the verification decision may be made based solely on the onboard generated match score. In either event, the speaker may either be verified, offered a chance to retry, or rejected.

At step 2007, if the verification was not successful, the vehicle system may determine whether the user should be provided a chance to retry and submit an additional audio sample. This determination may be based on a threshold match score level or based on near matching results from at least one of the onboard and network-sent analysis.

At step 2012, if the retry determination was positive, the user may be notified of the failed verification and provided a way to submit an additional audio sample. The notification of the user may take the form of a notification sent to a smartphone, a beep or vibration of a key fob, or an audio signal or lights sent from the vehicle. At such time, a user may be given a chance to speak again and retry the voice biometric analysis, or try alternative verification means such as a fingerprint scan, retina scan, password, PIN, key, or other means. At step 2014, the method may end with either one or more vehicle features being enabled or disabled for the user based on the voice biometric analysis.

In one embodiment, an exemplary database 2050 is used to compare and determine a response given an onboard voice biometric analysis match score and a network-sent match score. Such a database is illustrated in FIG. 20B.

Such a database 2050 may be stored onboard a vehicle and used to compare an onboard match score with a match score received from the server. The database 2050 may comprise information such as an example local result (e.g. a 'High Yes' generated by the onboard voice biometric analysis system indicating a match score for a particular user ID); a cloud result (e.g. a 'High Yes' received from the server indicating a match score for a particular user ID); and a result (i.e. whether the verification is a success, whether the user should retry and submit a new audio sample, or whether the verification failed).

Figure 21A:
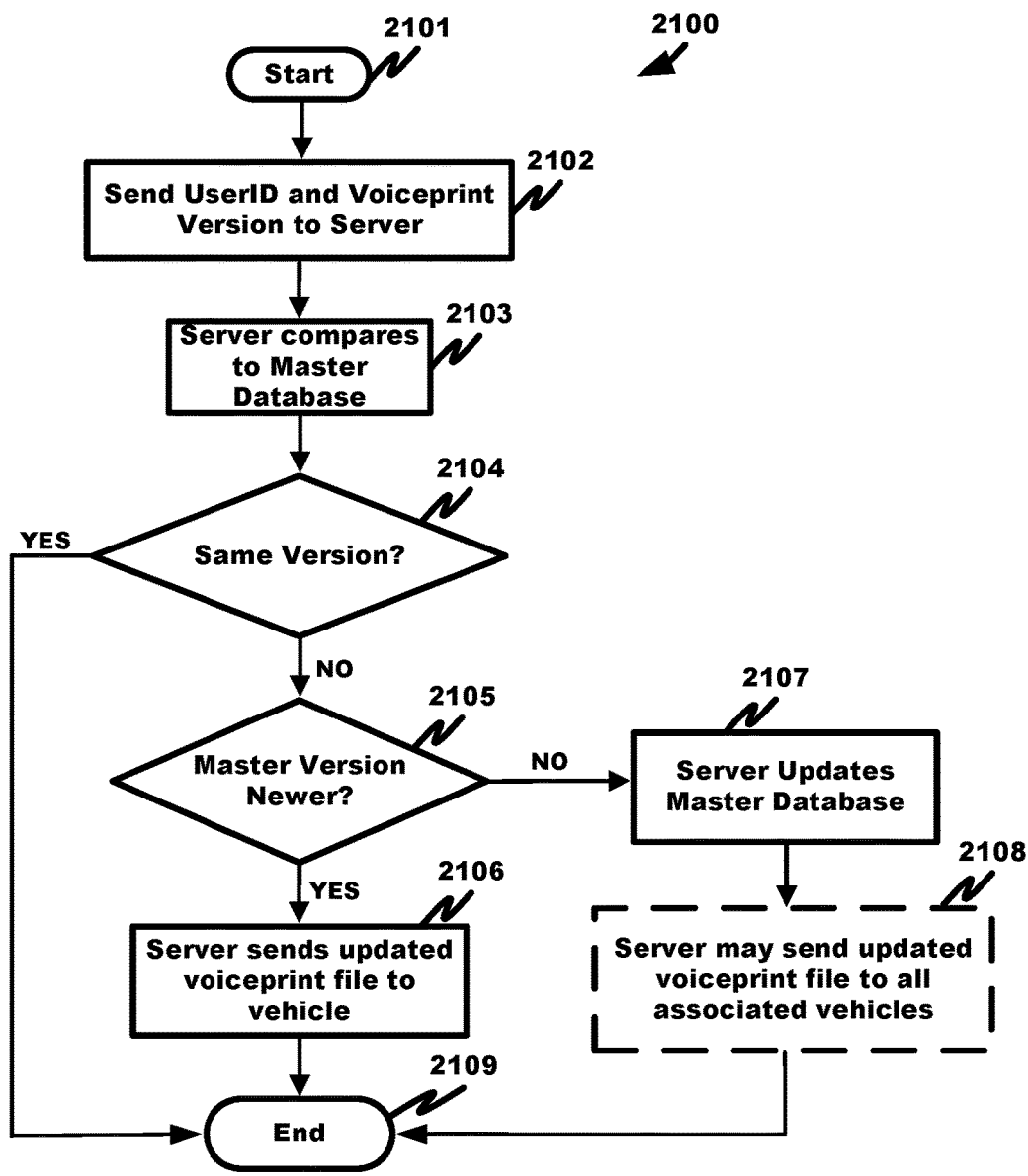
FIG. 21A illustrates an exemplary method in accordance with embodiments of the present disclosure.

In one embodiment, versions of voiceprints may be synchronized between a server and one or more vehicles via the comparison of voiceprint version identifiers. An exemplary method 2100 illustrating an embodiment is shown in FIG. 21A.

The method may begin at step 2101. The method may begin and run periodically at particular times, or upon user demand, user preferences, or upon detecting a change in a voiceprint ID version.

At step 2102, after starting the method, a user ID and a voiceprint version may be sent from a vehicle to a network connected server. The data may be transmitted in the form of a packet via a network connection.

At step 2103, the network connected server may receive the voiceprint version and the user ID and compare the received voiceprint version with the voiceprint version associated with the user ID as stored on a master database stored on the server. If both the server and the vehicle have up-to-date voiceprint files, the voiceprint versions may match.

At step 2104, the server may determine whether the voiceprint version received matches the voiceprint version stored on the master database. If the voiceprint versions match, signifying the same version of voiceprint is stored on both the vehicle and the server, the process may end. If the voiceprint versions do not match, the process may proceed to step 2105.

At step 2105, the server may determine whether the voiceprint version stored in the master database on the server is newer. This determination may be made by determining a time and date the voiceprint was created or modified based on the version number or a timestamp. If the master database voiceprint version is newer, the process may proceed to step 2106. If the master database voiceprint version is not newer, the process may proceed to step 2107.

At step 2106, in which the server has a newer version than the vehicle, the server may send an updated voiceprint file, along with the voiceprint version to the vehicle. The vehicle may receive the updated voiceprint file and voiceprint version and update its own onboard database.

At step 2107, in which the server has an older version than the vehicle, the server may update the master database and optionally proceed to step 2108 or simply end. At step 2108, the server may send the updated voiceprint along with the voiceprint version to all vehicles associated with the user. Such vehicles may receive the updated voiceprint and version and compare to their own onboard databases. The method may end at step 2109.

Figure 21B:
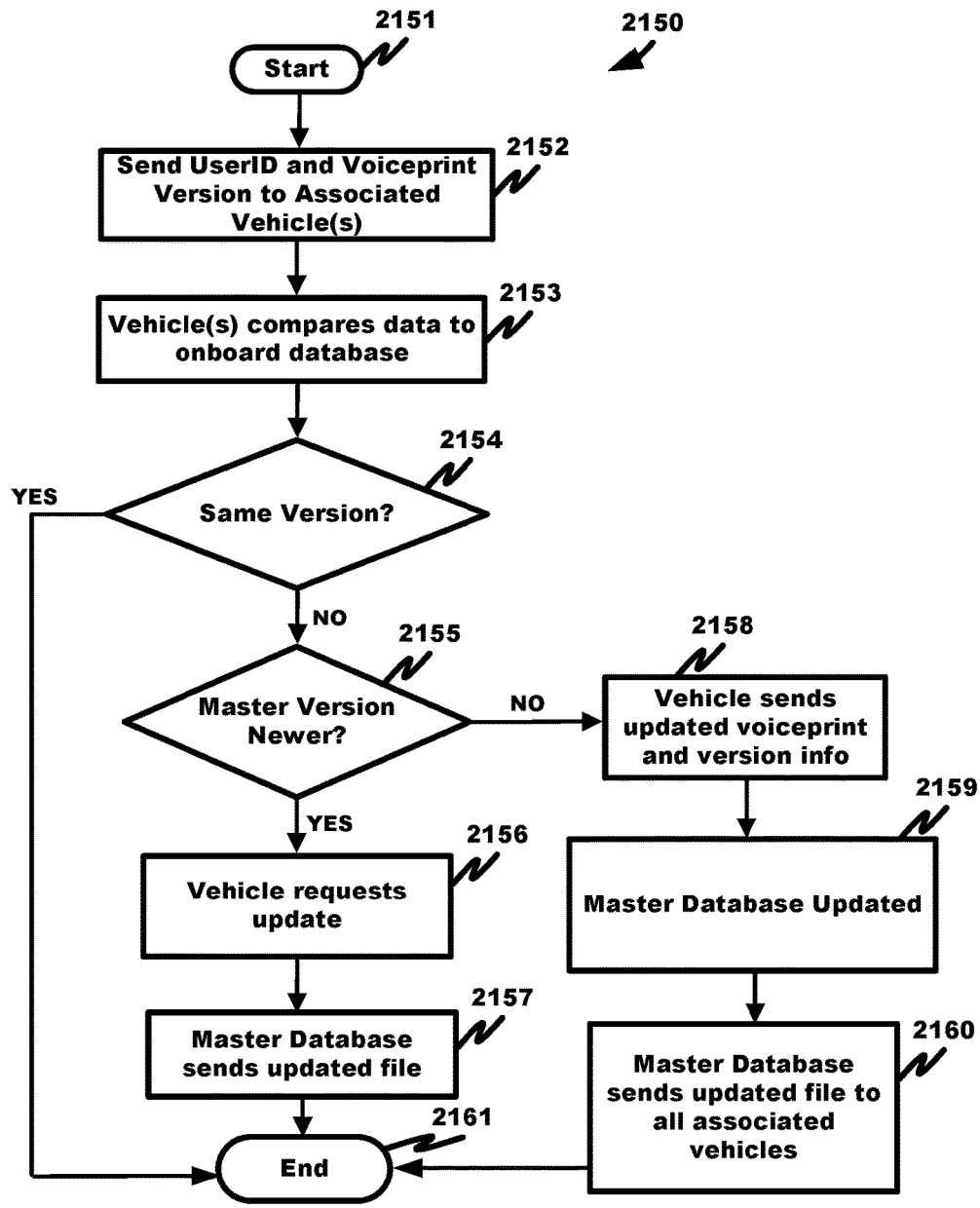
FIG. 21B illustrates an exemplary method in accordance with embodiments of the present disclosure.

Another exemplary method 2150 illustrating an embodiment is shown in FIG. 21B. In such an embodiment, the voiceprints stored on a server and on one or more vehicles may be kept synchronized via updates sent from the server.

The method may begin at step 2151. The method may run periodically on a schedule, at a user preferred time, on demand, or at other times.

At step 2152, the server may send a user ID and voiceprint version to one or more associated vehicles. These vehicles may be identified as associated with the user ID based on information stored in the server. The voiceprint version and user ID information may be sent via a network or some other means of communication.

At step 2153, upon receiving a voiceprint version and user ID information from a server, a vehicle may compare the received data with data stored in its onboard database. At step 2154, the vehicle system may determine whether the version received matches the version stored onboard the vehicle. If so, the method may end as the voiceprint versions match. If not, the method may proceed to step 2155

At step 2155, the vehicle system may determine whether the master version received from the server is newer than the voiceprint version associated with that user ID stored on the onboard database. If the received version is newer, the vehicle may, in step 2156, request the voiceprint file from the server. At step 2157 the server may send the voiceprint file to the requesting vehicle and the method may end at step 2161.

If on the other hand, the voiceprint version received by the vehicle is different but not newer than the version stored onboard the vehicle, the vehicle may, at step 2158, send the newer version to the server, ensuring the most up-to-date information is accessible by the server and by other associated vehicles. At step 2159, the server may update the master database with the newer version received from the vehicle and send the updated voiceprint file to the other associated vehicles. At step 2161 the process may end.

In one embodiment, when a new audio sample is received, the audio sample may be used to update a voiceprint for an existing user ID. This update may be performed onboard the vehicle using an onboard voice biometric analysis system or on a network connected server.

Figure 22:
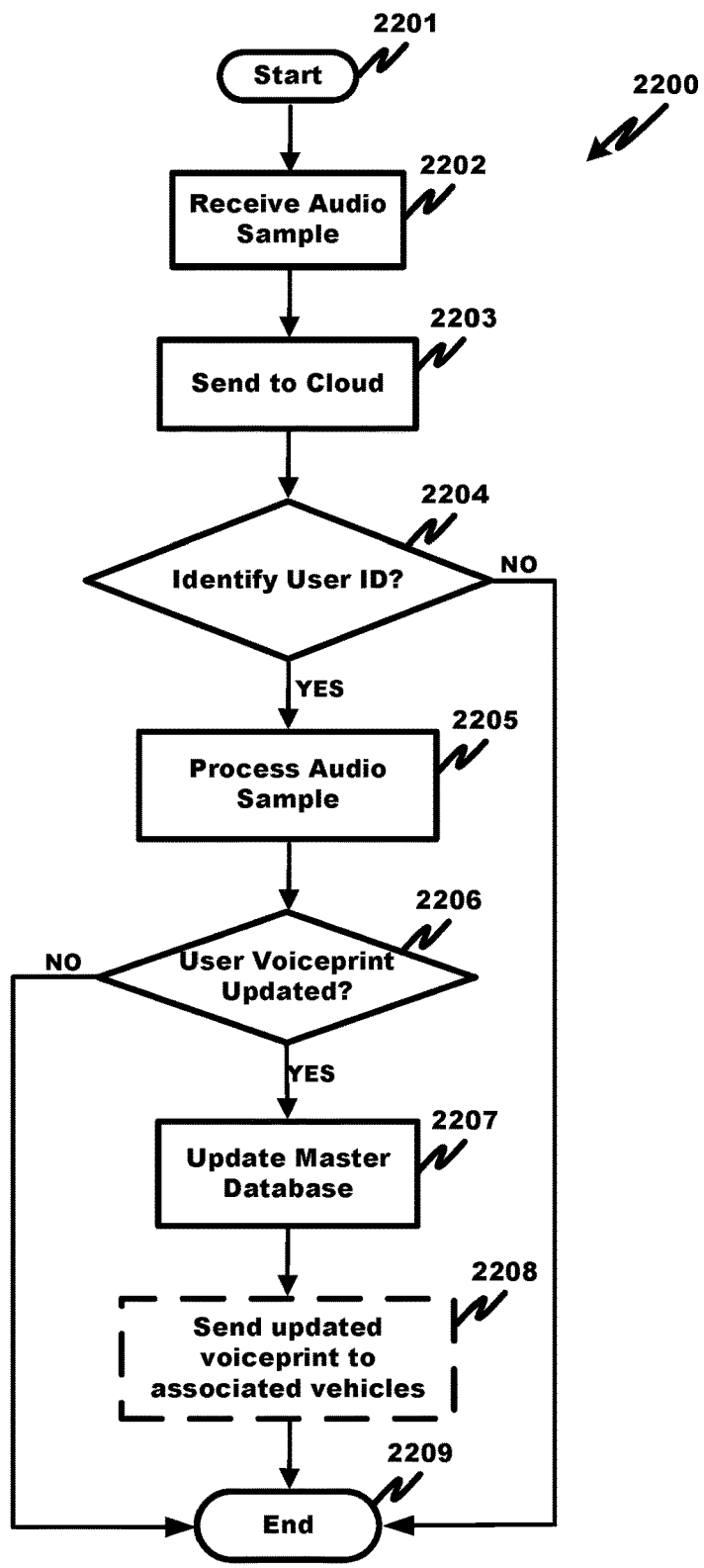
FIG. 22 illustrates an exemplary method in accordance with embodiments of the present disclosure.

An exemplary method 2200 illustrating an embodiment is shown in FIG. 22. The method may begin at step 2201 with a vehicle system waiting for a new audio sample to be received. At step 2202, the vehicle system may receive an audio sample. This may occur when a voice of a user of the vehicle, including a driver or a passenger, or a user of an application as discussed herein, or a caller calling into an entity associated with the vehicle manufacturer, is received via a microphone associated with the system. For example, a passenger in a backseat may make an oral command to an AI assistant. Such a request may be recorded as an audio sample.

At step 2203, the audio sample may be sent via a network connection to a server. The server may perform voice biometric analysis and attempt to identify a user ID associated with the audio sample based on a voiceprint.

At step 2204, the server may determine whether a user ID may be identified. If not, the method may end as no user profile could be found to be updated. If in step 2204 the server does identify a user ID associated with the audio sample, the method may continue to step 2205.

At step 2205, the audio sample may be further processed by the server in order to attempt to update the associated voiceprint file. At step 2206, the server may determine whether the voiceprint was updated. If not, the method may end at step 2209. If, on the other hand, the voiceprint was updated, the master database stored on the server may be updated at step 2207 reflecting the new voiceprint and a new voiceprint version ID may be generated. At this point, the server may optionally send an updated voiceprint to all vehicles associated with the associated User ID. At step 2209 the method may end.

Figure 23:
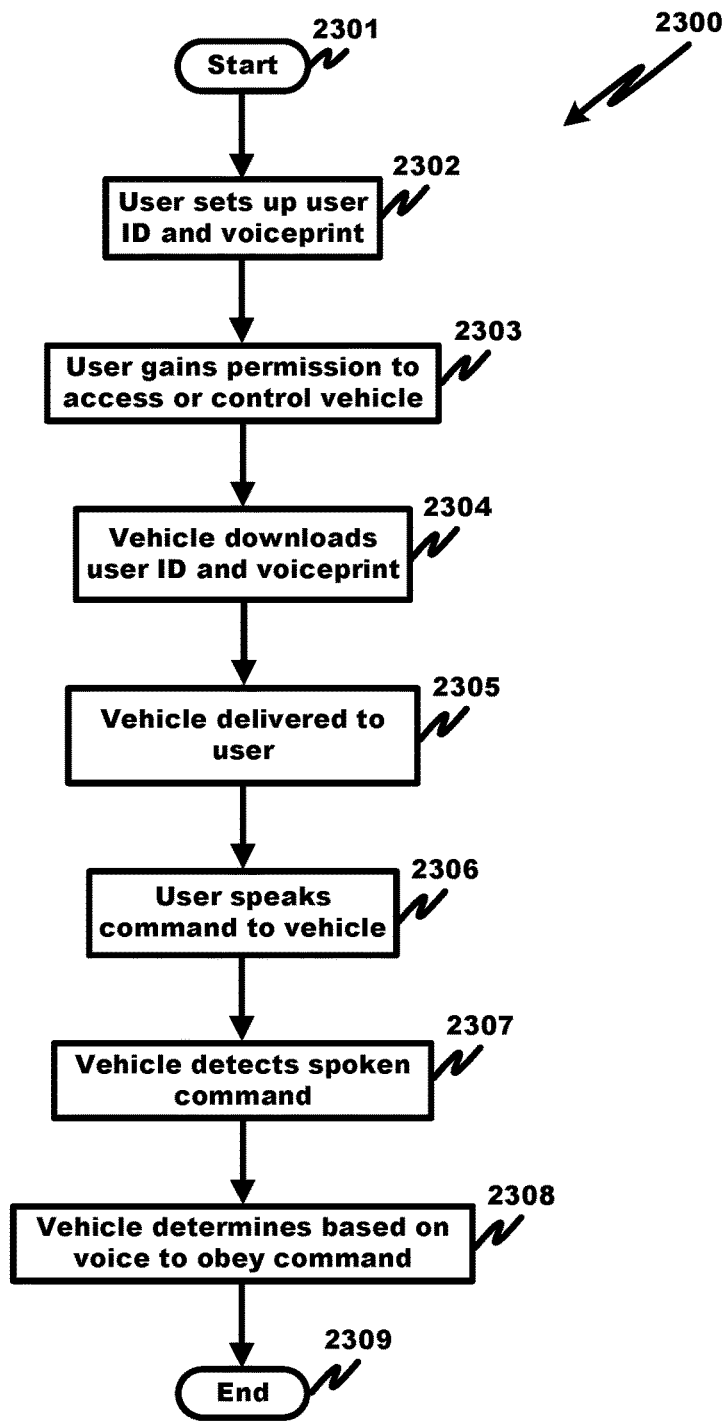
FIG. 23 illustrates an exemplary method in accordance with embodiments of the present disclosure.

An exemplary method 2300 illustrating an embodiment is shown in FIG. 23. The method may begin at step 2301 and in step 2302 a user may set up a user ID and voiceprint as discussed herein. At step 2303, the user may buy, rent, borrow, or in some other way gain permission to access and/or use a vehicle. At step 2304, the vehicle for which the user has gained permission may be notified by the server and be sent and/or download the user ID and voiceprint for the server. In step 2305, the car may be delivered to the user, or the user may approach the vehicle. In step 2306, the user may speak a command to the vehicle. In step 2307, the vehicle may detect the spoken command, in step 2308, the vehicle may determine, based on the voice, to obey the command and perform the commanded function. In step 2309, the method 2300 may end.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle, comprising: at least one microphone to detect a user's voice from within in an inside of the vehicle and/or outside of the vehicle; a processor; and a memory in communication with the processor and comprising computer readable program code that when executed by the processor causes the processor to perform operations comprising: receiving an audio sample from the at least one microphone; transmitting the audio sample to a server via a network connection; processing the audio sample, wherein processing the audio sample comprises generating a first voice biometric match score; receiving a second voice biometric match score from the server; determining a user identity based on the first voice biometric match score and the second voice biometric match score; based on the determination, associating a user with the audio sample; and determining a user permission associated with the identified user to allow access to one or more vehicle features.

Aspects of the above vehicle include wherein the user's voice originates outside the vehicle.

Aspects of the above vehicle include wherein the first voice biometric match score is generated based at least in part on a voiceprint stored in the memory.

Aspects of the above vehicle include wherein the voiceprint was sent to the vehicle from the server.

Aspects of the above vehicle include wherein the user permission is less than full control of the vehicle.

Aspects of the above vehicle include the vehicle transmitting a voiceprint version identification (ID) and a user ID associated with the voiceprint version ID to the server.

Aspects of the above vehicle include wherein the user's voice originates inside the vehicle.

Aspects of the above vehicle include wherein the processor determines a location of the user's voice based on a plurality of audio reception levels associated with an array of interior microphones.

Aspects of the above vehicle include wherein the processor determines the user permission associated with the user based in part on the location of the user's voice.

Aspects of the above vehicle include wherein the first voice biometric score is based on a voiceprint created before a purchase of the vehicle.

Embodiments include a computer implemented method of enabling vehicle features based on a voice of a user, the method comprising: receiving, by a processor, an audio sample from at least one microphone adapted to detect a user's voice from within an inside of the vehicle and/or outside of the vehicle; transmitting, by the processor, the audio sample to a server via a network connection; processing, by the processor, the audio sample, wherein processing the audio sample comprises generating a first voice biometric match score; receiving via the network connection a second voice biometric match score from the server; comparing, by the processor, the first voice biometric match score with the second voice biometric match score; based on the comparison, associating, by the processor, a user identification ("ID") with the audio sample; and determining a user permission associated with the user to allow access to one or more vehicle features.

Aspects of the above vehicle include wherein the user's voice originates outside the vehicle.

Aspects of the above vehicle include wherein the first voice biometric match score is generated based at least in part on a voiceprint stored in the memory.

Aspects of the above vehicle include wherein the voiceprint was sent to the vehicle from the server.

Aspects of the above vehicle include wherein the user permission is less than full control of the vehicle.

Aspects of the above vehicle include the vehicle transmitting a voiceprint version identification (ID) and a user ID associated with the voiceprint version ID to the server.

Aspects of the above vehicle include wherein the user's voice originates inside the vehicle.

Aspects of the above vehicle include wherein the processor determines a location of the user's voice based on a plurality of audio reception levels associated with an array of interior microphones.

Aspects of the above vehicle include wherein the processor determines the user permission associated with the user based in part on the location of the user's voice.

Aspects of the above vehicle include wherein the comparison of the first voice biometric match score and the second voice biometric match score results in a disabling of vehicle features.

Embodiments include a method for updating voice recognition databases for a number of vehicles, the method comprising: receiving an audio sample from a first one of two or more vehicles; processing the audio sample with a voice biometric analysis system; associating, based on the processing, the audio sample with a user ID; transmitting a match score based on the association to the first vehicle; updating a voiceprint associated with the user ID based on the processing; and transmitting the updated voiceprint to the two or more vehicles.

Embodiments include a method for updating voiceprints for a user ID associated with a number of vehicles, the method comprising: receiving, by a server, a user ID and an audio sample from a first of two or more vehicles; updating, based on the received audio sample, a voiceprint associated with the user ID; determining a plurality of vehicles associated with the user ID; and transmitting the updated voiceprint and the user ID to the plurality of vehicles.

Embodiments include a method for synchronizing voiceprint versions for a user ID associated with a number of vehicles, the method comprising: receiving, by a server, from a first vehicle, a user ID and a voiceprint version; comparing, by the server, the received voiceprint version with a local voiceprint version associated with the received user ID; if the local version is newer, the server sending the local voiceprint version to the first vehicle; and if the local version is older, the server updating the local voiceprint version and transmitting the updated voiceprint version to at least a second vehicle.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle, comprising:
   an array of microphones to detect a user's voice from within the vehicle;
   a processor; and
   a memory in communication with the processor and comprising computer readable program code that when executed by the processor causes the processor to perform operations comprising:
   receiving a voice command from a user via the array of microphones;
   determining a location of the user based on the received voice command;
   transmitting the voice command to an external server via a network connection;
   generating a first voice biometric match score based on the voice command by processing the voice command;
   receiving a second voice biometric match score based on the voice command from the external server via the network connection;
   comparing the first voice biometric match score based on the voice command with the second voice biometric match score based on the voice command;
   determining a user identity based on the comparison of the first voice biometric match score based on the voice command with the second voice biometric match score based on the voice command;
   based on the determined user identity, associating a user identification with the voice command;
   determining a user permission associated with the identified user based on the associated user identification and the determined location of the user;
   allowing access to one or more vehicle features based on the user permission, wherein the one or more vehicle features are associated with the determined user identity and the determined location of the user; and
   after allowing access to the one or more vehicle features, activating a vehicle function based on the voice command.

2. The vehicle of claim 1, wherein the voice command originates inside the vehicle.

3. The vehicle of claim 1, wherein the first voice biometric match score is generated based at least in part on a voiceprint stored in the memory and the second voice biometric score is based at least in part of a voiceprint stored in the external server.

4. The vehicle of claim 3, wherein the voiceprint was sent to the vehicle from the external server prior to receiving the voice command.

5. The vehicle of claim 1, wherein the user permission is less than full control of the vehicle.

6. The vehicle of claim 1, wherein the operations further comprise transmitting a voiceprint version identification and a user identification associated with the voiceprint version identification to the external server.

7. The vehicle of claim 1, wherein the location comprises an indication of a particular seat of the vehicle.

8. The vehicle of claim 7, wherein determining a location of the user comprises comparing a plurality of audio reception levels associated with the array of microphones.

9. The vehicle of claim 1, wherein the first voice biometric score is based on a voiceprint created by a user remote from the vehicle.

10. A computer implemented method of enabling vehicle features based on a voice of a user, the method comprising:
receiving, by a processor of a vehicle, a voice command from a user via an array of microphones adapted to detect a user's voice from within the vehicle;
determining, by the processor, a location of the user based on the received voice command;
transmitting, by the processor, the voice command to an external server via a network connection;
generating, by the processor, a first voice biometric match score based on the voice command by processing the voice command;
receiving via the network connection a second voice biometric match score based on the voice command from the external server;
comparing, by the processor, the first voice biometric match score based on the voice command with the second voice biometric match score based on the voice command;
determining a user identity, by the processor, based on the comparison of the first voice biometric match score based on the voice command with the second voice biometric match score based on the voice command;
based on the determined user identity, associating, by the processor, a user identification with the voice command;
determining, by the processor, a user permission associated with the user based on the associated user identification and the determined location of the user;
allowing, by the processor, access to one or more vehicle features, wherein the one or more vehicle features are associated with the determined user identity and the determined location of the user; and
after allowing access to the one or more vehicle features, activating a vehicle function based on the voice command.

11. The method of claim 10, wherein the voice command originates inside the vehicle.

12. The method of claim 10, wherein the first voice biometric match score is generated based at least in part on a voiceprint stored in the memory and the second voice biometric score is based at least in part of a voiceprint stored in the external server.

13. The method of claim 12, wherein the voiceprint was sent to the vehicle from the server prior to receiving the voice command.

14. The method of claim 10, wherein the user permission is less than full control of the vehicle.

15. The method of claim 10 further comprising transmitting a voiceprint version identification and a user identification associated with the voiceprint version ID to the server.

16. The method of claim 10, wherein the location comprises an indication of a particular seat of the vehicle.

17. The method of claim 16, wherein determining, by the processor, a location of the user comprises comparing a plurality of audio reception levels associated with the array of microphones.

18. The method of claim 10, wherein the comparison of the first voice biometric match score and the second voice biometric match score results in a disabling of vehicle features.

19. A computer program product, comprising:
a non-transitory computer readable storage medium having computer readable program code embodied therewith, the computer readable program code comprising:
computer readable program code configured when executed by a processor of a vehicle to:
receive a voice command from a user via an array of microphones;
determine a location of the user based on the received voice command;
transmit the voice command to an external server via a network connection;
generate a first voice biometric match score based on the voice command by processing the voice command;
receive a second voice biometric match score based on the voice command from the external server via the network connection;
compare the first voice biometric match score based on the voice command with the second voice biometric match score based on the voice command;
determine a user identity based on the comparison of the first voice biometric match score based on the voice command with the second voice biometric match score based on the voice command;
based on the determined user identity, associate a user identification with the voice command;
determine a user permission associated with the identified user based on the associated user identification and the determined location of the user;
allow access to one or more vehicle features based on the user permission, wherein the one or more vehicle features are associated with the determined user identity and the determined location of the user; and
after allowing access to the one or more vehicle features, activate a vehicle function based on the voice command.

20. The computer program product of claim 19, wherein the voice command originates inside the vehicle.

* * * * *